(12) United States Patent
Oka

(10) Patent No.: US 9,874,692 B2
(45) Date of Patent: Jan. 23, 2018

(54) SUBSTRATE-TYPE OPTICAL WAVEGUIDE ELEMENT AND METHOD FOR PRODUCING SUBSTRATE-TYPE OPTICAL WAVEGUIDE ELEMENT

(71) Applicant: FUJIKURA LTD., Tokyo (JP)

(72) Inventor: Akira Oka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/447,907

(22) Filed: Mar. 2, 2017

(65) Prior Publication Data

US 2017/0176680 A1 Jun. 22, 2017

Related U.S. Application Data

(63) Continuation of application No. PCT/JP2015/077134, filed on Sep. 25, 2015.

(30) Foreign Application Priority Data

Sep. 30, 2014 (JP) .................................. 2014-202413

(51) Int. Cl.
*G02F 1/035* (2006.01)
*G02B 6/126* (2006.01)
(Continued)

(52) U.S. Cl.
CPC .............. *G02B 6/126* (2013.01); *G02B 6/122* (2013.01); *G02B 6/125* (2013.01); *G02F 1/011* (2013.01); *G02F 2203/07* (2013.01)

(58) Field of Classification Search
CPC ........ G02B 6/126; G02B 6/122; G02B 6/125; G02F 1/011; G02F 2203/07
(Continued)

(56) References Cited

U.S. PATENT DOCUMENTS 5,165,001 A 11/1992 Takagi et al.
6,393,185 B1 5/2002 Deacon
(Continued)

FOREIGN PATENT DOCUMENTS

JP 4-212108 A 8/1992
JP 6-18735 A 1/1994
(Continued)

OTHER PUBLICATIONS

Dai et al., "Mode conversion in tapered submicron silicon ridge optical waveguides", Optics Express 13425, vol. 20, No. 12, pp. 13425-13439, 2012.
(Continued)

*Primary Examiner* — Jerry Blevins
(74) *Attorney, Agent, or Firm* — Westerman, Hattori, Daniels & Adrian

(57) ABSTRACT

In a substrate-type optical waveguide element, in a case where effective refractive indexes of a TE polarized wave and a TM polarized wave in a first core are defined as $N_{TE}@WG1$ and $N_{TM}@WG1$, respectively, and effective refractive indexes of a TE polarized wave and a TM polarized wave in a second core are defined as $N_{TE}@WG2$ and $N_{TM}@WG2$, respectively, a magnitude relation of the effective refractive indexes $N_{TM}@WG1$ and $N_{TM}@WG2$ at a start position of a parallel-core section is opposite to that at an end position of the parallel-core section, and a relative refractive index difference defined by Formula (a) is 0.25 or higher.

16 Claims, 34 Drawing Sheets

(51) Int. Cl.
*G02B 6/122* (2006.01)
*G02B 6/125* (2006.01)
*G02F 1/01* (2006.01)

(58) Field of Classification Search
USPC .......................................................... 385/3
See application file for complete search history.

(56) References Cited

U.S. PATENT DOCUMENTS

| | | | |
|---|---|---|---|
| 9,304,254 | B2 | 4/2016 | Oka |
| 9,557,482 | B2 | 1/2017 | Oka et al. |
| 2002/0118907 | A1* | 8/2002 | Sugama ............ G02B 6/12002 385/14 |
| 2006/0072866 | A1* | 4/2006 | Mizuno ............. G02B 6/12007 385/1 |
| 2007/0196050 | A1* | 8/2007 | Ishida .................... G02B 6/125 385/43 |
| 2008/0152277 | A1 | 6/2008 | Little |
| 2010/0046886 | A1* | 2/2010 | Doerr ..................... G02B 6/105 385/27 |
| 2010/0271614 | A1* | 10/2010 | Albuquerque ........ G01S 7/4811 356/4.01 |
| 2010/0322559 | A1 | 12/2010 | Ogawa et al. |
| 2013/0188971 | A1* | 7/2013 | Painchaud ........... H04B 10/612 398/214 |

FOREIGN PATENT DOCUMENTS

| | | |
|---|---|---|
| JP | 2000-121855 A | 4/2000 |
| JP | 2006-301501 A | 11/2006 |
| JP | 2014-41253 A | 3/2014 |

OTHER PUBLICATIONS

Dong et al., "112-Gb/s Monolithic PDM-QPSK Modulator in Silicon", Th.3.13.1, ECOC Postdeadline Papers, (2012), (3 pages).
Fukuda et al., "Ultrasmall polarization splitter based on silicon wire waveguides", Optics Express, vol. 14, No. 25, pp. 12401-12408, Dec. 11, 2006.
Oka et al., "Low-loss Silicon Polarization Beam Combiner Using Adiabatic Process", 2015 Nen the Institute of Electronics, Information and Communication Engineers Sogo Taikai Koen Ronbunshu, pp. 128, Feb. 24, 2015.
Shani et al., "Intergrated Optic Adiabatic Devices on Silicon", IEEE Journal of Quantum Electronics, vol. 27, No. 3, pp. 556-566, Mar. 1991.
Snyder et al., "Optical Waveguide Theory", Chapter 19—Slowly varying waveguides, Chapman&Hall, London (First edition 1983, Reprinted 1991), pp. 407-419.
Snyder et al., "Optical Waveguide Theory", Chapter 28—SLocal-mode coupling, Chapman&Hall, London (First edition 1983, Reprinted 1991), pp. 553-567.
Snyder et al., "Optical Waveguide Theory", Chapter 29—Crosstalk, Chapman&Hall, London (First edition 1983, Reprinted 1991), pp. 567-585.
International Search Report dated Nov. 17, 2015, issued in counterpart International Application No. PCT/JP2015/077134 (2 pages).
Oka et al., "Silicon Polarization Rotator using Partial-Rib Waveguide", 2013 Nen Proceedings of the Society Conference of IEICE 1, The Instititue of Electronics, Information and Communication Engineers, Sep. 3, 2013, p. 134.
International Search Report dated Nov. 17, 2015, issued in International Application No. PCT/JP2015/077135 (2 pages).
Related co-pending U.S. Appl. No. 15/447,693.
Notice of Allowance dated Oct. 4, 2017, issued in U.S. Appl. No. 15/447,693. (22 pages).

* cited by examiner

SUBSTRATE-TYPE OPTICAL WAVEGUIDE ELEMENT AND METHOD FOR PRODUCING SUBSTRATE-TYPE OPTICAL WAVEGUIDE ELEMENT

CROSS-REFERENCE TO RELATED APPLICATIONS

This application is a Continuation of PCT International Application No. PCT/JP2015/077134 filed in Japan on Sep. 25, 2015, which claims the benefit of Patent Application No. 2014-202413 filed in Japan on Sep. 30, 2014, the entire contents of which are hereby incorporated by reference.

TECHNICAL FIELD

The present invention relates to a substrate-type optical waveguide element in which two cores are formed between a lower cladding and an upper cladding.

BACKGROUND ART

Currently, the amount of information to be transmitted through optical communications keeps increasing. In order to match up to such an increase in amount of information, some measures are being taken. Such measures includes, for example, increasing a signaling rate and increasing the number of channels by use of wavelength-division multiplexing. Among such measures, there is a next-generation 100-Gbps digital coherent transmission technology. This technology employs polarization multiplexing in which different pieces of information are superimposed on two polarized waves whose electric fields are orthogonal to each other, so as to double the amount of information transmittable per unit of time. However, a modulation method employing such polarization multiplexing requires an optical modulator having a complex configuration. This results in problems such as increases in device size and device cost. In view of these problems, Non-Patent Literature 1 discloses an optical modulator employing a substrate-type optical waveguide with use of silicon as a core. Such a substrate-type optical waveguide has, for example, the following advantages: a production process is simple; the size of an optical element can be reduced by integration; and production costs can be reduced by use of a large-diameter wafer.

In the polarization multiplexing, a polarization beam combiner (PBC) is used. The PBC carries out multiplexing of a TE polarized wave and a TM polarized wave within the substrate-type optical waveguide. (a) of FIG. 33 is a block diagram illustrating a configuration of a PBC 101. The PBC 101 includes a first input port 102, a second input port 103, and an output port 104. The PBC 101 carries out multiplexing of a TM polarized wave introduced through the first input port 102 and a TE polarized wave introduced through the second input port 103, and outputs, through the output port 104, the TM polarized wave and the TE polarized wave which are thus multiplexed. Note that the length of each arrow illustrated in (a) of FIG. 33 indicates the power of each of the TE polarized wave and the TM polarized wave which enter into the PBC 101. In (b) and (c) of FIG. 33 which are referred to later, the length of each arrow similarly indicates the power of each polarized wave.

The TE polarized wave herein refers to a mode having an electric field whose main component is present along a horizontal direction (hereinafter, referred to as a width direction or x direction) parallel to a substrate in a plane orthogonal to a light traveling direction in the substrate-type optical wave guide. Meanwhile, the TM polarized wave herein refers to a mode having an electric field whose main component is present along a direction (hereinafter, referred to as a height direction or y direction) perpendicular to the substrate in the plane orthogonal to the light traveling direction in the substrate-type optical waveguide.

In terms of performance of PBCs, loss during polarization multiplexing and a polarization extinction ratio are important.

The loss of a TM polarized wave indicates a ratio of the power of the TM polarized wave at the output port 104 with respect to the power of the TM polarized wave introduced through the first input port 102. The loss of a TM polarized wave is defined by the following Formula (1).

[Math. 1]

$$\text{LOSS} = -10 Log_{10} \frac{\text{POWER OF } TM \text{ POLARIZED WAVE AT OUTPUT PORT}}{\text{POWER OF } TM \text{ POLARIZED WAVE AT INPUT PORT}} \quad (1)$$

Meanwhile, the loss of a TE polarized wave indicates a ratio of the power of the TE polarized wave at the output port 104 with respect to the power of the TE polarized wave introduced through the second input port 103. The loss of a TE polarized wave is defined by the following Formula (2).

[Math. 2]

$$\text{LOSS} = -10 Log_{10} \frac{\text{POWER OF } TE \text{ POLARIZED WAVE AT OUTPUT PORT}}{\text{POWER OF } TE \text{ POLARIZED WAVE AT INPUT PORT}} \quad (2)$$

In view of energy efficiency, the losses are each preferably a low loss.

On the other hand, the polarization extinction ratio (hereinafter, also referred to as "PER") indicates a ratio of the power of a TM polarized wave and the power of a TE polarized wave which are outputted through the output port 104 in a case where the TM polarized wave and the TE polarized wave are introduced through one (e.g., the second input port 103) of input ports of a PBC. The polarization extinction ratio is defined by each of the following Formulae (See (b) of FIG. 33. The length of each arrow in (b) of FIG. 33 is indicative of the power of each polarized wave).

In a case where a TM polarized wave and a TE polarized wave of the same power are introduced through the first input port 102 which is for input of the TM polarized wave (see (b) of FIG. 33), the PER is defined by the following Formula (3).

[Math. 3]

$$PER = 10 Log_{10} \frac{\text{POWER OF } TM \text{ POLARIZED WAVE AT OUTPUT PORT}}{\text{POWER OF } TE \text{ POLARIZED WAVE AT OUTPU PORT}} \quad (3)$$

In a case where a TM polarized wave and a TE polarized wave of the same power are introduced through the first input port 102 for input of the TE polarized wave (see (c) of FIG. 33), the PER is defined by the following Formula (4).

[Math. 4]

$$PER = 10 Log_{10} \frac{\text{POWER OF } TE \text{ POLARIZED WAVE AT OUTPU PORT}}{\text{POWER OF } TM \text{ POLARIZED WAVE AT OUTPUT PORT}} \quad (4)$$

As described above, the PER is indicative of a degree of suppression of the power of one of a TM polarized wave and a TE polarized wave in a case where the TM polarized wave and the TE polarized wave are introduced through one input port. The PER is important, for example, in the following point. A PCB, like a polarization multiplexing modulator disclosed in Non-Patent Literature 1, is connected to a subsequent stage of a polarization rotator (hereinafter, also referred to as "PR"). The PR is a device for converting a TE polarized wave into a TM polarized wave. However, the TE polarized wave is slightly mixed in the TM polarized wave that is to be outputted from the PR, due to insufficient conversion. The TE polarized wave, thus mixed in the TM polarized wave causes, at the output port 104 of the PBC 101, crosstalk with a TE polarized wave (TE polarized wave illustrated in (a) of FIG. 33) that is to be multiplexed. This crosstalk results in deterioration of signal quality. Accordingly, it is preferable to make the PBC 101 suppress the occurrence of such crosstalk at the output port 104, by suppression of the power of the TE polarized wave which has been mixed in a PR output and introduced. In other words, the higher the PER is, the more the occurrence of crosstalk at the output port 104 can be suppressed. This consequently makes it possible to reduce deterioration of signal quality in polarization multiplexing.

It is preferable that the above-described two items of performance of PBCs be favorable in a wide wavelength band. This is for the following reason. In optical communications, wavelength multiplexing is widely used. Accordingly, many optical components including an optical modulator preferably operate in a wide wavelength band. The wide wavelength band means a band including, for example, C band (a wavelength range of 1530 nm to 1565 nm) and L band (a wavelength range of 1565 nm to 1625 nm). In a case where the PBC is utilized in such an optical component, it is preferable that the PBC also have a low loss and a high PER in a wide wavelength band.

Literatures on conventional technologies of PBCs include Non-Patent Literature 2 and Patent Literature 1.

Non-Patent Literature 2 relates to a polarization beam splitter. The polarization beam splitter can be obtained by causing a TE polarized wave and a TM polarized wave to enter through the output port 104 of the PBC 101 illustrated in (a) of FIG. 33 and then causing the TM polarized wave to exit through the first input port 102 and the TE polarized wave to exit through the second input port 103. As described above, the polarization beam splitter can achieve a function that is equivalent to the function of a PBC. Therefore, the polarization beam splitter is taken as a conventional art of PBCs. Non-Patent Literature 2 achieves polarization separation of TE0 and TM0 by a directional coupler in which two rectangular waveguides having congruent core shapes are provided adjacent to each other. Here, TE0 indicates a waveguide mode of a TE polarized wave which waveguide mode has a maximum effective refractive index among waveguide modes of the TE polarized wave, while TM0 indicates a waveguide mode of a TM polarized wave which waveguide mode has a maximum effective refractive index among waveguide modes of the TM polarized wave. FIG. 34 is a schematic view illustrating a configuration of a polarization beam splitter 201 disclosed in Non-Patent Literature 2. (a) of FIG. 34 is a cross-sectional view of a directional coupler of the polarization beam splitter 201, along a cross section orthogonal to a light traveling direction. (b) and (c) of FIG. 34 each are a top view of the polarization beam splitter 201. The polarization beam splitter 201 includes a lower cladding 204, an upper cladding 205, and cores 202 and 203 which are buried by the lower cladding 204 and the upper cladding 205.

The polarization beam splitter 201 allows for multiplexing or separation of polarized waves by utilizing the following phenomenon: in a directional coupler, a coupling length for TM0 is shorter than a coupling length for TE0. More specifically, the polarization beam splitter 201 allows for multiplexing ((c) of FIG. 34) or separation ((b) of FIG. 34) of polarized waves by utilizing the following phenomenon: TM0 completely transfers over to an adjacent waveguide of a directional coupler before TE0 completely transfers over to the adjacent waveguide.

Patent Literature 1 relates to a polarization sorter, and can perform an operation equivalent to that of PBCs. Thus, the polarization sorter is taken as a conventional art of PBCs. The polarization sorter disclosed in Patent Literature 1 carries out polarization separation by mode sorting (adiabatic sorting) which utilizes an adiabatic conversion.

As illustrated in FIGS. 2a to 2c of Patent Literature 1, the polarization sorter in accordance with Patent Literature 1 includes two waveguides 12 and 14. The waveguides 12 and 14 are provided adjacent to each other, and have respective cores whose heights are different from each other. Further, the polarization sorter includes a mode sorting section 46 in which one of the cores has a width changing continuously along a light traveling direction. The mode sorter carries out polarization separation by mode sorting in the mode sorting section 46. The mode sorting here means a polarization separation method which utilizes the following phenomenon: a magnitude relation of effective refractive indexes and polarization are preserved when the waveguides are arranged to continuously change along the light traveling direction.

For example, a magnitude relation of effective refractive index between a TE polarized wave (TE-1 illustrated in FIG. 6 of Patent Literature 1) at an input port 30 of a waveguide 12 and a TE polarized wave (TE-2 illustrated in FIG. 6 of Patent Literature 1) at an input port 36 of a waveguide 14 is opposite to that between a TE polarized wave at an output port 32 of waveguide 12 and a TE polarized wave at an output port 34 of waveguide 14. Meanwhile, a magnitude relation of effective refractive index between a TM polarized wave (TM-1 illustrated in FIG. 6 of Patent Literature 1) at the input port 30 of the waveguide 12 and a TM polarized wave at the input port 36 of the waveguide 14 (TM-2 illustrated in FIG. 6 of Patent Literature 1) is the same as that between a TM polarized wave at the output port 32 of the waveguide 12 and a TM polarized wave at the output port 34 of the waveguide 14.

When the above magnitude relation of effective refractive index is satisfied, the TE polarized wave having been introduced through the input port 30 of the waveguide 12 is outputted through the output port 34 of the waveguide 14 while the TM polarized wave having been introduced through the input port 30 of the waveguide 12 is outputted through the output port 32 of the waveguide 12. In this way, the polarization sorter of Patent Literature 1 carries out polarization separation of the TE polarized wave and the TM polarized wave which have been introduced through the input port 30 of the waveguide 12.

In order to satisfy the above-described magnitude relation of effective refractive index, in the polarization sorter, cross-sectional shapes of respective cores of the two adjacent waveguides 12 and 14 cannot be congruent all along an entire device length of the polarization sorter. Therefore, as illustrated in FIGS. 2a to 2c of Patent Literature 1, the waveguides 12 and 14 adjacent to each other have different heights, respectively.

CITATION LIST

Patent Literature

[Patent Literature 1] Specification of US Patent Application Publication No. 2008/0152277 (Publication Date: Jun. 26, 2008)

Non-Patent Literatures

[Non-patent Literature 1] Po Dong, et al., "112-Gb/s Monolithic PDM-QPSK Modulator in Silicon," ECOC 2012 Th. 3. B. 1 (2012).
[Non-patent Literature 2] Hiroshi Fukuda, et al., "Ultrasmall polarization splitter based on silicon wire waveguides," OPTICS EXPRESS, Vol. 14, No. 25, 12401 (2006).
[Non-patent Literature 3] Allan W. Snyder and John D. Love, "Optical Waveguide Theory," CHAPMAN & HALL, London (First edition 1983, Reprinted 1991).
[Non-patent Literature 4] Yosi Shani, et al., "Integrated Optical Adiabatic Devices on Silicon," IEEE JOURNAL OF QUANTUM ELECTRONICS, VOL. 27, NO. 3 (1991).
[Non-patent Literature 5] Daoxin Dai, et al., "Mode conversion in tapered submicron silicon," OPTICS EXPRESS, Vol. 20, No. 12 (2012).

SUMMARY OF INVENTION

Technical Problem

A structure of the directional coupler of Non-Patent Literature 2 can be fabricated by a simple production process. However, the structure has problems in that loss largely depends on a wavelength and that the structure is susceptible to production errors.

In Non-Patent Literature 2, the length L of a portion where the two waveguides are adjacent to each other needs to be arranged to correspond to a coupling length of the TM polarized wave. The coupling length here means a length necessary for light to completely transfer over to an adjacent waveguide. For example, suppose a case where at a certain wavelength (hereinafter, referred to as "first wavelength"), the coupling length is Lc and L=Lc. In this case, the TM polarized wave having the first wavelength is at zero loss in principle.

However, when the wavelength shifts from the first wavelength to a second wavelength, a degree of leakage of light from a core of a waveguide is changed. This results in a change of strength in coupling to an adjacent wave guide. As a result, the coupling length at the second wavelength changes from the coupling length at the first wavelength. Consequently, when L=Lc, the TM polarized wave having the second wavelength does not completely transfer over to the adjacent waveguide, or the TM polarized wave having transferred over to the adjacent waveguide transfers back to the waveguide. Therefore, loss of the TM polarized wave having the second wavelength occurs at an output port. In other words, Non-Patent Literature 2 has a problem in that when a change in wavelength occurs, loss of the TM polarized wave increases in amount.

Further, when the height or the width of a core of a waveguide varies due to a production error, a degree of confinement of light of a TM polarized wave in a core changes. As a result, the coupling length is changed. This consequently causes a problem that as in a case where the wavelength changes, loss of the TM polarized wave increases as compared to a case where no production error occurs.

Patent Literature 1 has a problem that a production process is complex and the complex production process leads to an increase in cost and/or a decrease in yield.

In regard to a structure of Patent Literature 1, the mode sorting section 46 needs to satisfy the following two conditions so that mode sorting will be carried out.

Condition 1: There is a cross section where respective effective refractive indexes of two polarized waves (e.g., TE-1 and TE-2 illustrated in FIG. 6 of Patent Literature 1) are the same, which two polarized waves have respective main components present along one direction and are guided in two adjacent waveguides, respectively.

Condition 2: Two polarized waves (e.g., TM-1 and TM-2 illustrated in FIG. 6 of Patent Literature 1), which have respective main components present along the other direction and are guided in the two adjacent waveguides, respectively, always have different effective refractive indexes, respectively.

In order to satisfy these conditions, Patent Literature 1 employs a configuration in which respective heights of the adjacent waveguides are different from each other. In a case where such a waveguide structure is produced, the number of times of core etching increases for changing the heights. For example, in the case of a silicon waveguide, a core can be formed by etching a silicon layer that is a topmost layer of an SOI (Silicon-On-Insulator) wafer. However, in a case where cores are to be fabricated so as to have respective heights that are different from each other, etching needs to be carried out at least two times. Such an additional process results in cost increase and becomes a new factor that may cause a production error which consequently leads to deterioration in yield. Therefore, such an additional process is not preferable.

Note that the following is the reason why the above conditions 1 and 2 cannot be satisfied by one etching. In a case where cores are fabricated by one etching, respective heights of the cores become identical to each other. In order to satisfy the condition 1 in this case, it is necessary to make widths of the cores of two adjacent waveguides equal to each other at a cross section, in other words, it is necessary to make shapes of the cores congruent at the cross section. This is for the following reason. In a case where the cores have different widths, respectively, degrees of confinement of light in the cores are different from each other, so that respective polarized waves, which have respective main component present along the one direction and are guided in two adjacent waveguides, respectively, have different effective refractive indexes. As a result, the condition 1 is never satisfied. However, in a case where the above condition 1 is satisfied by making shapes of the cores congruent as described above, not only the polarized waves subject to the condition 1 but also all polarized waves have the same effective refractive index. This makes it impossible to satisfy the above condition 2. Accordingly, in order to simultaneously satisfy both the conditions 1 and 2, the condition 1 needs to be satisfied by having a different waveguide structure in which, for example, respective heights of two adjacent wave guides are changed so as to be different from each other as described in Patent Literature 1. This requires another process in addition to one etching.

An embodiment of the present invention is attained in view of the above problems. An object of the present invention is to provide a substrate-type optical waveguide element and an optical modulator, each of which can suppress loss of a TM polarized wave to a low level in a wide wavelength range and can also be easily produced.

Solution to Problem

In order to solve the above problems, a substrate-type optical waveguide element in accordance with an aspect of the present invention includes: a lower cladding whose refractive index is $N_{cl1}$; a first core and a second core, refractive indexes of which are $N_{co}$ ($N_{co}>N_{cl1}$), the first core and the second core each being formed on the lower cladding; and an upper cladding whose refractive index is $N_{cl2}$ ($N_{co}>N_{cl2}$), the upper cladding being provided on the lower cladding so as to bury the first core and the second core, wherein: when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (A) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other, (B) the effective refractive indexes $N_{TE}@WG1$ and $N_{TM}@WG1$ satisfy a relation of $N_{TE}@WG1>N_{TM}@WG1$ all along the parallel-core section, (C) the effective refractive indexes $N_{TE}@WG2$ and $N_{TM}@WG2$ satisfy a relation of $N_{TE}@WG2>N_{TM}@WG2$ all along the parallel-core section, (D) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section, and (E) when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 5]

$$\text{RELATIVE REFRACTIVE INDEX DIFFERENCE} = \frac{1}{2}\left[1-\left(\frac{N_{cl}}{N_{co}}\right)^2\right]. \quad (a)$$

Note that the feature (E) above can be replaced by the following feature: "when $N_{cl}$ is a refractive index of a medium present in a space between the first core and the second core in the parallel core section, a relative refractive index difference defined by the following Formula (a) is 0.25 or higher".

In order to solve the above problem, a method, in accordance with an aspect of the present invention, for producing a substrate-type optical waveguide element including: a lower cladding whose refractive index is $N_{cl1}$; a first core and a second core, refractive indexes of which are $N_{co}$ ($N_{co}>N_{cl1}$), the first core and the second core each being formed on the lower cladding; and an upper cladding whose refractive index is; $N_{cl2}$ ($N_{co}>N_{cl2}$), the upper cladding being provided on the lower cladding so as to bury the first core and the second core, the method comprising the step of forming the first core and the second core such that the following conditions (1) to (4) are satisfied:

when (i) effective refractive indexes of a TB polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (1) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other; (2) the effective refractive indexes $N_{TE}@WG1$ and $N_{TM}@WG1$ satisfy a relation of $N_{TE}@WG1>N_{TM}@WG1$ all along the parallel-core section, while the effective refractive indexes $N_{TE}@WG2$ and $N_{TM}@WG2$ satisfy a relation of $N_{TE}@WG2>N_{TM}@WG2$ all along the parallel-core section; (3) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section; and (4) when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 7]

$$\text{RELATIVE REFRACTIVE INDEX DIFFERENCE} = \frac{1}{2}\left[1-\left(\frac{N_{cl}}{N_{co}}\right)^2\right]. \quad (a)$$

Advantageous Effects of Invention

An embodiment of the present invention provides a substrate-type optical waveguide element and an optical modulator, each of which can suppress loss of a TM polarized wave to a low level in a wide wavelength range and can also be easily produced.

Figure 2:
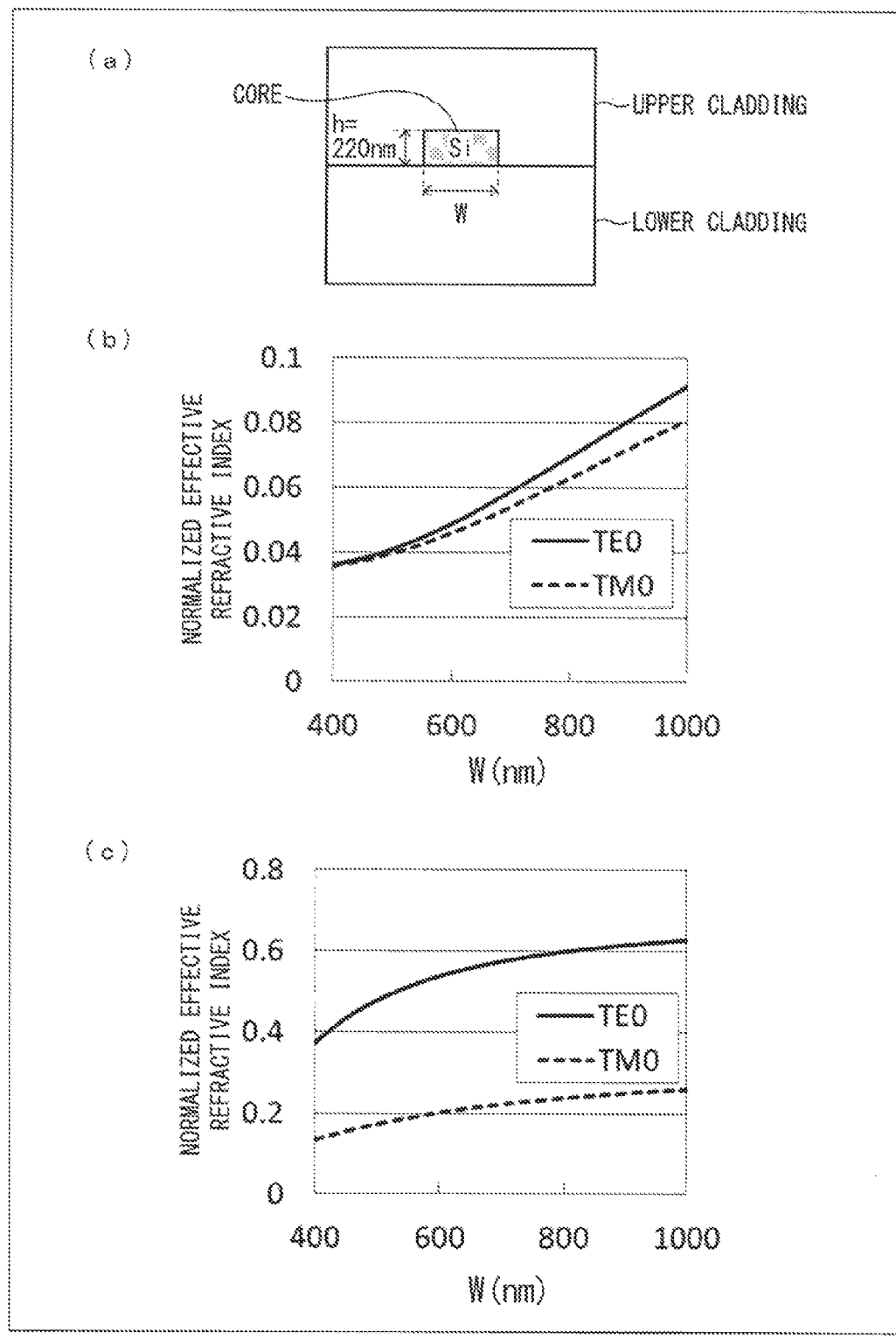

(a) of FIG. 2 is a cross-sectional view, illustrating a structure used for calculating effective refractive indexes of a core in Embodiment 1 of the present invention; (b) of FIG. 2 is a graph showing normalized effective refractive indexes obtained in a case where a relative refractive index difference in the structure illustrated in (a) of FIG. 2 is set to 5%; and (c) of FIG. 2 is a graph showing normalized effective refractive indexes obtained in a case where a difference in relative refractive index in the structure illustrated in (a) of FIG. 2 is set to 40%.

Figure 3:
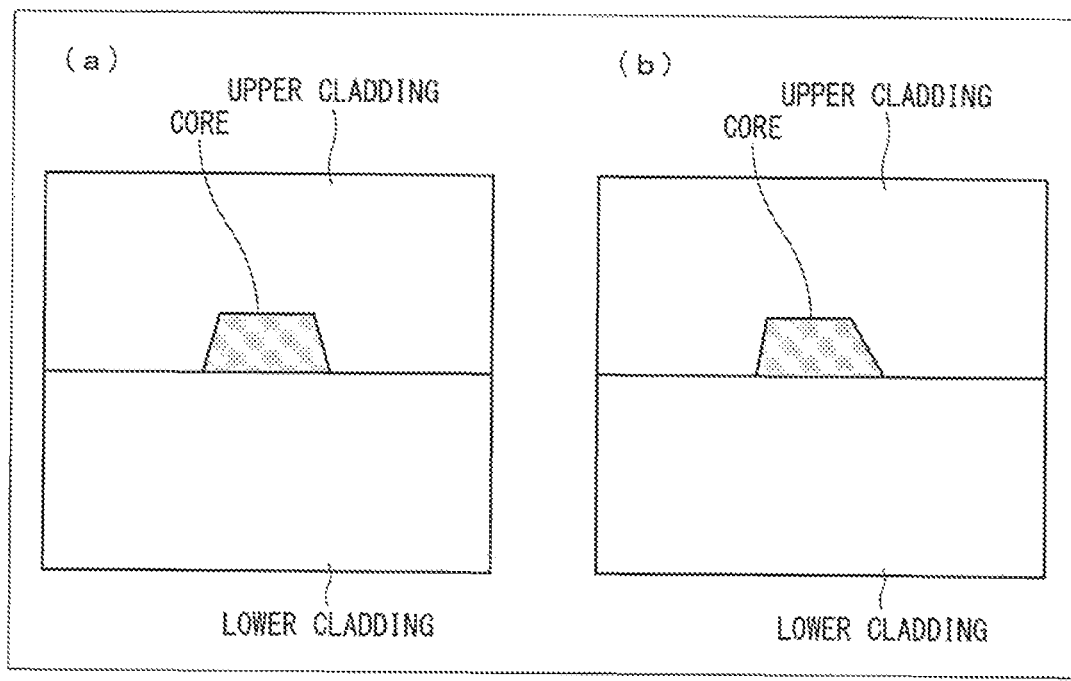

(a) and (b) of FIG. 3 are each a schematic view illustrating a shape of a core that can be formed in a case where the structure illustrated in (a) of FIG. 2 is produced in practice.

Figure 4:
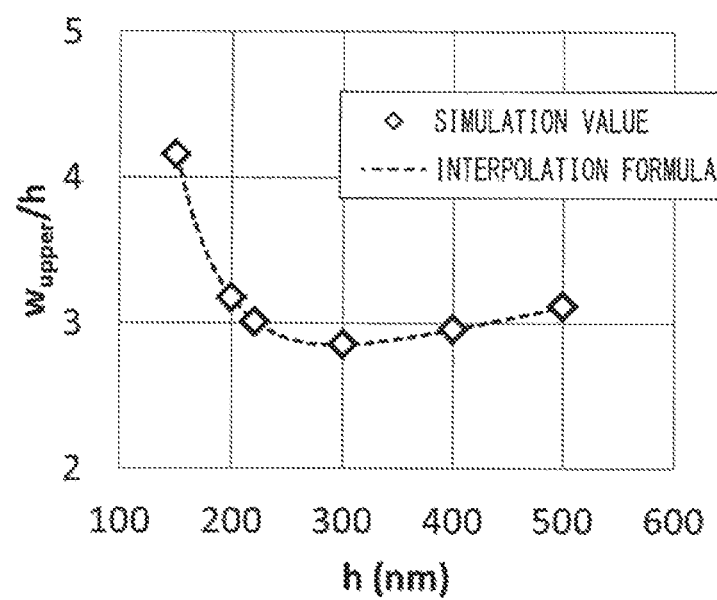

FIG. 4 is a graph showing a simulation result of $W_{upper}$ that is normalized by a height h of a core, with use of the structure illustrated in (a) of FIG. 2.

Figure 5:
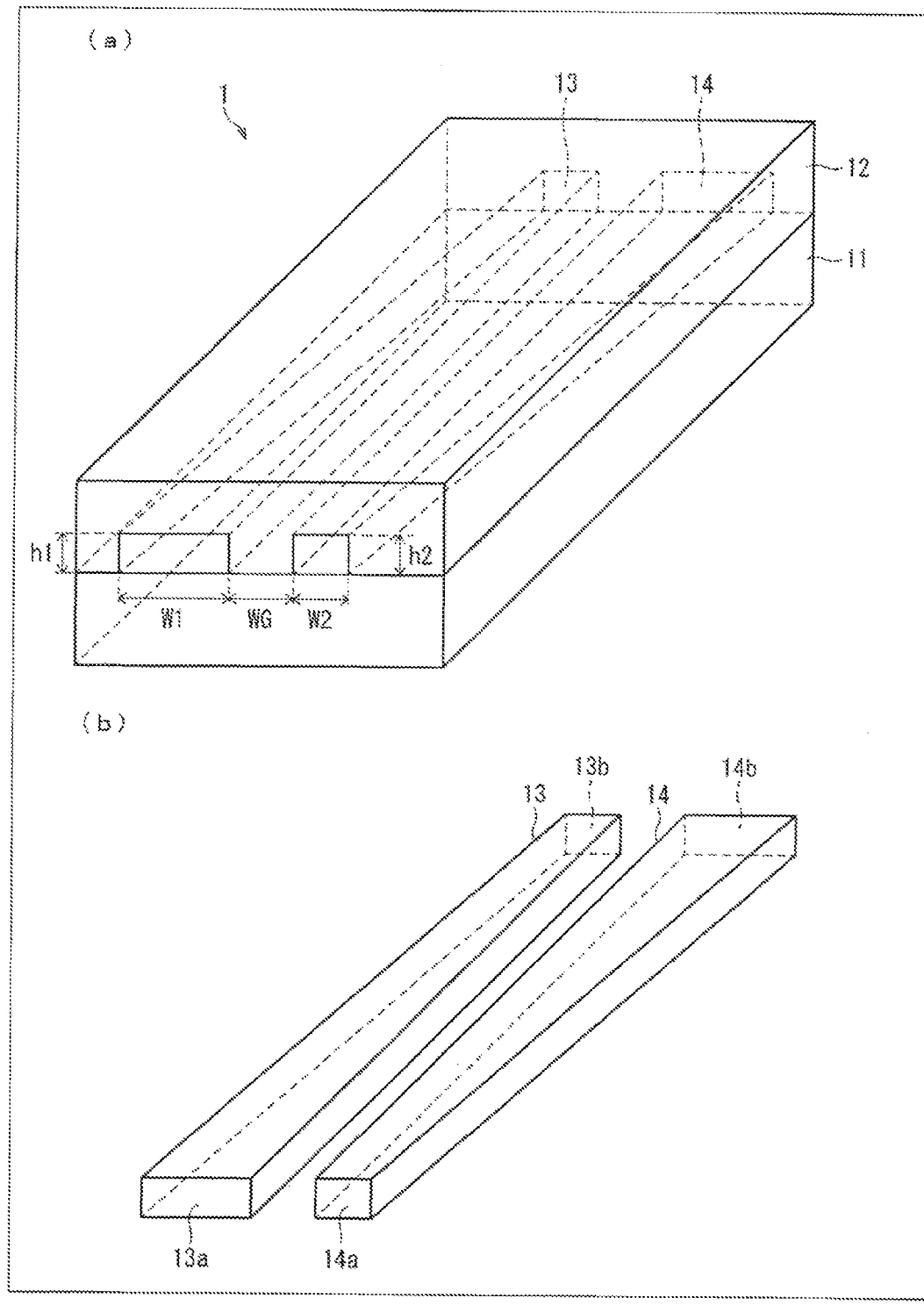

(a) of FIG. 5 is a perspective view illustrating a configuration of a PBC in accordance with Embodiment 1 of the present invention; and (b) of FIG. 5 is a perspective view illustrating a configuration of cores of the PBC illustrated in (a) of FIG. 5.

Figure 6:
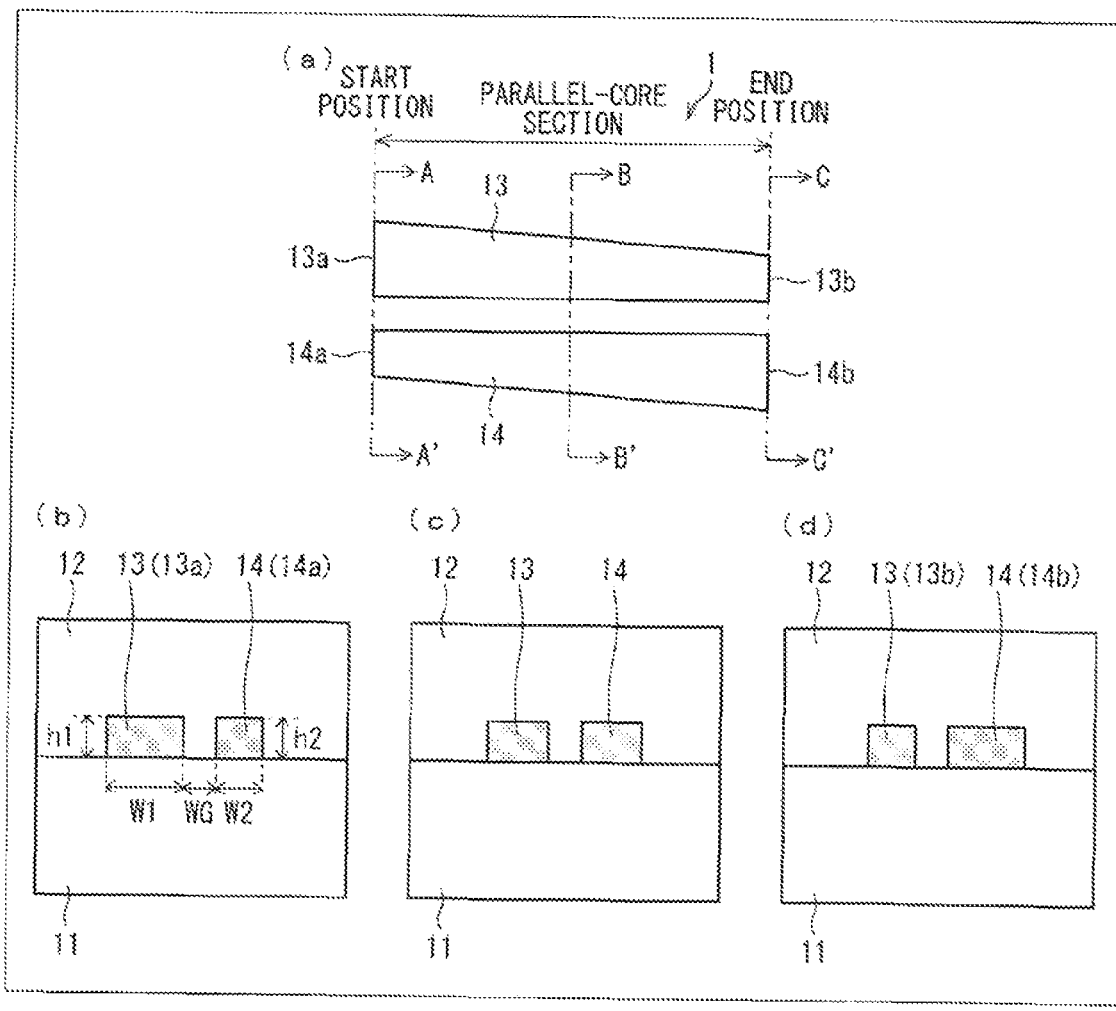

(a) of FIG. 6 is a top view illustrating a configurations of the PBC illustrated in FIG. 5; and (b) to (d) of FIG. 6 are cross-sectional views of the PBC taken along line A-A', line B-B' and line C-C' shown in (a) of FIG. 6, respectively.

Figure 7:
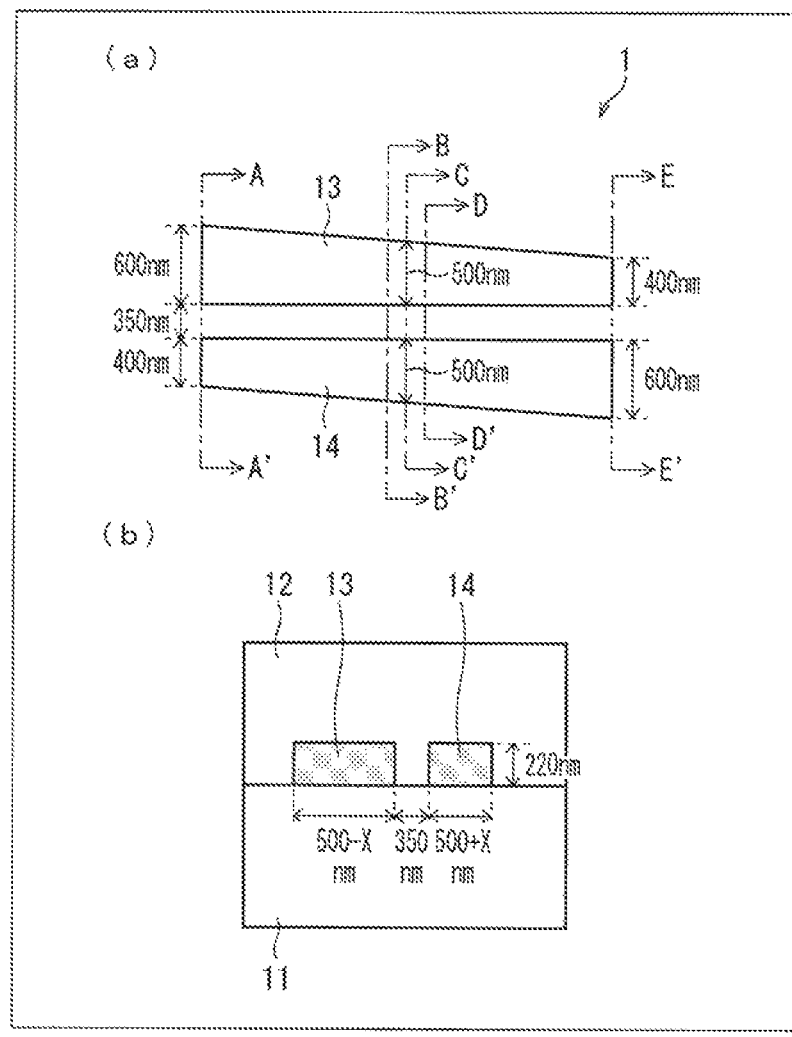

(a) of FIG. 7 is a top view illustrating a configuration of a PBC 1 in accordance with Example 1 of the present invention; and (b) of FIG. 7 is a cross-sectional view of a cross section orthogonal to a light traveling direction, in the PBC illustrated in (a) of FIG. 7.

Figure 8:
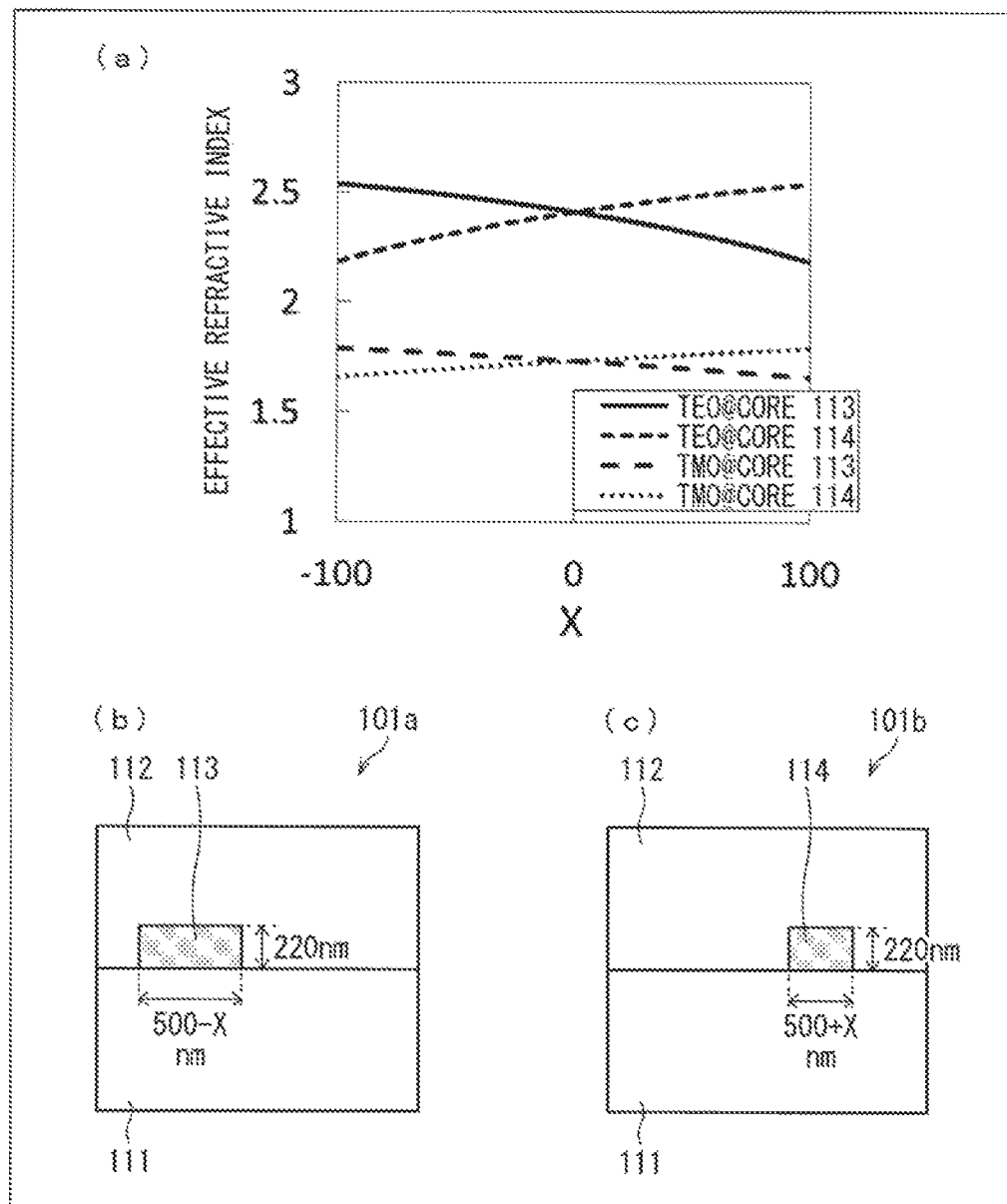

(a) of FIG. 8 is a graph showing a result of calculation of effective refractive indexes of a rectangular waveguide which does not include one of two cores (a rectangular waveguide which includes only one of two cores) of a PBC in accordance with Embodiment 1 of the present invention; (b) of FIG. 8 is a cross-sectional view illustrating a configuration of a rectangular waveguide which does not include a second core in the PBC illustrated in FIG. 7; and (c) of FIG. 8 is a cross-sectional view illustrating a configuration of a rectangular waveguide which does not include a first core in the PBC illustrated in FIG. 7.

Figure 9:
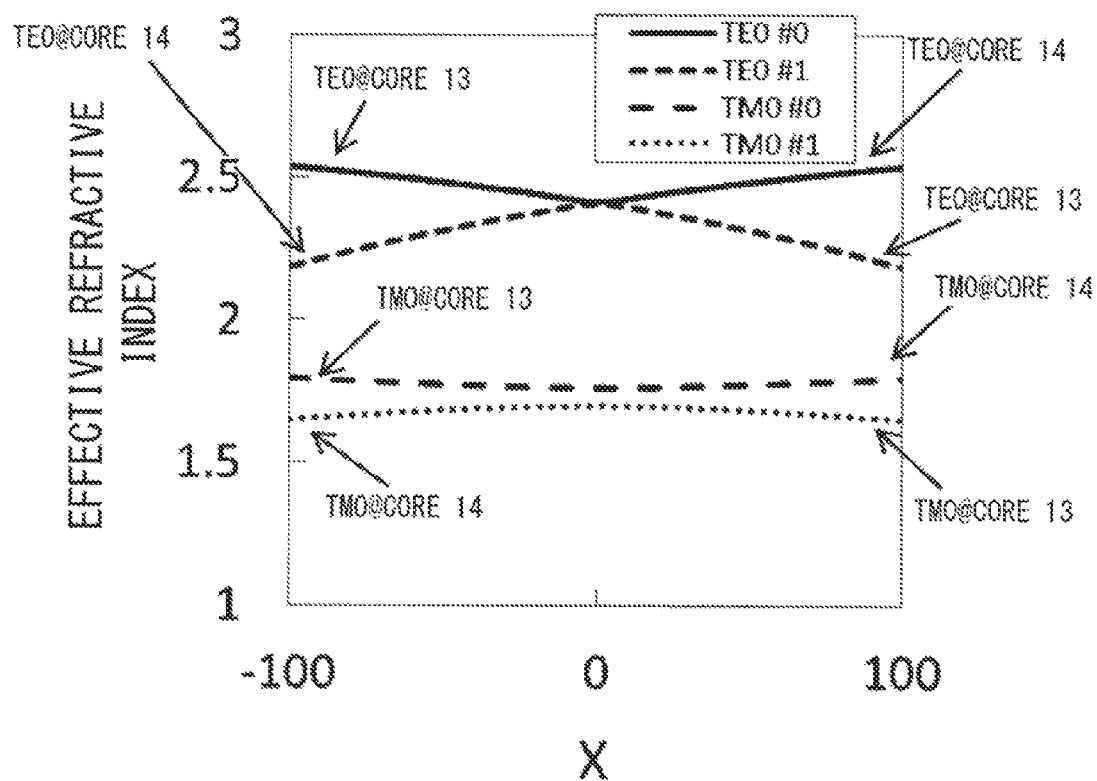

FIG. 9 is a graph showing a result of calculation of effective refractive indexes of waveguide modes at a cross section orthogonal to a light traveling direction in the PBC illustrated in FIG. 7.

Figure 10:
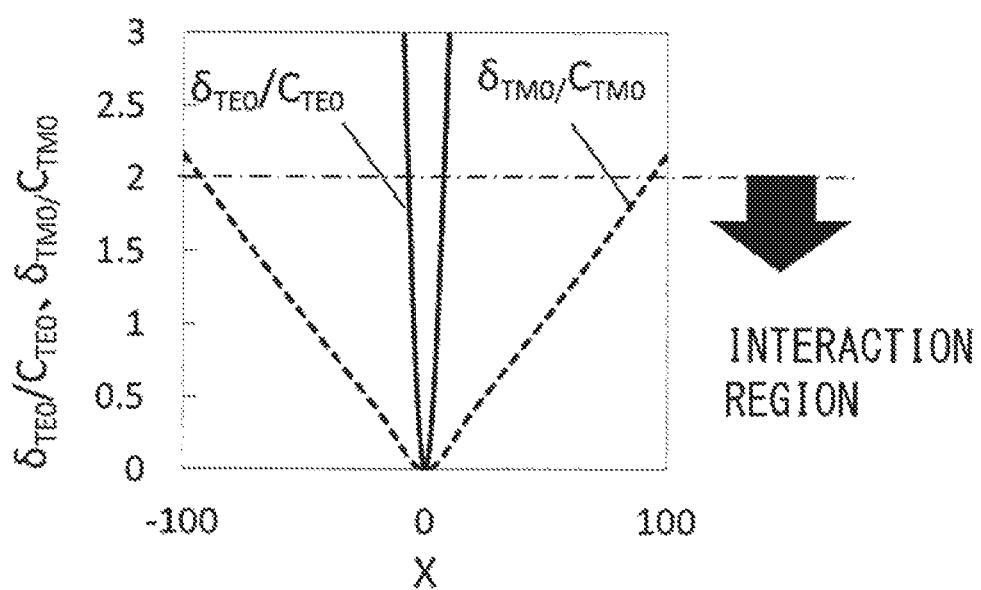

FIG. 10 is a graph showing $\delta_{TE0}/C_{TE0}$ and $\delta_{TM0}/C_{TM0}$ which are obtained in a case where X is varied from −100 to 100 in the PBC illustrated in FIG. 7.

Figure 11:
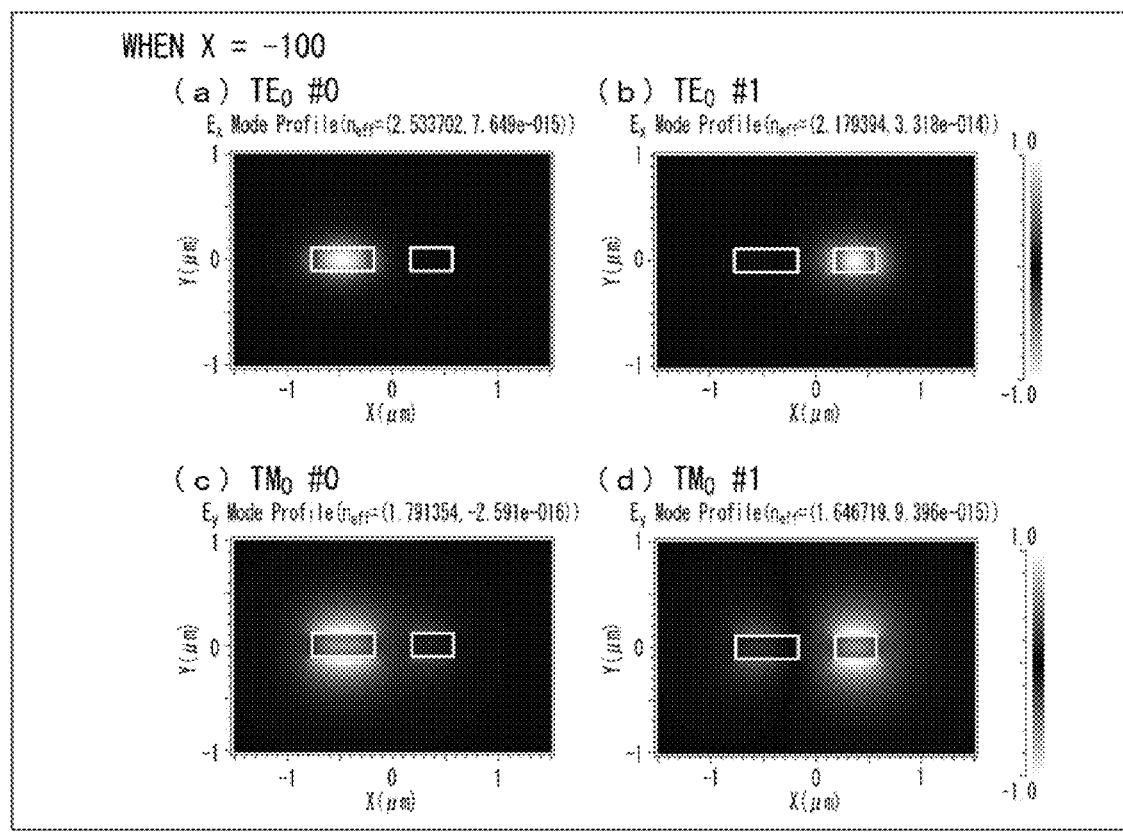

FIG. 11 is a graph showing a simulation result of respective electric field distributions of TE0 and TM0 at a cross section taken along line A-A' in the PBC illustrated in FIG. 7.

Figure 12:
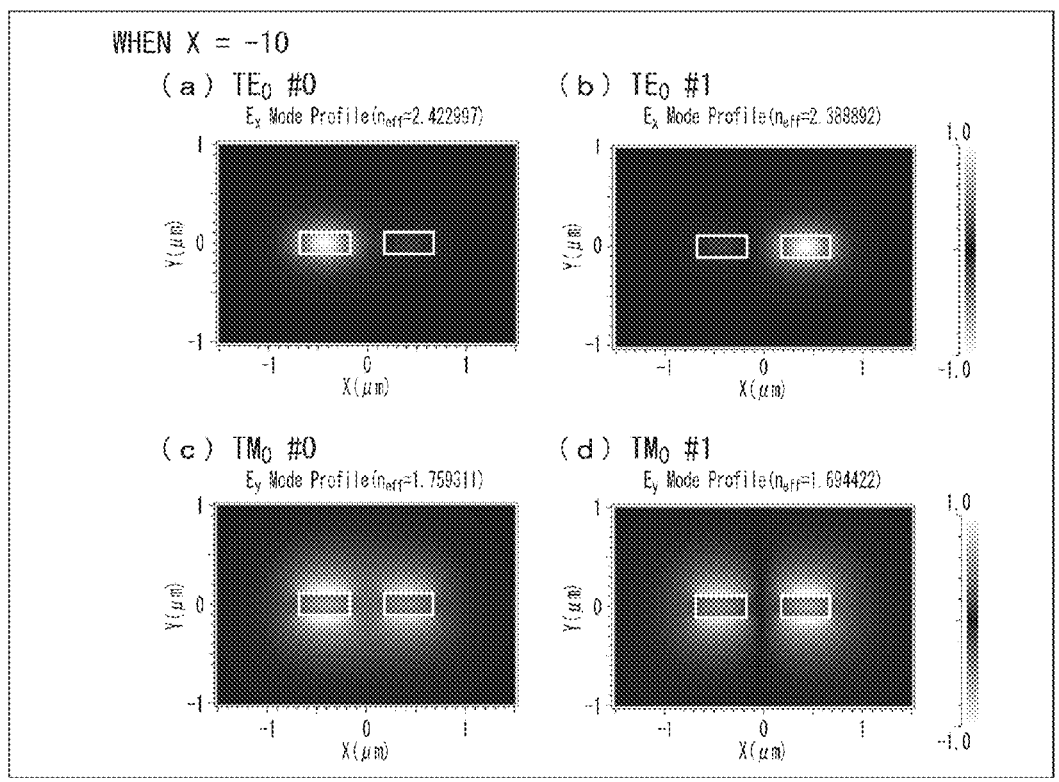

FIG. 12 is a graph showing a simulation result of respective electric field distributions of TE0 and TM0 at a cross section taken along line B-B' in the PBC illustrated in FIG. 7.

Figure 13:
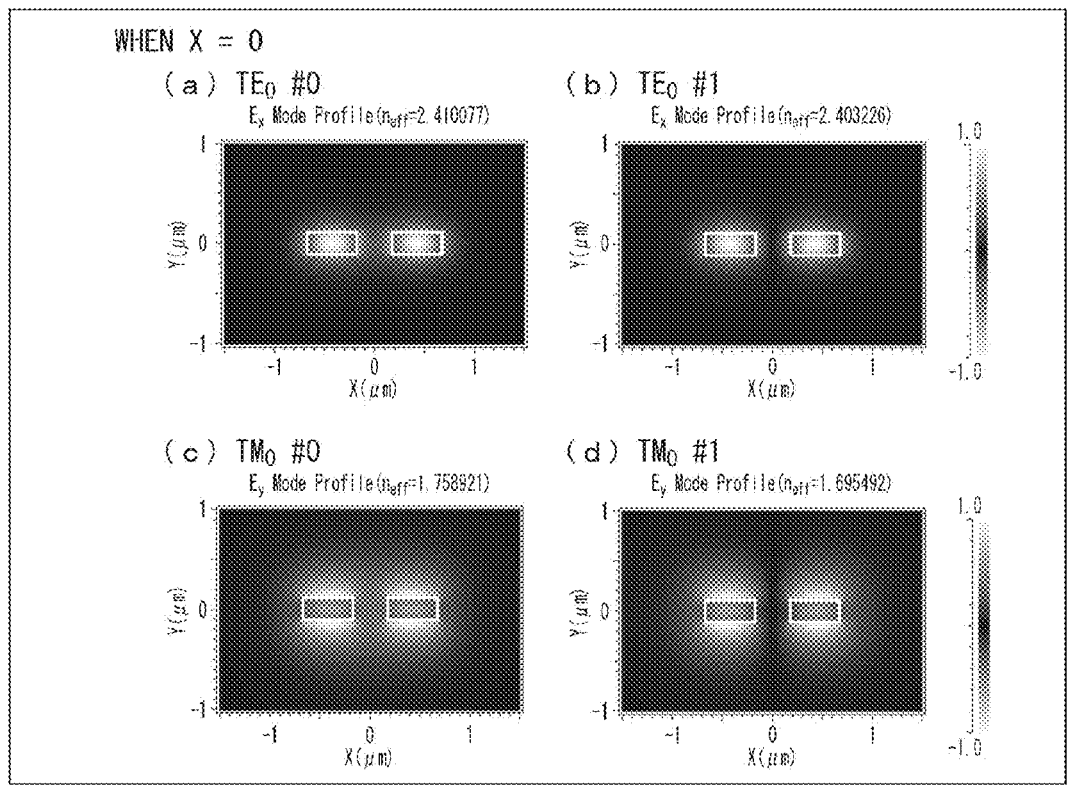

FIG. 13 is a graph showing a simulation result of respective electric field distributions of TE0 and TM0 at a cross section taken along line C-C' in the PBC illustrated in FIG. 7.

Figure 14:
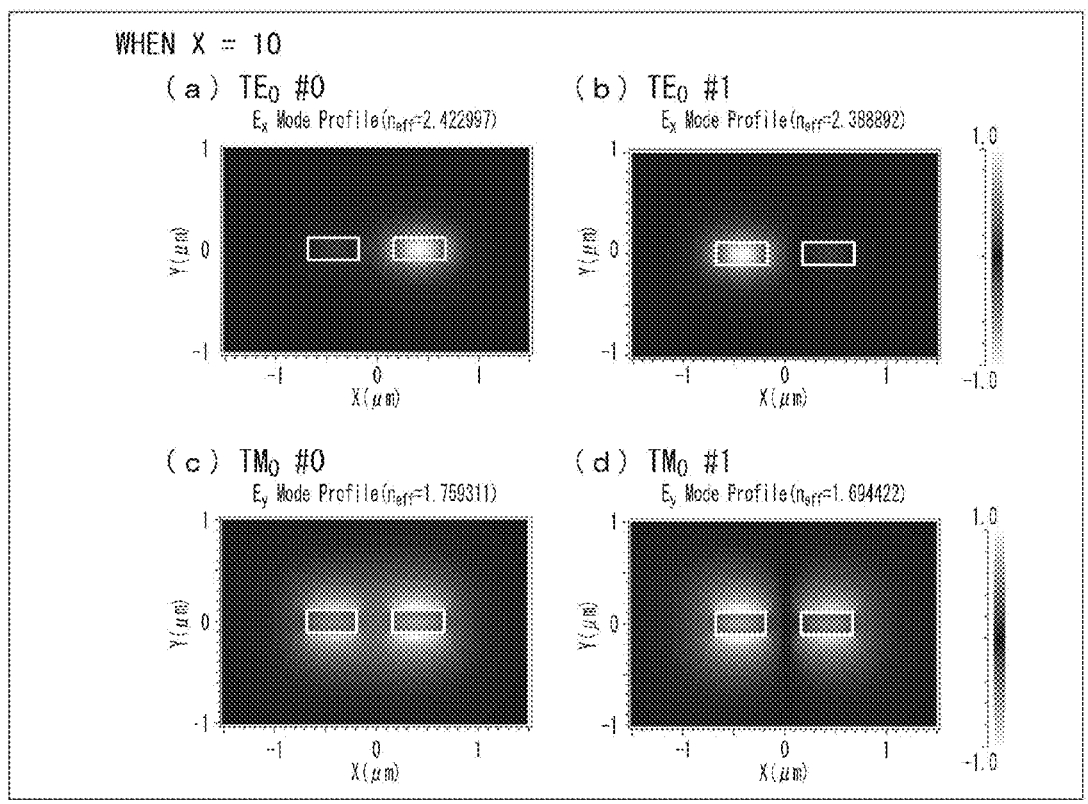

FIG. 14 is a graph showing a simulation result of respective electric field distributions of TE0 and TM0 at a cross section taken along line D-D' in the PBC illustrated in FIG. 7.

Figure 15:
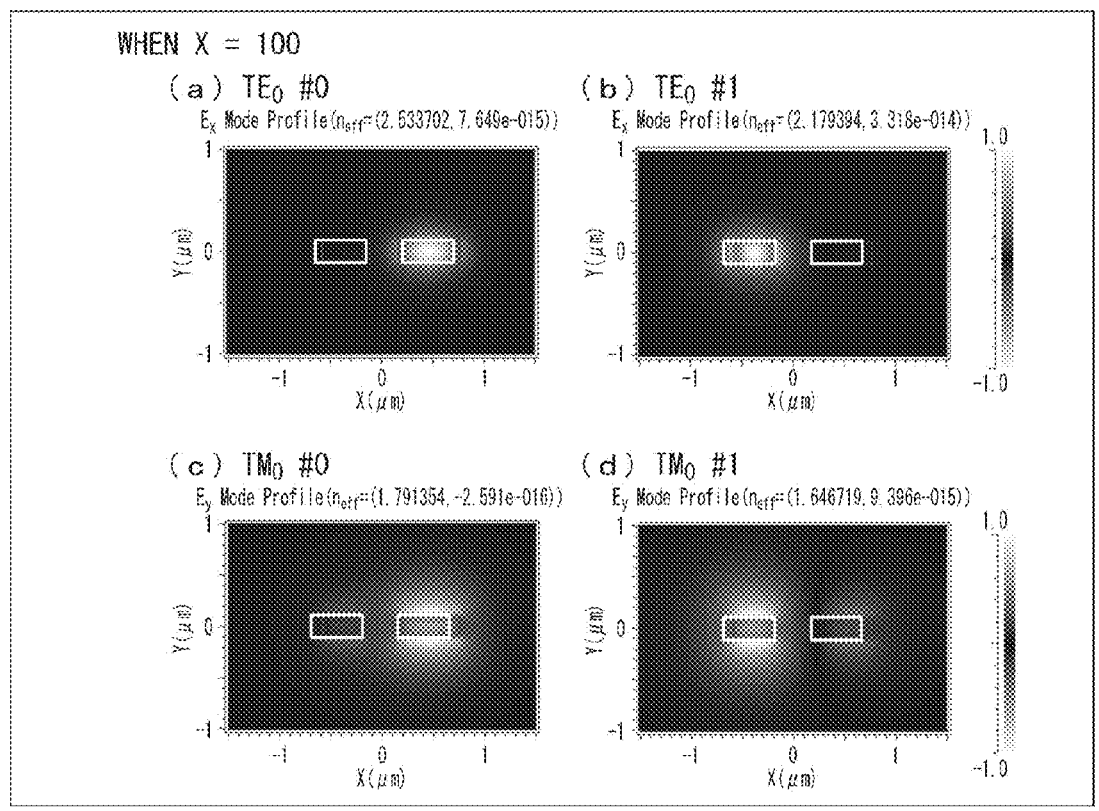

FIG. 15 is a graph showing a simulation result of respective electric field distributions of TE0 and TM0 at a cross section taken along line E-E' in the PBC illustrated in FIG. 7.

Figure 16:
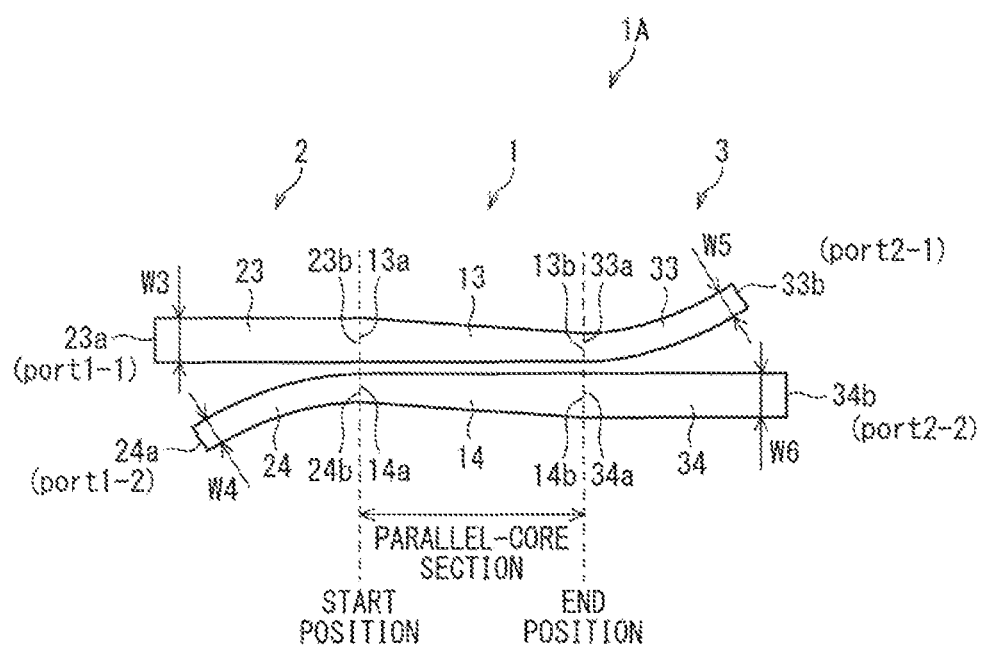

FIG. 16 is a top view illustrating a configuration of a PBC in accordance with Embodiment 2 of the present invention.

Figure 17:
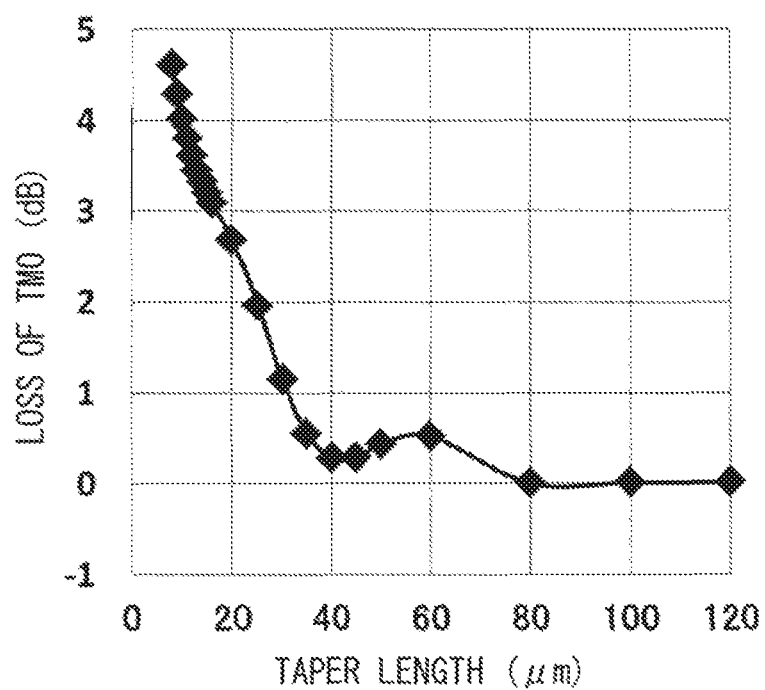

FIG. 17 is a graph showing a result of calculating, by FDTD, a loss of TM0 which is outputted through a port 2-2 in a case where TM0 is introduced into a port 1-1 of the PBC illustrated in FIG. 16.

Figure 18:
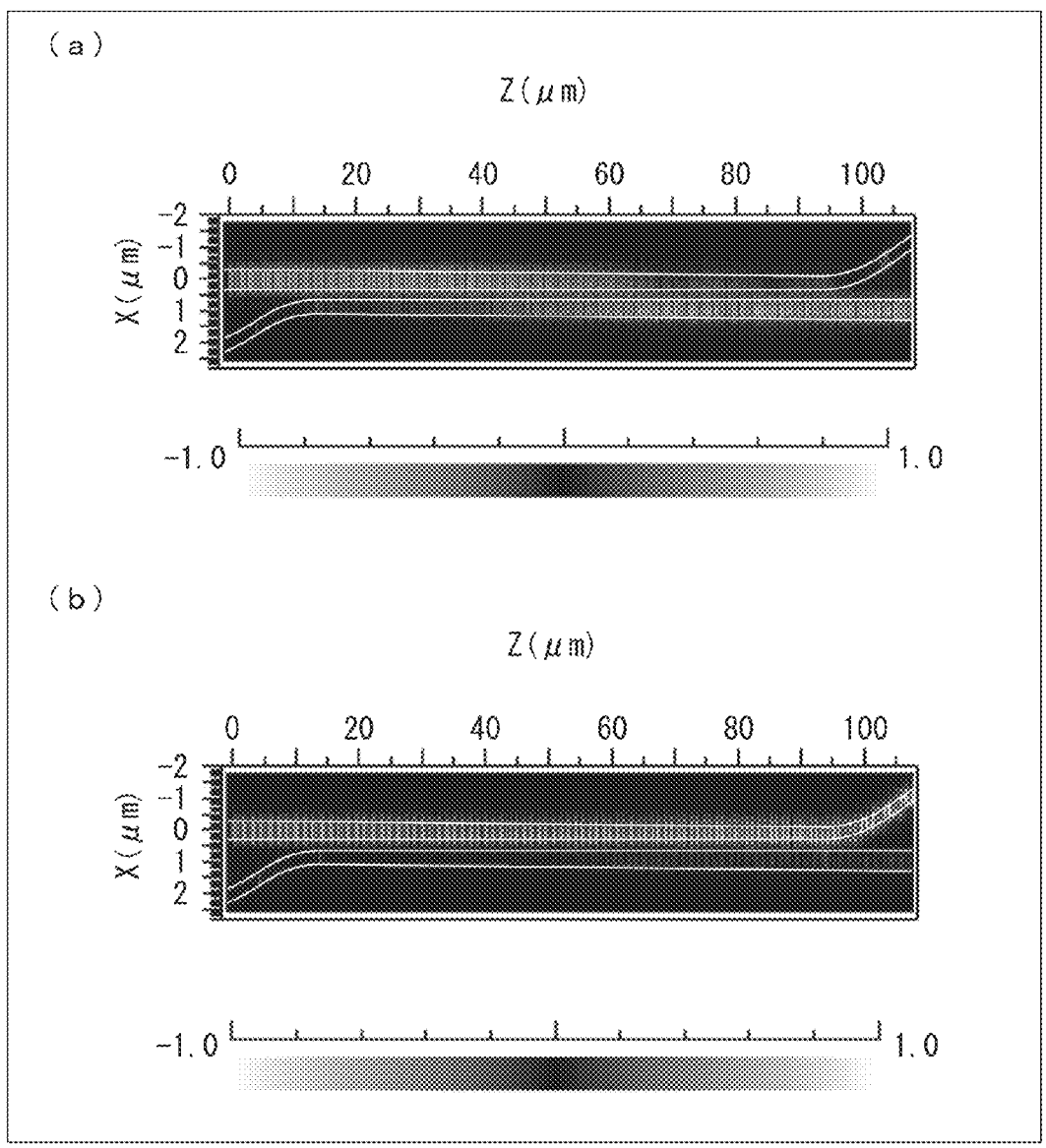

(a) of FIG. 18 is a graph showing a simulation result of an electric field distribution of an Ey component in a case where TM0 is introduced through the port 1-1 of the PBC illustrated in FIG. 16; and (b) of FIG. 18 is a graph showing a simulation result of an electric field distribution of an Ex component in a case where TE0 is introduced through the port 1-1.

Figure 19:
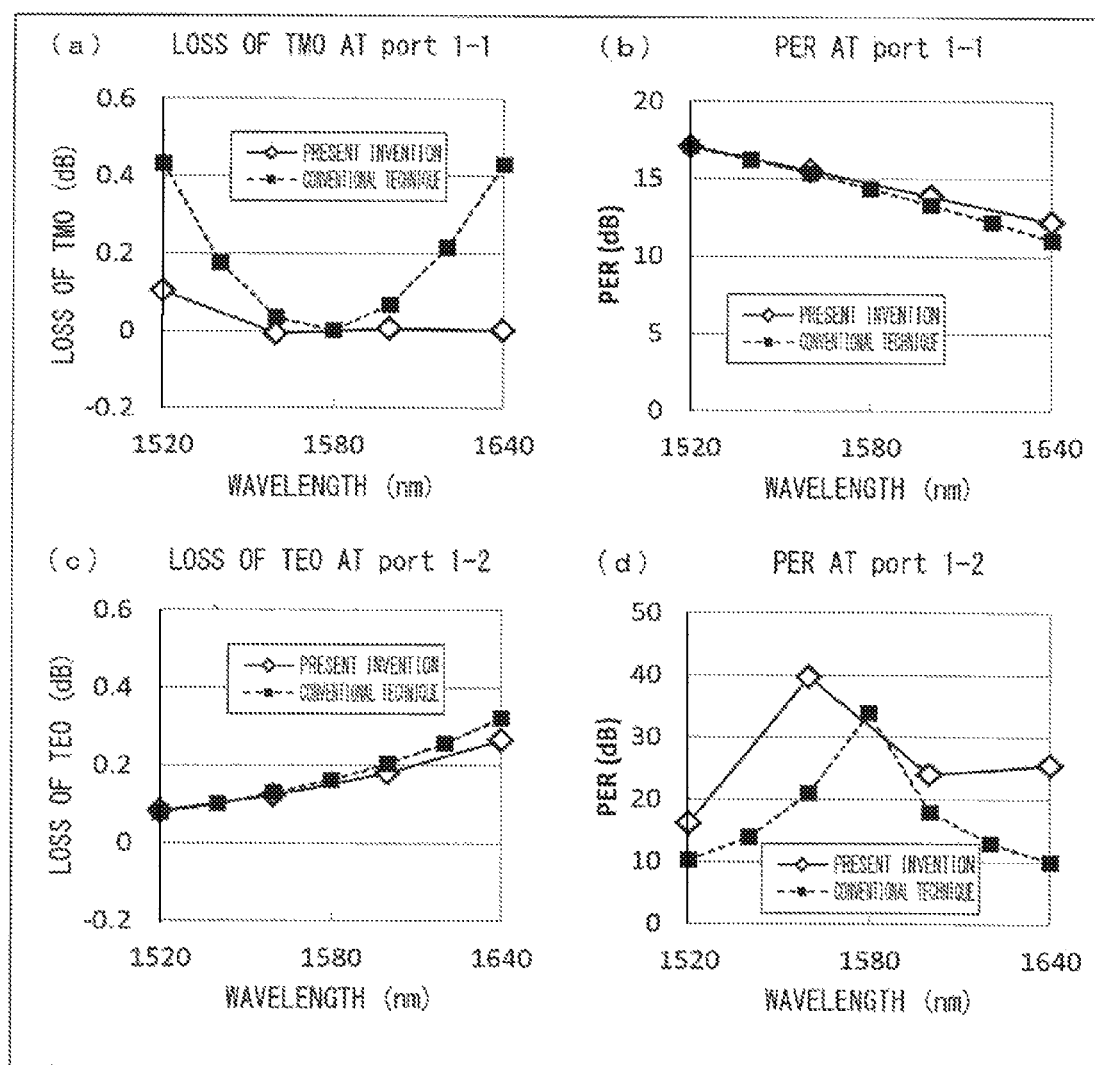
Figure 35:
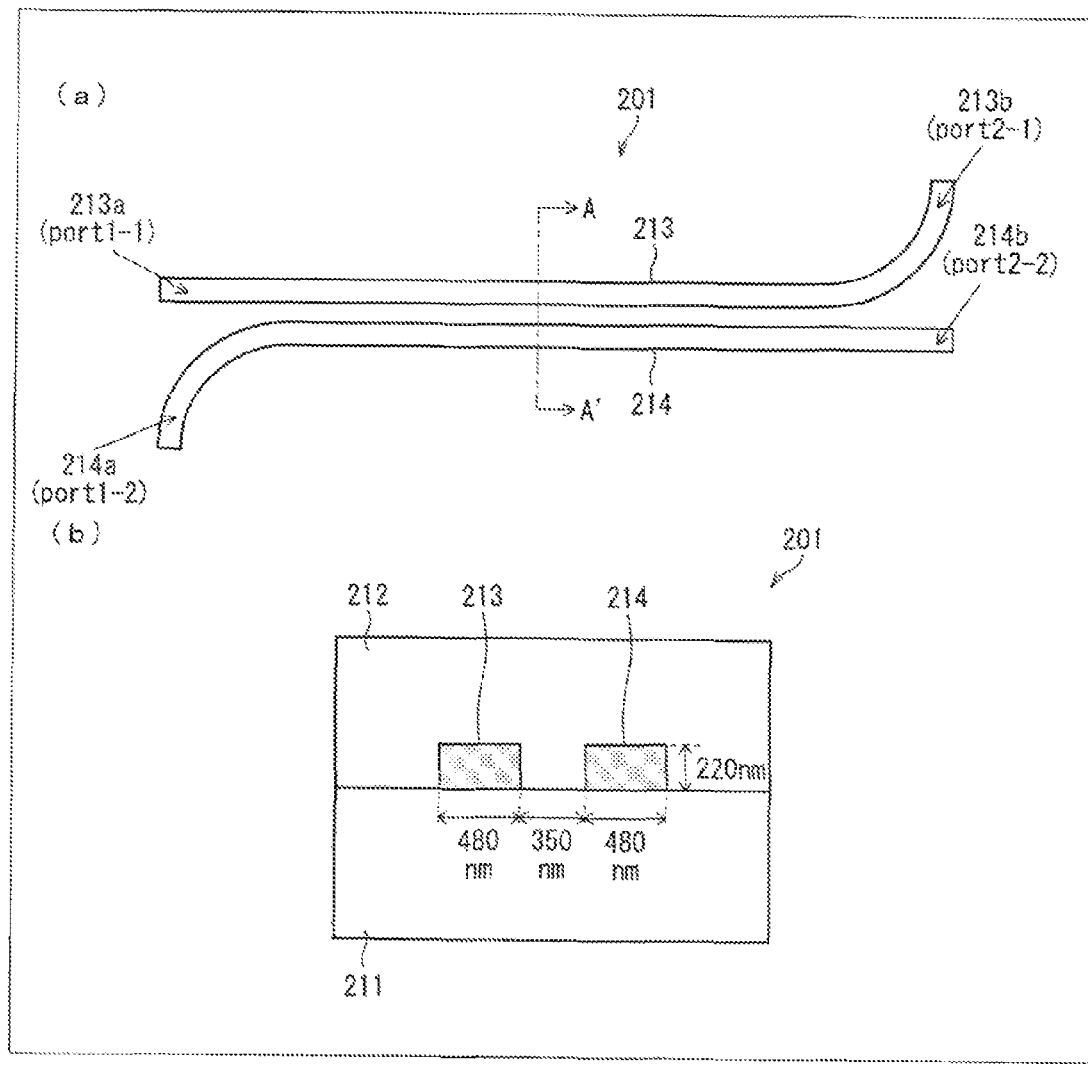

(a) of FIG. 19 is a graph showing a result of calculation of a loss of TM0 in a case where TM0 is introduced through the port 1-1 and outputted through the port 2-2 in each of the PBC illustrated in FIG. 16 and a PBC illustrated in FIG. 35; (b) of FIG. 19 is a graph showing a result of calculation of a PER that is a loss ratio of polarized waves of TE0 and TM0 outputted through the port 2-2 in a case where TE0 and TM0 are introduced through the port 1-1 in each of the PBC illustrated in FIG. 16 and the PBC illustrated in FIG. 35; (c) of FIG. 19 is a graph showing a result of calculation of a loss of TE0 in a case where TE0 is introduced through the port 1-2 and outputted through the port 2-2 in each of the PBC illustrated in FIG. 16 and the PBC illustrated in FIG. 35; and (d) of FIG. 19 is a graph showing a result of calculation of a PER that is a loss ratio of polarized waves of TE0 and TM0 outputted through the port 2-2 in a case where TE0 and TM0 are introduced through the port 1-2, in each of the PBC illustrated in FIG. 16 and the PBC illustrated in FIG. 35.

Figure 20:
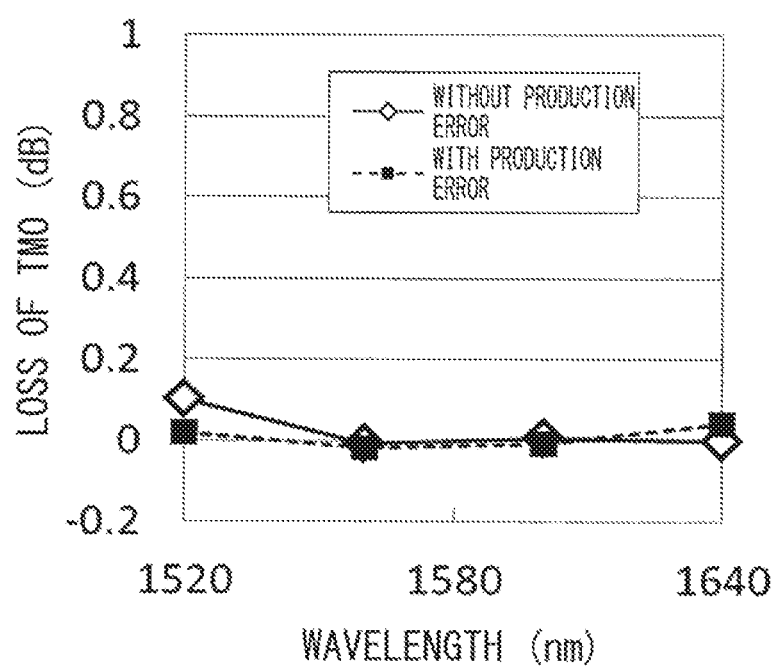

FIG. 20 is a graph showing a result of calculating, by FDTD, an influence of a production error on loss of TM0 in the PBC illustrated in FIG. 16.

Figure 21:
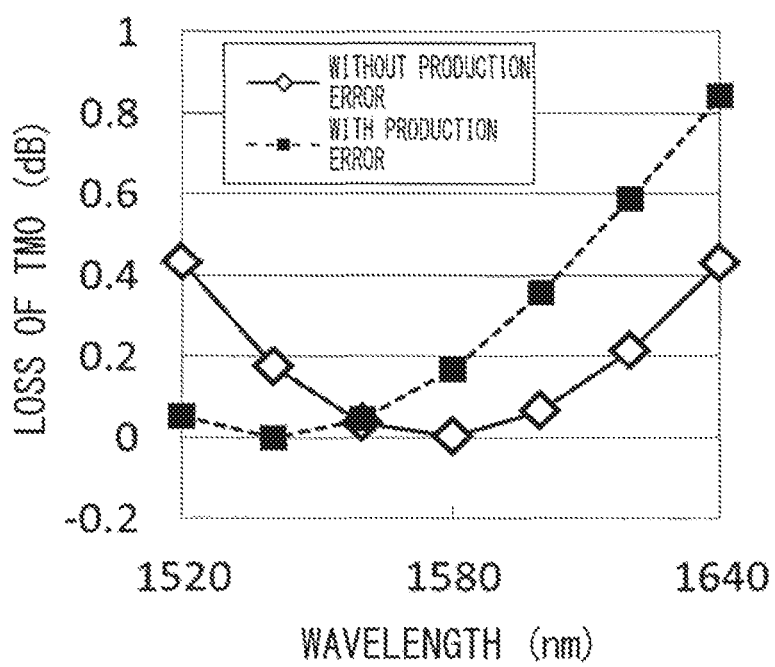

FIG. 21 is a graph showing a result of calculating, by FDTD, an influence of a production error on loss of TM0 in the PBC illustrated in FIG. 35.

Figure 22:
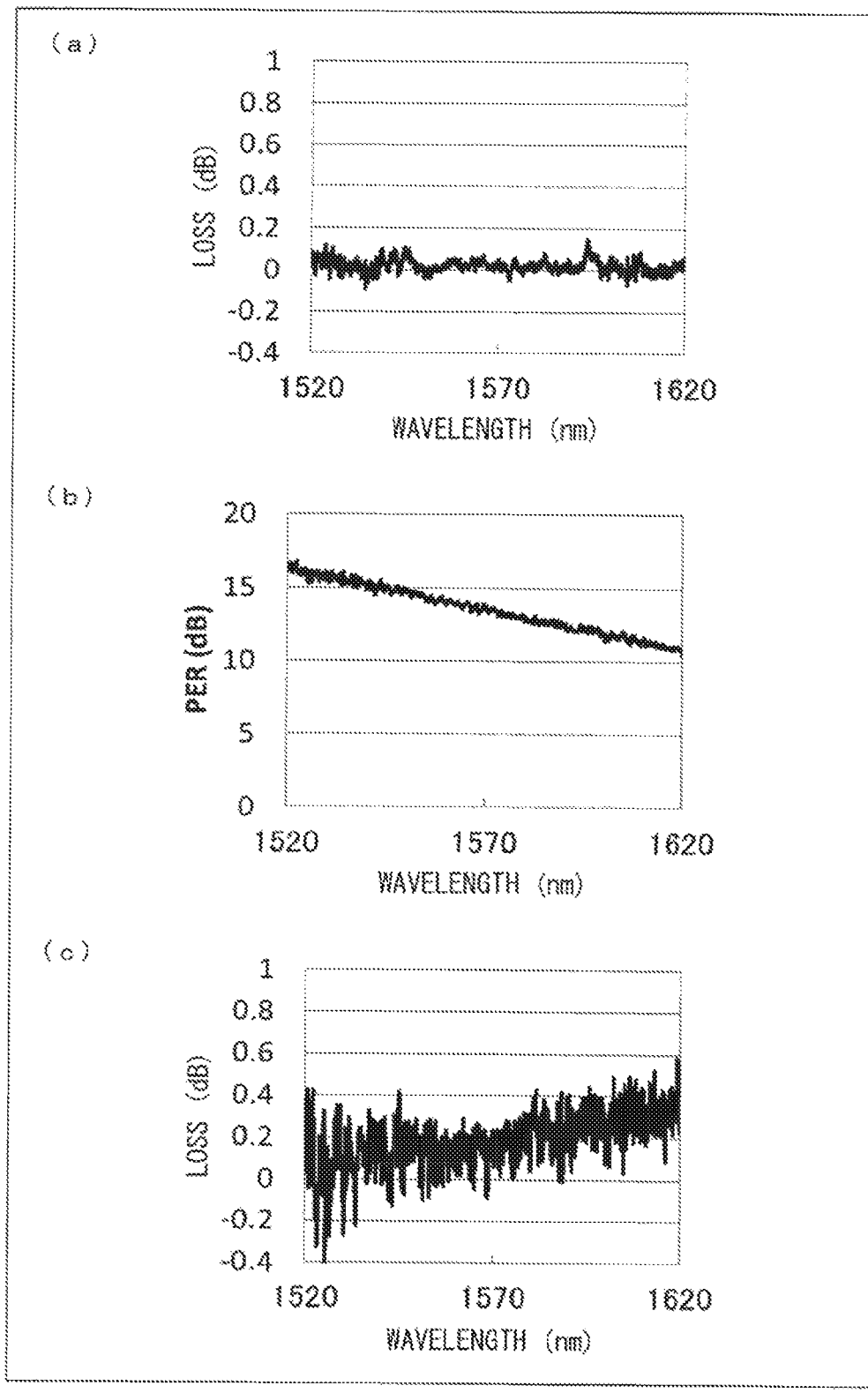

(a) of FIG. 22 is a graph showing a result of measurement of a loss in a case where TM0 is introduced into a port 1-1 and outputted through a port 2-2 in a PBC fabricated in one example of the present invention; (b) of FIG. 22 is a graph showing a result of measurement of a PER that is a loss ratio of polarized waves of TE0 and TM0 outputted through the port 2-2 in a case where TE0 and TM0 are introduced through the port 1-1 in the PBC fabricated in the one example of the present invention; and (c) of FIG. 22 is a graph showing a result of measurement of a loss in a case where TE0 is introduced into a port 1-2 and outputted through the port 2-2 in the PBC fabricated in the one example of the present invention.

Figure 23:
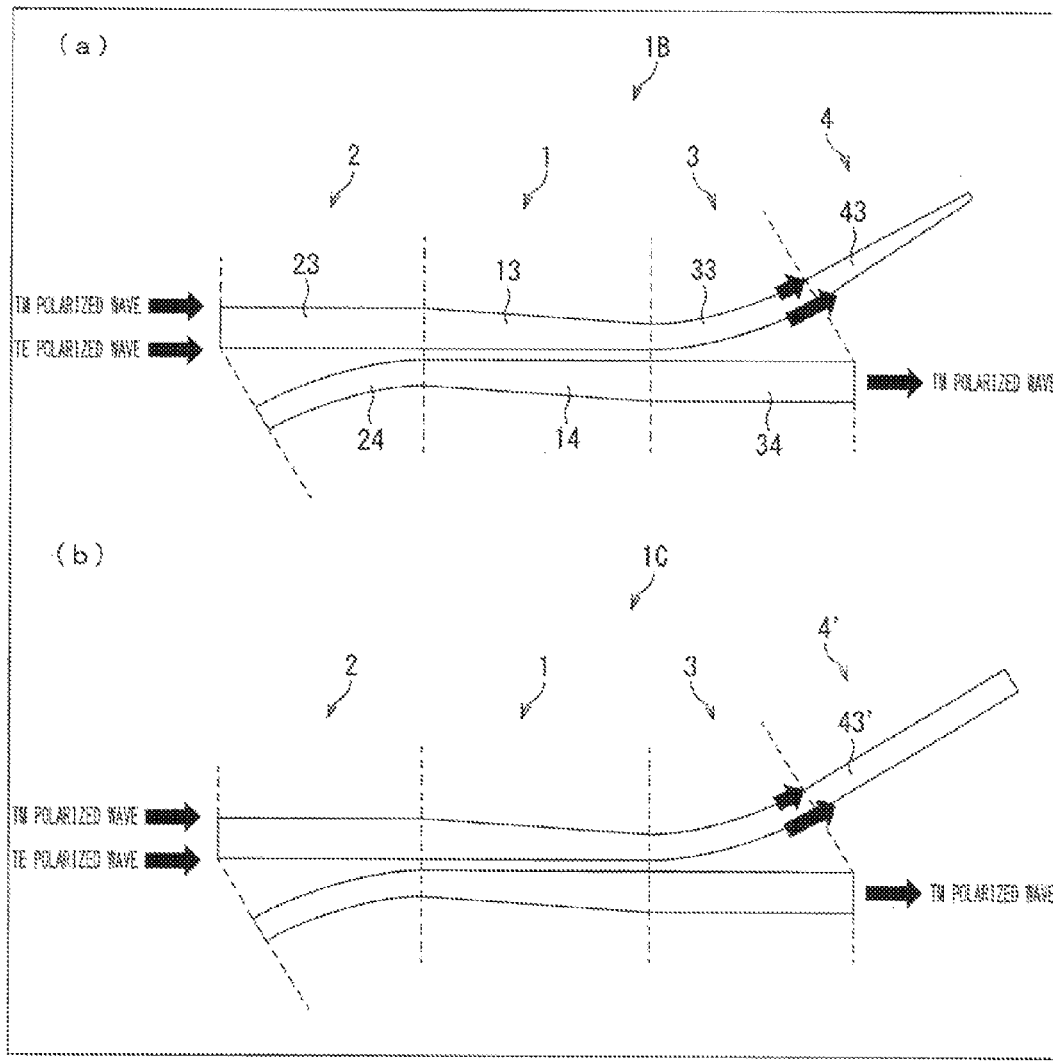

(a) of FIG. 23 is a top view illustrating a configuration of a PBC in accordance with Embodiment 3 of the present invention; and (b) of FIG. 23 is a top view illustrating a configuration of a PBC in accordance with a modification of Embodiment 3 of the present invention.

Figure 24:
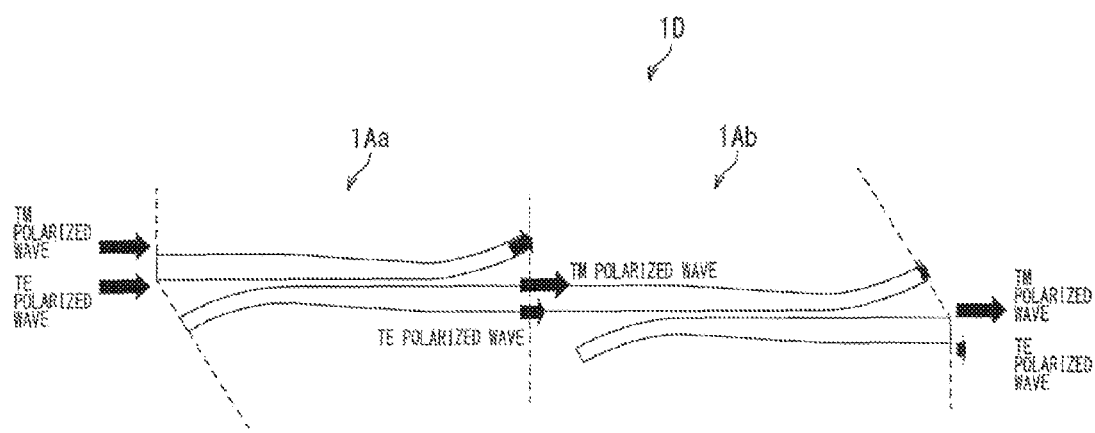

FIG. 24 is a top view illustrating a configuration of a polarizer in accordance with Embodiment 4 of the present invention.

Figure 25:
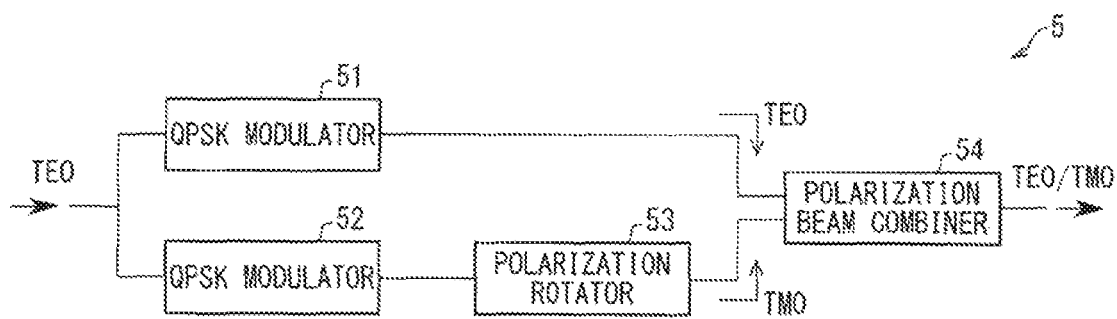

FIG. 25 is a block diagram illustrating a configuration of a modulator in accordance with Embodiment 5 of the present invention.

Figure 26:
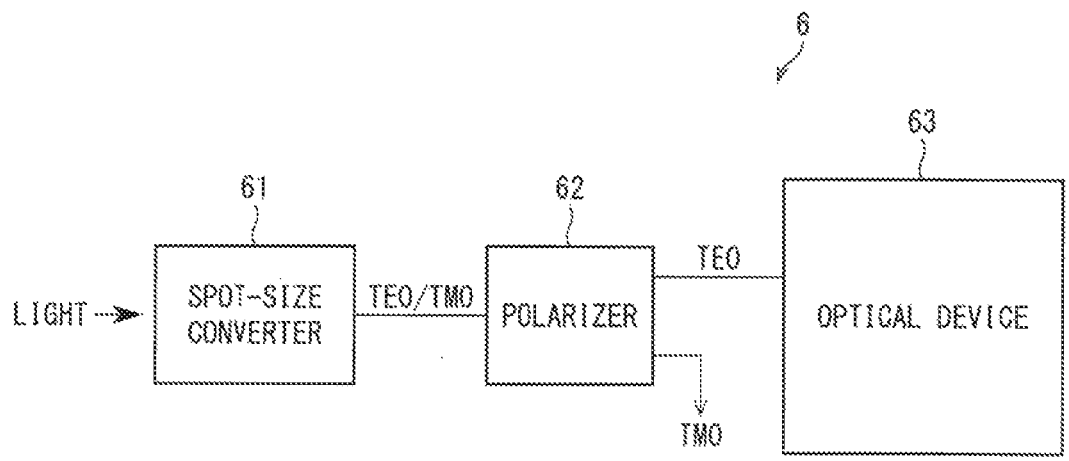

FIG. 26 is a block diagram illustrating a configuration of a substrate-type optical waveguide element in accordance with Embodiment 6 of the present invention.

Figure 27:
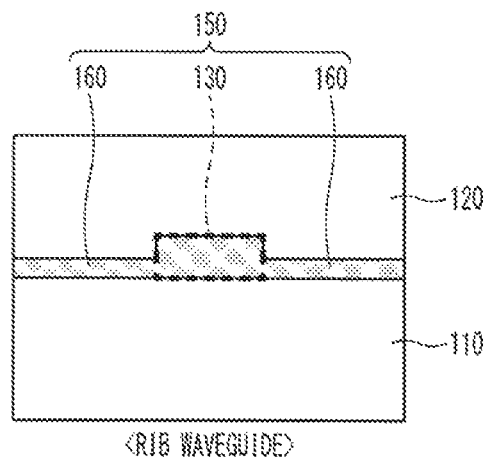

FIG. 27 is a cross-sectional view illustrating a basic form of a rib waveguide in accordance with Embodiment 7 of the present invention.

Figure 28:
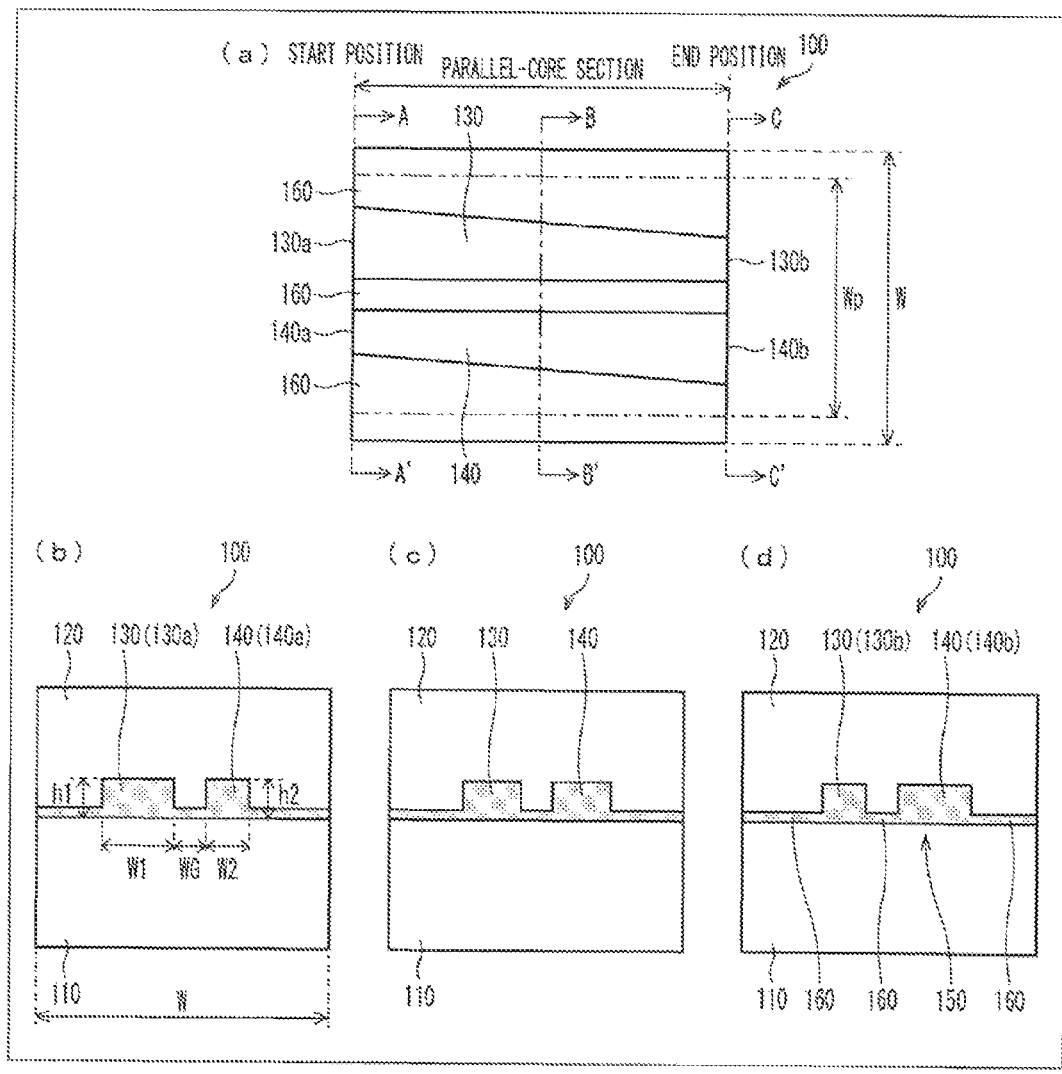

(a) of FIG. 28 is a top view illustrating a configuration of a PBC including the rib waveguide in accordance with Embodiment 7; and (b) to (d) of FIG. 28 are cross-sectional views of the PBC taken along line A-A', line B-B' and line C-C' shown in (a) of FIG. 28, respectively.

Figure 29:
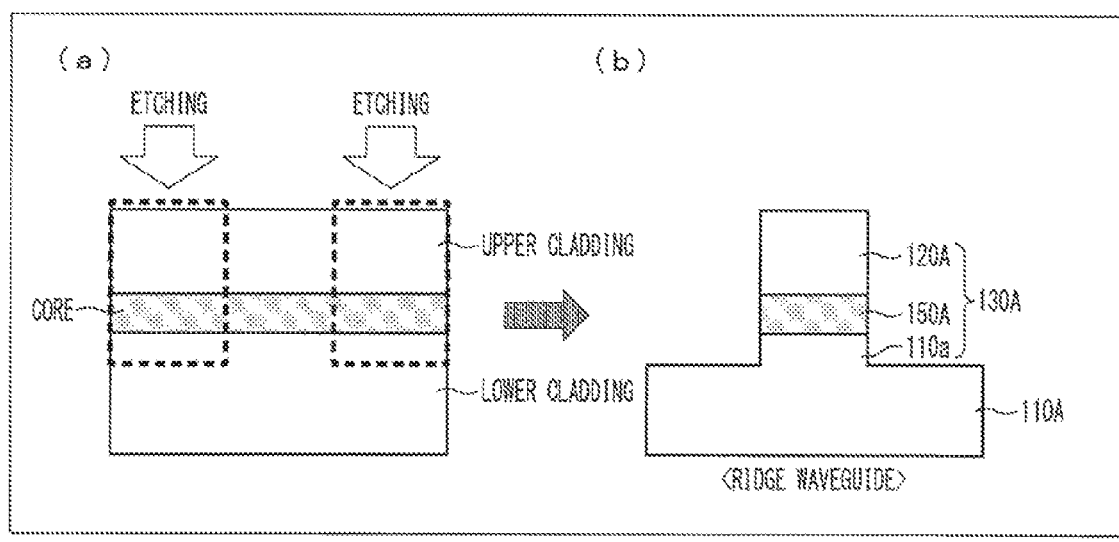

(a) of FIG. 29 is a cross-sectional view illustrating a method for fabricating a ridge waveguide in accordance with Embodiment 8 of the present invention; and (b) of FIG. 29 is a cross-sectional view illustrating a basic form of the ridge waveguide.

Figure 30:
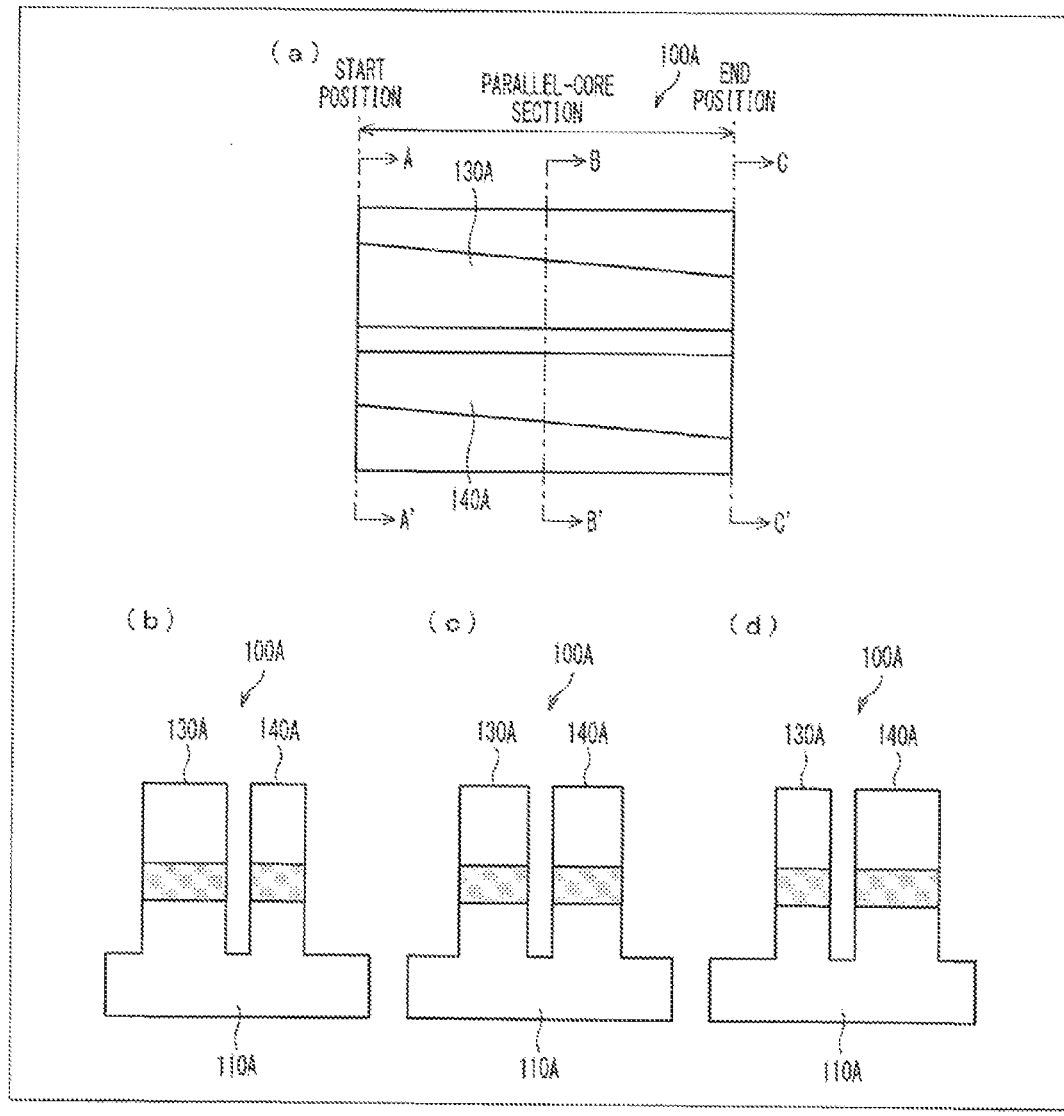

(a) of FIG. 30 is a top view illustrating a configuration of a PBC including the ridge waveguide in accordance with Embodiment 8; and (b) to (d) of FIG. 30 are cross-sectional views of the PBC taken along line A-A', line B-B' and line C-C' shown in (a) of FIG. 30, respectively.

Figure 31:
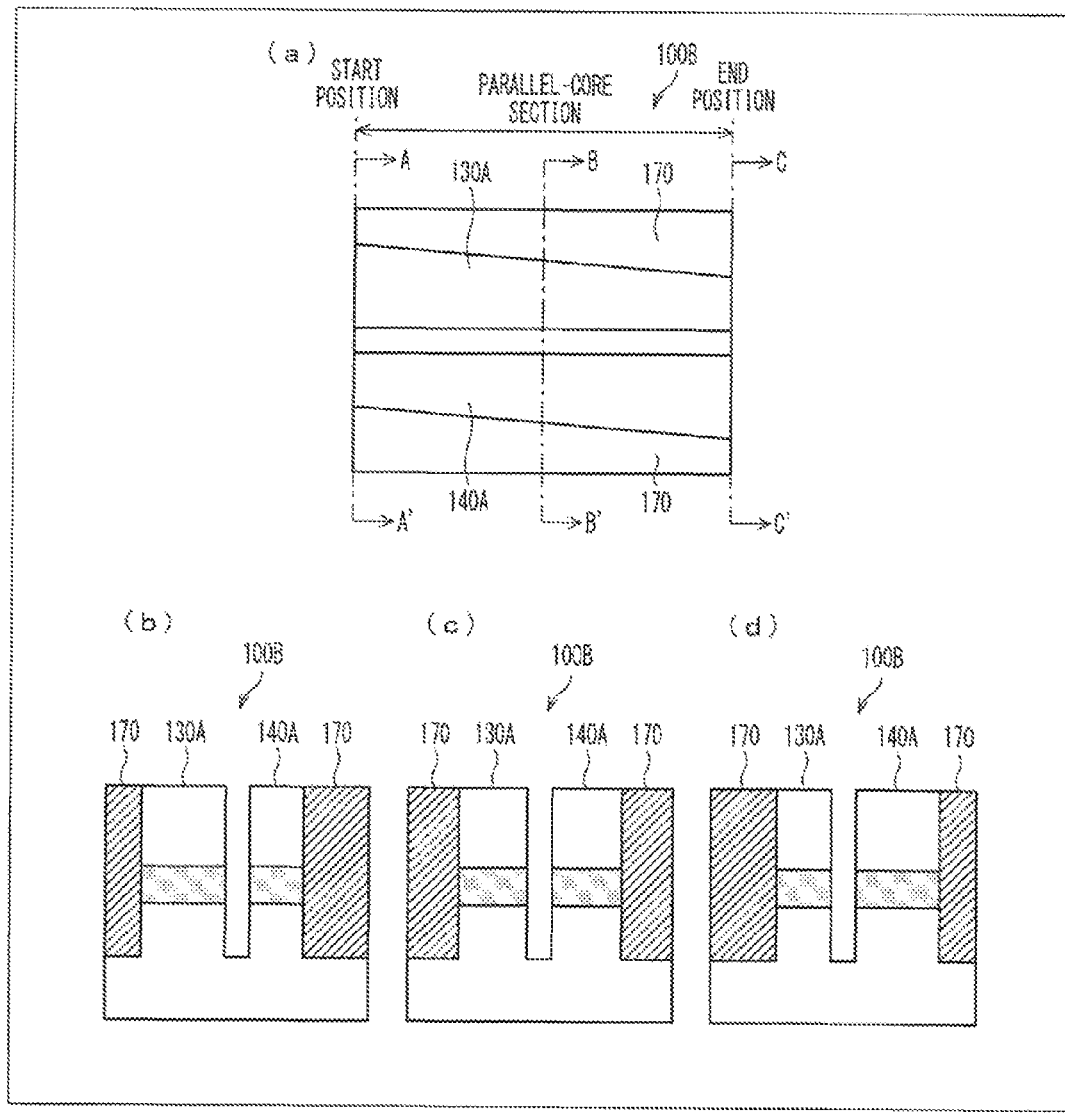

(a) of FIG. 31 is a top view illustrating a configuration of a PBC including a ridge waveguide as one modification of Embodiment 8; and (b) to (d) of FIG. 31 are cross-sectional views of the PBC taken along line A-A', line B-B' and line C-C' shown in (a) of FIG. 31, respectively.

Figure 32:
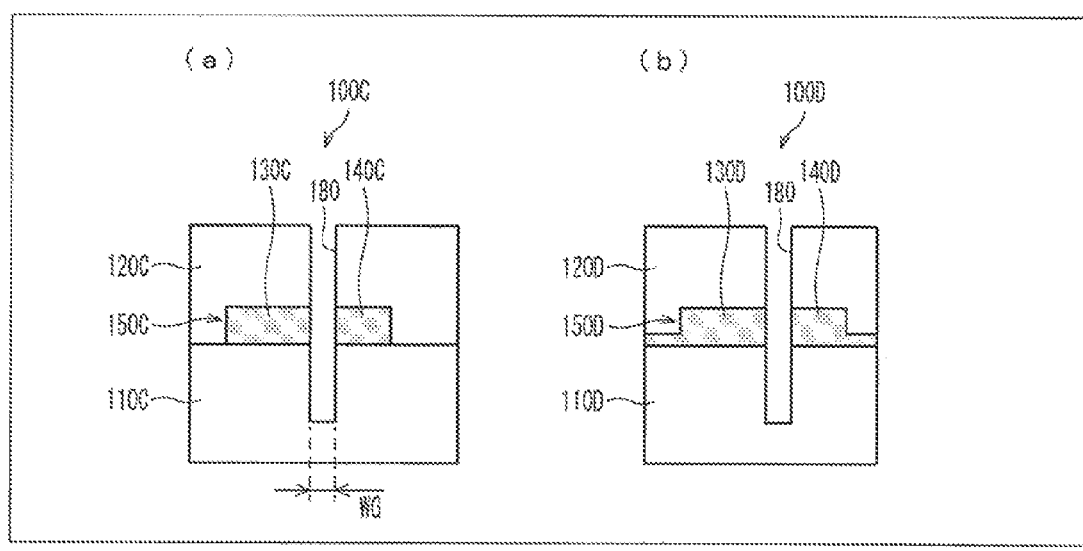

(a) of FIG. 32 is a cross-sectional view of a PBC including a rectangular waveguide as another modification of Embodiment 8, in a case where the PBC is cut at a position corresponding to the position of line A-A' shown in (a) of FIG. 30; and (b) of FIG. 32 is a cross-sectional view of a PBC including a rib waveguide as still another modification of Embodiment 8, in a case where the PBC is cut at a position corresponding to the position of the line A-A' shown in (a) of FIG. 30.

Figure 33:
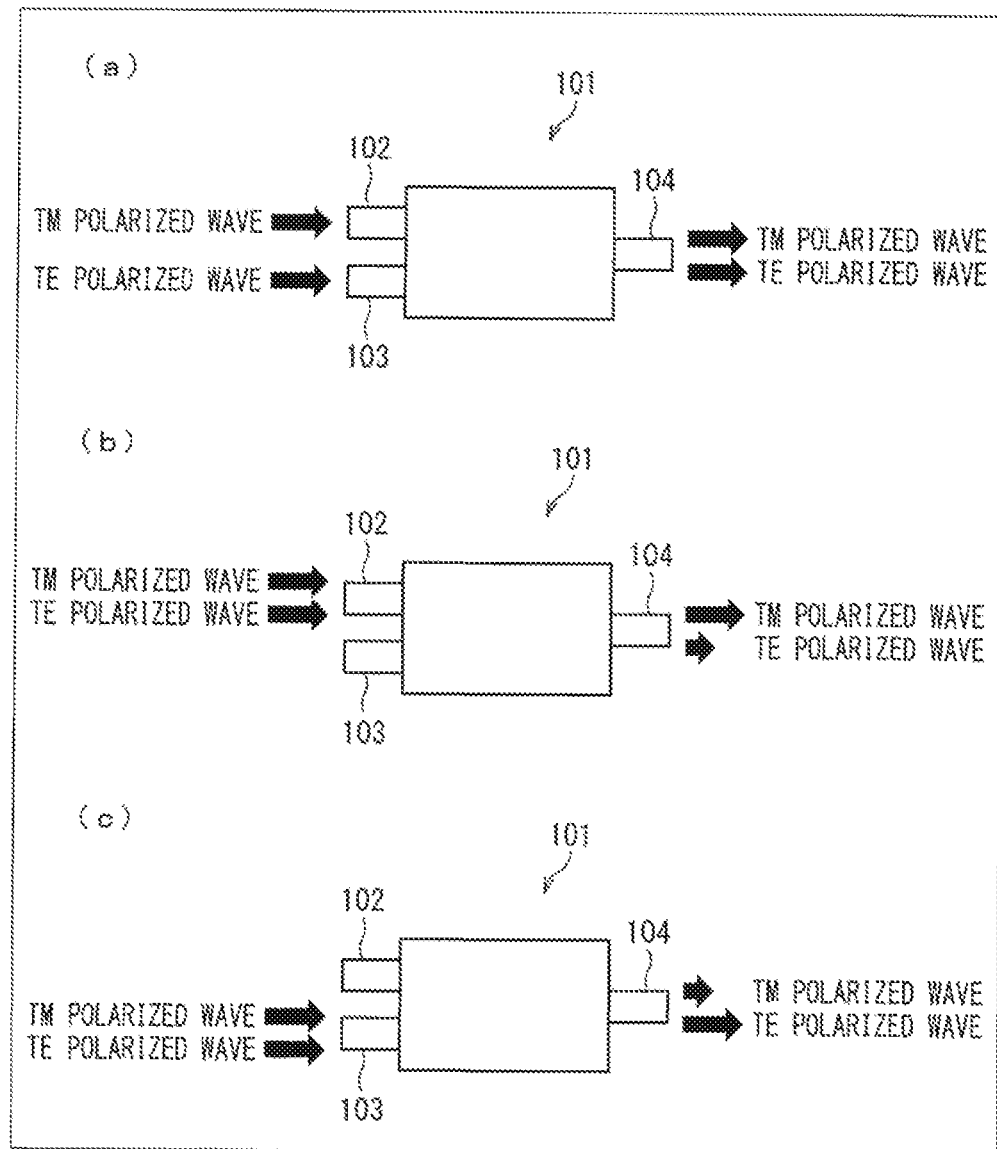

(a) of FIG. 33 is a block diagram illustrating a configuration of a general PBC; (b) of FIG. 33 is a conceptual diagram showing respective powers of a TE polarized wave and a TM polarized wave outputted through an output port, in a case where a TE polarized wave and a TM polarized wave of the same power are introduced into a PBC illustrated in (a) of FIG. 33 through a first input port of the PBC; and (c) of FIG. 33 is a conceptual diagram showing respective powers of a TE polarized wave and a TM polarized wave outputted through an output port, in a case where a TE polarized wave and a TM polarized wave of the same power are introduced into a PBC illustrated in (a) of FIG. 33 through a second input port of the PBC.

Figure 34:
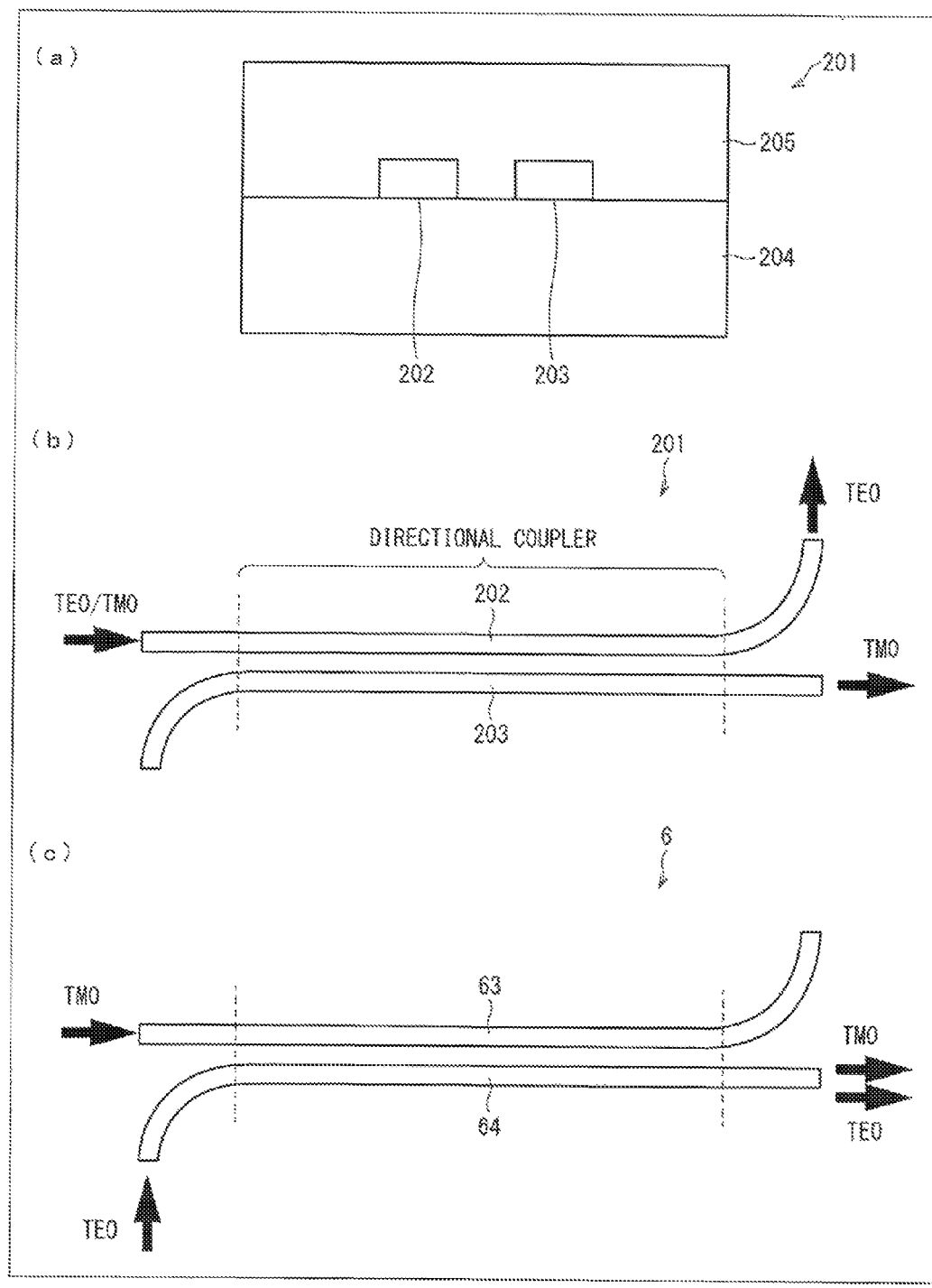

FIG. 34 is a schematic view illustrating a configuration of a polarization beam splitter disclosed in Non-Patent Literature 2. (a) of FIG. 34 is a cross-sectional view of a directional coupler of the polarization beam splitter, along a cross section orthogonal to a light traveling direction; and (b) and (c) of FIG. 34 are each a top view of a polarization beam splitter.

(a) of FIG. 35 is a top view illustrating a configuration of a PBC in accordance with Comparative Example of the present invention; and (b) of FIG. 35 is a cross-sectional view of the PBC taken along line A-A' shown in (a) of FIG. 35.

DESCRIPTION OF EMBODIMENTS

Embodiment 1

A PBC 1 in accordance with Embodiment 1 includes a tapered directional coupler which employs a waveguide having a large relative refractive index difference. Inclusion of such a tapered directional coupler leads to suppression of loss of a TM polarized wave in a wide wavelength range and provision of a substrate-type optical waveguide element which can be easily produced. Note that the wide wavelength range indicates, for example, a wavelength range including C band (wavelength range of 1530 nm to 1565 nm) and L band (wavelength range of 1565 nm to 1625 nm).

Figure 1:
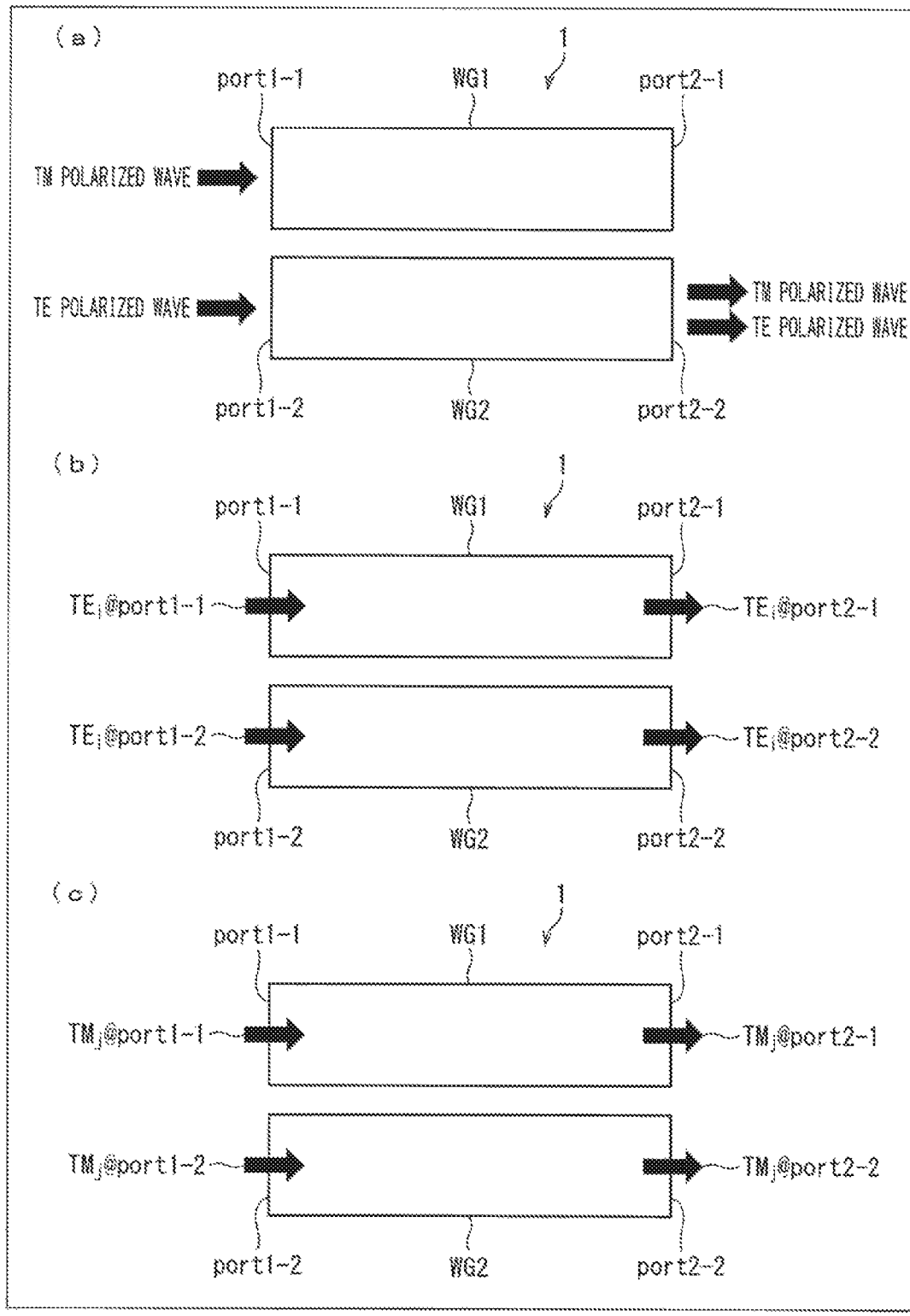
FIG. 1 is a block diagram illustrating an overview of a function of a PBC in accordance with Embodiment 1 of the present invention. (a) of FIG. 1 illustrates a state in which the PBC carries out multiplexing of a TM polarized wave and a TE polarized wave which have been introduced into the PBC; (b) of FIG. 1 defines respective names of waveguide modes of the TE polarized wave at two input ports and two output ports of the PBC; and (c) of FIG. 1 defines respective names of waveguide modes of the TM polarized wave at the two input ports and the two output ports of the PBC.

First, the following description will discuss features of the PBC 1 that is a substrate-type optical waveguide element, with reference to FIGS. 1 to 6. FIG. 1 is a block diagram illustrating an overview of the PBC 1 in accordance with Embodiment 1. As illustrated in (a) of FIG. 1, the PBC 1 includes two waveguides (referred to as WG1 and WG2, respectively) which are buried by a lower cladding and an upper cladding, and has four ports (port 1-1, port 1-2, port 2-1, and port 2-2).

Each name of a TE polarized wave and a TM polarized wave at cross sections including the above ports is defined as in (b) of FIG. 1. In (b) of FIG. 1, when i and j are each an integer of 0 or more, TEi means a waveguide mode having an (i+1)th highest effective refractive index among waveguide modes of the TE polarized wave in WG1 or WG2. Meanwhile, TMj means a waveguide mode having an (j+1)th highest effective refractive index among waveguide modes of the TM polarized wave in WG1 or WG2.

FIG. 1 is a block diagram illustrating a configuration of the PBC 1. (a) of FIG. 1 illustrates a state in which the PBC 1 carries out multiplexing of a TM polarized wave and a TE polarized wave which have been introduced into the PBC 1. (b) of FIG. 1 defines names of waveguide modes of the TE polarized wave at two input ports and two output ports of the PBC 1. (c) of FIG. 1 defines names of waveguide modes of the TM polarized wave at the two input ports and the two output ports.

As illustrated in (a) of FIG. 1 and FIG. 5, the PBC 1 includes cores 13 and 14 which are two waveguides. Hereinafter, one port of the core 13 is referred to as an input port 13a, while the other port of the core 13 is referred to as an output port 13b. Meanwhile, one port of the core 14 is referred to as an input port 14a, while the other port of the core 14 is referred to as an output port 14b.

Further, as illustrated in (b) of FIG. 1, the TE polarized wave at the input port 13a is defined as TEi@13a, while the TE polarized wave at the output port 13b is defined as TEi@13b. Meanwhile, the TE polarized wave at the input port 14a is defined as TEi@14a, while the TE polarized wave at the output port 14b is defined as TEi@14b. As illustrated in (c) of FIG. 1, the TM polarized wave at the input port 13a is defined as TMj@13a, while the TM polarized wave at the output port 13b is defined as TMj@13b. Meanwhile, the TM polarized wave at the input port 14a is defined as TMj@14a, while the TM polarized wave at the output port 14b is defined as TMj@14b. Here, i and j are each an integer of 0 or more. TEi means a waveguide mode having an (i+1)th highest effective refractive index among waveguide modes of the TE polarized wave in the core 13 or the core 14. Meanwhile, TMj means a waveguide mode having an (j+1)th highest effective refractive index among waveguide modes of the TM polarized wave in the core 13 or the core 14.

The principle of tapered directional couplers disclosed in Non-Patent Literatures 3 and 4 is a basic principle of the PBC 1. The PBC 1 has features similar to those of the tapered directional couplers.

Non-Patent Literature 3 discloses TAPERED COUPLERS (in Embodiment 1, also referred to as "tapered directional coupler") in which two optical fibers are provided so as to be adjacent to each other and each of the two optical fibers has a diameter that changes along a light traveling direction. In a general tapered directional coupler, a relative refractive index difference between two optical fibers is 5% or less. Non-Patent Literature 3 mentions use of a tapered coupler for 100% transfer of light power to an adjacent waveguide.

Non-Patent Literature 4 discloses ADIABATIC ASYMMETRIC DIRECTIONAL COUPLERS (corresponding to the tapered directional coupler in Embodiment 1) in which two rectangular cores are provided so as to be adjacent to each other and each of the two rectangular cores has a width that changes along a light traveling direction. Further, Non-Patent Literature 4 also discloses P-doped $SiO_2$ and $SiO_2$ as materials of the cores and claddings. Though not disclosed in Non-Patent Literature 4, a relative refractive index difference is generally 5% or less. Non-Patent Literature 4 mentions use of a tapered directional coupler for 100% transfer of light power over to an adjacent waveguide.

The PBC 1 has the following features each of which is similar to a feature of Non-Patent Literature 3 or 4.

Feature 1: The cores 13 and 14 are rectangular cores.

Feature 2: The height of the core 13 is equal to the height of the core 14.

Feature 3: The cores 13 and 14 are provided so as to be spaced at a distance from each other.

Feature 4: In regard to a magnitude relation of the width of the core 13 and the width of the core 14, (1) at an incident edge surface which is a cross section orthogonal to a light traveling direction and provided on a side where the input ports 13a and 14a are provided, the width of the core 13 is larger than the width of the core 14, (2) at an exit edge surface which is a cross section orthogonal to the light traveling direction and provided on a side where the output ports 13b and 14b are provided, the width of the core 14 is larger than the width of the core 13, and (3) the width of the core 13 and the width of the core 14 are equal to each other at a cross section at at least one position between the incident edge surface and the exit edge surface.

Feature 5: The width of the core 13 and the width of the core 14 each continuously change along the light traveling direction. Note that Feature 5 includes, for example, an arrangement in which the width of either one of the cores 13 and 14 does not change while the width of the other one of the cores 13 and 14 continuously changes.

Satisfying the above Features 1 to 5 makes it possible to obtain the following effects.

Feature 1 makes it possible to fabricate the PBC 1 by use of a substrate-type optical waveguide technique. The rectangular cores herein means cores each having a cross section that is macroscopically rectangular. The rectangular cores include cores each having an inclined side wall(s), such as trapezoidal cores and parallelogram cores. Further, the rectangular cores include even cores each having a cross section whose corner(s) is/are formed by microscopically a curved line(s). This is because the cross section of such a core is macroscopically rectangular even in a case where a corner(s) of the cross section is/are microscopically a round corner(s) formed by a curved line(s).

Feature 2 makes it possible to form two cores (cores 13 and 14) by one etching, so that a production process of the cores can be simplified. In general, a PBC includes a lower cladding, rectangular cores disposed on the lower cladding, and an upper cladding which covers the lower cladding and the rectangular core. The lower cladding can be, for example, a BOX (Buried Oxide) layer of an SOI wafer and the rectangular cores can be fabricated by etching a silicon layer that is a topmost layer of the SOI wafer. The upper cladding can be an air cladding. The upper cladding can alternatively be formed by depositing $SiO_2$ or $Si_3N_4$ for protection of the cores. Such a waveguide is called a silicon waveguide.

When Feature 2 is realized in a PBC, the cores 13 and 14 of the PBC can be formed by one etching. This makes it possible to simplify a production process. Particularly, in optical circuits in general including a silicon waveguide, wiring is formed often by a waveguide including a rectangular core that is strong in confinement of light. Accordingly, such wiring can be formed in a process in which the PBC is fabricated.

Simplification of the production process can leads to reduction of PBC production costs. Further, the simplification of the production process makes it possible to prevent the occurrence of a production error resulting from an increase in the number of production processes. This improves a PBC production yield.

Feature 3 makes it possible to reduce required accuracy in lithography that is a production process in core formation, so that the production process can be simplified. With Feature 3, the cores 13 and 14 do not touch each other. In a case where two cores touch each other, a core distance between the cores 13 and 14 needs to be continuously and gradually reduced. However, there is a limitation to the core distance which can be actually fabricated by lithography, because diffraction of light occurs during exposure to light. Further, in a case where a smaller core distance is required, a difficulty level of the production process increases. Therefore, satisfying Feature 3 makes it possible to simplify the production process of the PBC 1.

Features 4 and 5 can achieve a low loss in a wide wavelength range and a structure which is tolerant to production errors.

Generally, in a PCB including rectangular cores having an equal height, the cross sectional area of each core increases as the width of the core increases. Accordingly, a larger width of the core results in stronger confinement of light of TEi and TMj in the cores. This consequently increases an effective refractive index of each waveguide mode due to influence of a core having a high refractive index. With Feature 4, the width of the core 13 is larger than the width of the core 14 at an incident edge surface including the input ports 13a and 14a. Accordingly, the effective refractive index of TEi@13a (TMj@13a) is higher than the effective refractive index of TEi@14a (TMj@14a). Meanwhile, in a cross section including the output ports 13b and 14b, the width of the core 14 is larger than the width of the core 13. Accordingly, the effective refractive index of TEi@14b (TMj@14b) is higher than the effective refractive index of TEi@13b (TMj@13b). Further, with Feature 5, the cores 13 and 14 each continuously change in width. Accordingly, the effective refractive index of TEi (TMj) continuously changes along the light traveling direction. As a result, the following four combinations C1 to C4 of waveguide modes are coupled by a continuous effective refractive index curve.

Combination C1: TEi@13a and TEi@14b
Combination C2: TEi@14a and TEi@13b
Combination C3: TMj@13a and TMj@14b
Combination C4: TMj@14a and TMj@13b The effective refractive index curve herein means a curve obtained by plotting effective refractive indexes of respective waveguide modes at each cross section of the waveguides including the cores 13 and 14, at each coordinate along the light traveling direction. In general, waveguide modes on one effective refractive index curve make a core-width change sufficiently gentle along the light traveling direction. In other words, it is possible to carry out a conversion causing almost no energy loss by fixing respective widths of the input port 13a, the input port 14a, the output port 13b, and the output port 14b and setting respective lengths (hereinafter, referred to as "taper lengths") of the cores 13 and 14 to a sufficiently large length along the light traveling direction. Such a conversion is called an adiabatic conversion.

Therefore, in regard to Combinations C3 and C4, TMj is transferred from the core 13 over to the core 14 or from the core 14 over to the core 13 at a low loss by making the taper length large, in light of Features 4 and 5.

The above principle will be discussed in more detail below with reference to Non-Patent Literature 3. First, the following values are defined. Herein, λ represents a light wavelength.

$N_{TEi}$@WG1: an effective refractive index of TEi in a case where the core 13 alone is present.

$N_{TEi}$@WG2: an effective refractive index of TEi in a case where the core 14 alone is present.

$N_{TEi}$@WG1 and $N_{TEi}$@WG2 are related to Mathematical Expression (19-14) of Non-Patent Literature 3 as below.

In regard to $$\bar{\beta}_1(z), \bar{\beta}_2(z),$$ [Math. 8]

$N_{TEi}$@WG1 and $N_{TEi}$@WG2 correspond respectively to:

$$\bar{\beta}_1(z)/(2\pi/\lambda), \bar{\beta}_2(z)/(2\pi/\lambda).$$ [Math. 9]

$N_{TMj}$@WG1: an effective refractive index of TMj in a case where the core 13 alone is present.

$N_{TMj}$@WG2: an effective refractive index of TMj in a case where the core 14 alone is present.

$N_{TMj}$@WG1 and $N_{TMj}$@WG2 are related to Mathematical Expression (19-14) of Non-Patent Literature 3 as below.

In regard to $$\bar{\beta}_1(z), \bar{\beta}_2(z),$$ [Math. 10]

$N_{TMj}$@WG1 and $N_{TMj}$@WG2 respectively correspond to:

$$\bar{\beta}_1(z)/(2\pi/\lambda), \bar{\beta}_2(z)/(2\pi/\lambda).$$ [Math. 11]

$C_{TEi}$: strength of optical coupling between TEi of the core 13 and TEi of the core 14

$C_{TMj}$: strength of optical coupling between TMj of the core 13 and TMj of the core 14

$C_{TEi}$ and $C_{TMj}$ correspond to C(z) in Mathematical Expression (19-14) of Non-Patent Literature 3.

$$\delta_{TEi} = (\pi/\lambda) \times |N_{TEi}@WG1 - N_{TEi}@WG2|$$

$$\delta_{TMj} = (\pi/\lambda) \times |N_{TMj}@WG1 - N_{TMj}@WG2|$$

Note however that the above-described definitions of respective variables are based on local modes at a cross section orthogonal to the light traveling direction. $\delta_{TEi}$ is related to difference in phase velocity between TEi of the core 13 and TEi of the core 14, while $\delta_{TMj}$ is related to difference in phase velocity between TMj of the core 13 and TMj of the core 14. The closer the value of $\delta_{TEi}$ (or $\delta_{TMj}$) is with respect to 0, the more the core 13 and the core 14 match in phase.

The following will discuss conditions under which TMj transfers over to the core 14 from the core 13.

When $C_{TMj} \ll \delta_{TMj}$, a degree of phase mismatch is dominant to strength of optical coupling. Accordingly, TMj of the core 13 is locally present in the core 13 while TMj of the core 14 is locally present in the core 14. In other words, TMj of the core 13 and TMj of the core 14 hardly interact with each other. As a result, in this case, an electric filed distribution is similar to that in a case where each of the cores 13 and 14 is present independently.

On the other hand, when $C_{TMj} \gg \delta_{TMj}$, strength of optical coupling is dominant to a degree of phase matching, Accordingly, TMj of the core 13 is present over both the cores 13 and 14. Similarly, TMj of the core 14 is also present over both the cores 13 and 14. Such a waveguide mode is called a super mode. In other words, it can be said that TMj of the core 13 and TMj of the core 14 interact with each other.

Satisfying the above Feature 4 results in a larger $\delta_{TMj}$ at the incident edge surface including the input ports 13a and 14a and a larger $\delta_{TMj}$ at the exit edge surface including the output ports 13b and 14b. Consequently, TMj at the incident edge surface and TMj at the exit edge surface each locally present in either one of waveguides (the core 13 or the core 14).

By arranging the width of the core 13 and the width of the core 14 such that the width of the core 13 and the width of the core 14 gradually approach to each other along the light traveling direction, $\delta_{TMj}$ approaches 0. Accordingly, the strength of optical coupling between the cores 13 and 14 gradually increases. When the width of the core 13 becomes equal to the width of the core 14, that is, when respective shapes of the cores 13 and 14 become congruent to each other, $\delta_{TMj}=0$. Then, an electric field of TMj is present in both the cores 13 and 14 at power ratios equal to each other. TMj transfers between the cores 13 and 14 via such optical coupling in the cores 13 and 14.

In view of the above, loss of TMj becomes smaller in a wide wavelength range for the following reason.

As described above, a portion where TMj transfers between waveguides in a tapered directional coupler is present in the vicinity of a cross section where respective cores of the waveguides have an equal width, in other words, where respective shapes of the cores of the waveguides are congruent to each other. Even when a change in wavelength occurs, an effective refractive index of TMj in the core 13 is always equal to an effective refractive index of TMj in the core 14 at the cross section where the width of the core 13 is equal to the width of the core 14. Accordingly, the transfer of TMj between the waveguides occurs. In other words, the PBC 1 having the above Features 1 to 5 carries out a low-loss operation in a wide wavelength range.

The following is a reason why the PBC 1 is tolerant to production errors. Examples of the production error include the following (1) to (4): (1) variation of a core width from a designed value; (2) variation of a core height from a designed value; (3) variation of a refractive index of a core from a designed value; and (4) variation of a refractive index of a cladding from a designed value. In regard to a case where the core width varies from a designed value, if Feature 4 is satisfied, there is always a cross section where respective core widths of WG1 and WG2 are equal to each other inside an embodiment of the present invention. This allows transfer of TMj. Even in a case where the core height varies from a designed value, in general, respective core heights of the cores 13 and 14 are always equal to each other since the cores 13 and 14 having an equal height are generally fabricated in one process. Accordingly, when Feature 2 is satisfied, transfer of TMj is possible as in a case where Feature 4 is satisfied. Further, even in a case where the refractive index of a core varies from a designed value, the refractive index of the core 13 is deemed to be equal to the refractive index of the core 14 since the cores 13 and 14 are fabricated in one process. In addition, even in a case where the refractive index of a cladding varies from a designed value, a relative refractive index difference of the core 13 with respect to a cladding is deemed to be equal to a relative refractive index difference of the core 14 with respect to the cladding. Therefore, transfer of TMj is possible.

Meanwhile, even in a case where the core height is different between the cores 13 and 14 or even in a case where a core shape is an asymmetric trapezoid, transfer of TMj is still possible as long as the effective refractive index of TMj preserves the following relations: the effective refractive index of TMj is larger at the input port 13a than at the input port 14a; and the effective refractive index of TMj is larger at the output port 14b than the output port 13b.

Therefore, it can be said that the PBC 1 is tolerant to production errors.

In addition to the above Features, the PBC 1 further includes the following two Features which are disclosed in neither of Non-Patent Literatures 3 and 4.

Feature 6: The effective refractive index of TMj is always smaller than the effective refractive index of TEi all over the cores 13 and 14.

Feature 7: The cores 13 and 14 are made of a material having a large relative refractive index difference with respect to a lower cladding 11 and an upper cladding 12.

The relative refractive index difference is defined here by the following Formula.

[Math. 12]

$$\text{RELATIVE REFRACTIVE INDEX DIFFERENCE} = \frac{1}{2}\left[1 - \left(\frac{N_{cl}}{N_{co}}\right)^2\right], \quad (5)$$

where: $N_{co}$ is a refractive index of a core and $N_{cl}$ is a refractive index of a cladding. In a case where the cladding is made of a plurality of materials, refractive indexes of the lower cladding 11 and the upper cladding 12 are defined as $N_{cl1}$ and $N_{cl2}$, respectively, and a refractive index of a material having the largest refractive index is defined as $N_{cl}$.

Having Features 6 and 7, an embodiment of the present invention functions as a PBC. In other words, the embodiment of the present invention yields the following effects: in (a) of FIG. 1, (i) only light power of TMj transfers over to an adjacent waveguide (from WG1 to WG2, or from WG2 to WG1), and (ii) very little light power of TEi transfers over to an adjacent waveguide and most light power of TEi having entered into a waveguide exits from the wave guide. As a result, for example, when TMj is introduced into the core 13 through the input port 13a of the core 13 and TEi is introduced into the core 14 through the input port 14a of the core 14, both of these polarized waves are simultaneously outputted from the output ports 14b of the core 14. Accordingly, the PBC 1 functions as a PBC. Meanwhile, when TEi and TMj are simultaneously introduced into the core 14 through the output port 14b, TMj exits from the input port 13a while TEi exits from the input port 14a. Therefore, the PBC 1 also functions as a polarization beam splitter.

The following states a reason why such effects are yielded.

With Feature 6, a degree of confinement of light of TEi in a core becomes higher than that of TMj. This is because a magnitude of the effective refractive index corresponds to strength of confinement of light in a core. In other words, light of TMj leaks out into a cladding more than light of TEi. Further, with Feature 7, it is possible to have a larger difference in degree of leakage of light into a cladding between TEi and TMj. In other words, it is possible to have a larger difference in effective refractive index between TEi and TMj. This is for the following reason.

The electric field of TEi mainly has an electric field component (Ex) in a width direction (x direction). Meanwhile, the electric field of TMj mainly has an electric field component (Ey) in a height direction (y direction). When the core width is increased, the degree of confinement of light becomes stronger. Further, the effective refractive index accordingly increases. An increase rate of the effective refractive index of TEi is larger than that of TMj. This can be explained by a boundary condition of an electric field between the core and the cladding. The boundary condition of electric fields at side surfaces (both lateral (right and left) surfaces) of the core is defined by Formulae (6) and (7), on the basis of Maxwell's equations:

[Math. 13]

$$E_x^{cl}(\text{SIDE SURFACE}) = \left(\frac{N_{co}}{N_{cl}}\right)^2 E_x^{co}(\text{SIDE SURFACE}); \quad (6)$$

and

[Math. 14]

$$E_y^{cl}(\text{SIDE SURFACE}) = E_y^{co}(\text{SIDE SURFACE}) \quad (7),$$

where each parameter represents the following:

$E_x^{cl}(\text{SIDE SURFACE})$ [Math. 15]

represents a cladding-side Ex at, each of the lateral boundaries;

$E_x^{co}(\text{SIDE SURFACE})$ [Math. 16]

represents a core-side Ex at each of the lateral boundaries;

$E_y^{cl}(\text{SIDE SURFACE})$ [Math. 17]

represents a cladding-side Ey at each of the lateral boundaries; and $E_y^{co}(\text{SIDE SURFACE})$ [Math. 18]

represents a core side Ey at each of the lateral boundaries. Formula (6) is largely related to TEi, while Formula (7) is largely related to TMj. In Formula (6), $N_{co} > N_{cl}$. Accordingly, Ex is discontinuous at each core-side lateral boundary, and has an electric field that is more largely distributed on a cladding side, according to:

$E_x^{cl}(\text{SIDE SURFACE}) = E_x^{co}(\text{SIDE SURFACE}),$ [Math. 19]

However, when Feature 6 is satisfied, the electric field of TMj less leaks into the cladding than that of TEi. Accordingly, when the core width increases, Ex largely distributed outside the core is distributed in the core. As a result, the electric field is largely, confined in the core.

Meanwhile, in Formula (7), Ey continuously changes at each core-side lateral boundary. Accordingly, an Ey component does not change due to a change in core width, as much as an Ex component. Thus, in a case where the core width is increased, TEi (whose main electric field is Ex) is confined in the core more than TMj (whose main electric field is Ey). As a result, an increase rate of the effective refractive index of TEi increases. However, in a case where the relative refractive index difference defined by Formula (5) is small, TEi becomes less discontinuous at the core-side lateral boundary, so that a degree of confinement of TEi with respect to the core width becomes similar to that of TMj. On the other hand, in a case where the relative refractive index difference is large, TEi becomes more discontinuous at the core-side lateral boundary, so that a degree of confinement of TEi with respect to the core width becomes stronger than that of TMj. In other words, increasing the relative refractive index difference leads to reduction of leakage of TEi into the cladding. As a result, with Feature 7, increasing the core width makes it possible to have a larger difference in degree of leakage of light into a cladding between TEi and TMj.

For the purpose of finding how effective refractive indexes of TEi and TMj change in accordance with a magnitude of the relative refractive index difference, respective normalized effective refractive indexes of TE0 and TM0 with respect to a core width were calculated for a case where the relative refractive index difference was 5% and a case where the relative refractive index difference was 40%. FIG. 2 shows the result of this calculation. (a) of FIG. 2 is a cross-sectional view illustrating a configuration of a core used for the calculation. (b) of FIG. 2 is a graph showing the result of the calculation in the case where the relative refractive index difference is 5%. (c) of FIG. 2 is a graph showing the result of the calculation in the case where the relative refractive index difference is 40%. As shown in (a) of FIG. 2, the height h of the core is set to 220 nm, and a refractive index of the core made of silicon is set to 3.47. Then, a refractive index of the upper cladding (=a refractive index, of the lower cladding) was set in accordance with each of the above relative refractive index differences. The wavelength of each of TE0 and TM0 was set to 1550 nm. The normalized effective refractive index is calculated by the following Formula (8).

[Math. 20]

NORMALIZED EFFECTIVE REFRACTIVE INDEX=(EFFECTIVE REFRACTIVE INDEX−REFRACTIVE INDEX OF CLADDING)/(REFRACTIVE INDEX OF CORE−REFRACTIVE INDEX OF CLADDING)     (8)

By comparison between the results shown in (b) and (c) of FIG. 2, it is found that in a case where the relative refractive index difference is 5%, a difference in normalized effective refractive index between TE0 and TM0 is small even when the core width is increased. More specifically, in a core-width range of 400 nm to 1000 nm, a maximum value of the difference in normalized effective refractive index was 0.01. On the other hand, it is found that in a case where the relative refractive index difference is 40%, the difference in normalized effective refractive index is very large. More specifically, in the core-width range of 400 nm to 1000 nm, a minimum value of the difference in normalized effective refractive index was 0.23. The effective refractive index is indicative of a degree of confinement of light in the core, that is, indicative of a degree of leakage of light into a cladding. Therefore, in a case where the relative refractive index difference is large, there is a large difference in degree of leakage of light into a cladding between TE0 and TM0.

As described above, in Embodiment 1 of the present invention light of TMj leaks into a cladding more than light of TEi. When light leaks into a cladding to a larger extent, optical coupling into an adjacent waveguide becomes stronger. Accordingly, with Features 6 and 7, the following Formula (9) is always established.

[Math. 21]

$$C_{TMj} > C_{TEi} \quad (9)$$

The above relation is relevant to a taper length required for transfer of TEi and TMj between waveguides by an adiabatic change. One evaluation index of this taper length is Zb expressed by Mathematical Expression (19-3) of Non-Patent Literature 3. The larger the value of Zb becomes, the longer the taper length needs to be. Zb depends on a difference between propagation constants of respective two waveguide modes of polarized waves having respective main components present along one direction, which waveguide modes are propgating through the cores 13 and 14 (difference in effective refractive index/$(2\pi/\lambda)$). Therefore, Zb of TEi and Zb of TMj can be expressed by the following Formulae (10) and (11), respectively.

[Math. 22]

$$Zb(TEi)=2\pi/\sqrt{C_{TEi}^2+\delta_{TEi}^2} \quad (10)$$

[Math. 23]

$$Zb(TMj)=2\pi/\sqrt{C_{TMj}^2+\delta_{TMj}^2} \quad (11)$$

Zb is the largest when respective core widths of the cores 13 and 14 are equal to each other. At this time, $\delta_{TEi}=0$ and $\delta_{TMj}=0$. Therefore, Formula (10) becomes the following Formula (12), while Formula (11) becomes Formula (13) below.

[Math. 24]

$$Zb(TEi)=2\pi/C_{TEi} \quad (12)$$

[Math. 25]

$$Zb(TMj)=2\pi/C_{TMj} \quad (13)$$

According to the above, when the optical coupling is stronger, an adiabatic transfer between waveguides occurs at a short taper length. With Features 6 and 7, the relation of Formula (9) is established, so that Zb(TMj) is shorter than Zb(TEi). In other words, it is possible to transfer TMj at a low loss and make TEi hardly transfer between waveguides, by setting the taper length to a length that is required for an adiabatic transfer of TMj between waveguides.

Further, with Feature 7, the PBC 1 yields the following effect. A strong transfer of TEi between waveguides occurs in an area where $C_{TEi} \gg \delta_{TEi}$, and a strong transfer of TMj occurs between waveguides in an area where $C_{TMj} \gg \delta_{TMj}$. When an adiabatic conversion is to be carried out in the area (referred to as an interaction region) where a transfer of TEi or TMj between waveguides occurs, a particularly longer taper length is required as compared to a case where an adiabatic conversion is to be carried out in other area. This is clear from Formulae (10) and (11). Zb(TEi) is large when $C_{TEi} \gg \delta_{TEi}$ and Zb(TMj) is large when $C_{TMj} \gg \delta_{TMj}$.

The PBC 1 shifts TMj from a waveguide mode locally present in one of waveguides to a waveguide mode locally present in the other one of the waveguides, by changing respective core widths of the cores 13 and 14. As indicated by the above Formulae (6) and (7), in a case where the relative refractive index difference is large, a change in core width makes an amount of change in effective refractive index of TEi larger than that of TMj. Accordingly, $\delta_{TEi}$ changes more sharply than $\delta_{TMj}$ with respect to a change in core width. As a result, a ratio of the interaction region in a whole tapered section is larger for TMj than TEi. Consequently, at an equal taper length, transfer of light power of TMj between waveguides occurs more gently than that of TEi. This makes it possible to selectively transfer only TMj between waveguides.

As described above, the PBC 1 having Features 6 and 7 makes it possible to selectively transfer only TMj between waveguides. As a result, the PBC 1 functions as a PBC.

A relative refractive index difference which satisfies the above conditions is given as follows. As is clear from Formula (6), a larger the relative refractive index difference leads to more evident influence on an increase in effective refractive index of TEi with respect to a core width. As a result, it is possible to obtain a large difference between $C_{TMj}$ and $C_{TEi}$. A dominant parameter is the following in Formula (6):

[Math. 26]
$$\left(\frac{N_{co}}{N_{cl}}\right)^2$$

When the above parameter is 2 or more, an amount of change in effective refractive index of TEi is two or more times as large as that of TMj when the core width is changed. As a result, in this case, there are two or more times difference between a degree of separation of TEi and a degree of separation of TMj. Accordingly, the above parameter of 2 or more is sufficient. Further, in this case, the relative refractive index difference is 25% or more. Therefore, it is a necessary condition of the PBC 1 that the relative refractive index difference is 25% or more.

Note that Non-Patent Literatures 3 and 4 disclose only tapered couplers each having a small relative refractive index difference (e.g., 5% or less). As described above, when the relative refractive index difference is small, respective characteristics of TEi and TMj is similar to each other. For example, when relative refractive index difference=5%,

[Math. 27]
$$\left(\frac{N_{co}}{N_{cl}}\right)^2 = 1.1.$$

In this case, a difference of only 10% is produced. Accordingly, in a tapered directional coupler having such a small relative refractive index difference, not only TMj but also TEi transfer between waveguides and degrees of such transfer of TMj and TEi are similar to each other. Accordingly, Non-Patent Literatures 3 and 4 disclose only 100% transfer of light power between adjacent wave guides. In other words, the tapered directional coupler in accordance with Non-Patent Literature 3 or 4 cannot function as a PBC.

[Preferred Configuration 1]

In the PBC 1, preferably, (1) the cores 13 and 14 are made of Si, (2) the lower cladding 11 is made of $SiO_2$, and (3) the upper cladding 12 is formed by the air or made of $SiO_2$ or $Si_3N_4$.

The above configuration makes it possible to easily fabricate the PBC 1 by processing an SOI wafer by a CMOS process. Further, the above configuration makes it possible to obtain a waveguide having a large relative refractive index difference. More specifically, in a case where the upper cladding is formed by air or made of $SiO_2$, the relative refractive index difference is approximately 41%. Meanwhile, in a case where the upper cladding is made of $Si_3N_4$, the relative refractive index difference is approximately 32%.

The lower cladding 11 can be formed by using a BOX layer of an SOI wafer. The cores 13 and 14 can be formed by etching an Si layer that is a topmost layer of the SOI wafer. The upper cladding 12 can be formed by depositing a desired material ($SiO_2$ or $Si_3N_4$) after formation of the cores. Note that in a case where the upper cladding 12 is formed by air, it is not necessary to deposit $SiO_2$ or $Si_3N_4$.

Particularly, in a case where $SiO_2$ is used as the upper cladding 12, it is possible to have a small stress at a boundary between the lower cladding 11 and the upper cladding 12 since the material of the upper cladding 12 is the same as the material of the lower cladding 11. This makes it possible to further increase a yield in production of the PBC 1.

[Preferred Configuration 2]

In the PBC 1, the following (1) to (3) are preferably satisfied: (1) the cores 13 and 14 are made of Si, (2) the lower cladding 11 is made of $SiO_2$, and further, (3) when the width of the core 13 is defined as a width W1 and the width of the core 14 is, defined as a width W2, the width W1 and the width W2 changes in a range that satisfies the following Formula (14).

[Math. 28]
$$h<W1, W2<W_{upper} \quad (14)$$

where h represents heights of the cores 13 and 14. Further, $W_{upper}$ is expressed by the following Formula (15). Note that in Formula (15), e is Napier's constant.

[Math. 29]
$$W_{upper}=\{0.868224\times[\log_e(h)]^4-21.265613\times[\log_e(h)]^3+\\195.780964\times[\log_e(h)]^2-802.242303\times\log_e(h)+\\1236.45521\}\times h \quad (15)$$

This makes it possible to decrease excess loss of TM0 in a case where polarization multiplexing or polarization separation of TE0 and TM0 are carried out.

In a case where TE0 and TM0 are to be subjected to the polarization multiplexing or polarization separation, the widths W1 and W2 of the cores each need to be larger than the height h of the cores so that Feature 6 will be satisfied. This is because when the core width of a core is equal to the core height of the core in a rectangular waveguide, the shape of a cross section of the core becomes a square shape. In this case, respective electric field distributions exhibited by TE0 and TM0 are identical in pattern to each other, and one of the electric field distributions of TE0 and TM0 is rotated by 90 degrees with respect to the other one of the electric field distributions.

A maximum value $W_{upper}$ of the core width is decided as follows. In an actual production, the cores each may have a side wall that is not exactly orthogonal with respect to a top surface of the lower cladding 11 and accordingly, the core may have a trapezoidal shape as shown in (a) and (b) of FIG. 3. This trapezoidal shape can be macroscopically taken as a rectangular shape. However, the trapezoidal shape leads to an increase in loss of TM0 for the following reason. In a case where as disclosed in Non-Patent Literature 5, a core has an asymmetric refractive index distribution with respect to a height direction as in (a) and (b) of FIG. 3, TM0 and TE1 interact with each other when the core width of the core is arranged such that respective effective refractive indexes of TM0 and TE1 are equal to each other.

This results in conversion of part of TM0 into TE1, and consequently causes excess loss. In order to prevent such an undesired loss, it is necessary to make a core width smaller than the core width at which the respective effective refractive indexes of TE1 and TM0 are equal to each other. On this account, $W_{upper}$ is decided to be the core width at which the respective effective refractive indexes of TE1 and TM0 are equal to each other. FIG. 4 shows a simulation result of $W_{upper}$ normalized by the height h. The wavelength here is set to 1550 nm. In FIG. 4, dots show the simulation result, and dotted line shows a curve obtained by interpolating the simulation result. According to this curve, $W_{upper}$ can be defined by the above Formula (15).

The above makes it possible to decrease excess loss of TM0 in a case where polarization multiplexing or polarization separation of TE0 and TM0 is carried out. TE0 and TM0 are most strongly confined in a core since respective effective indexes of TE0 and TM0 are each the highest effective index in each polarized wave. This results in lower loss in a curved waveguide. On this account, in general, TE0 and TM0 are most frequently used. Therefore, Preferred Configuration 2 for suppressing the excess loss of TM0 is practically useful.

[Other Usage]

The PBC 1 can allow only TMj to transfer between the cores 13 and 14 at a low loss. Accordingly, it is possible to use the PBC 1 as a polarizer employing a substrate-type optical waveguide which extracts a polarized wave of TMj or TEi.

In a case where the PBC 1 is used as a polarizer for TMj, for example, the input port 13a is used as an input port while the output port 14b is used as an output port. Then, when TEi and TMj are introduced into the PBC1 through the input port 13a, it is possible to extract only TMj through the output port 14b.

In a case where the PBC 1 is used as a polarizer for TEi, for example, the input port 13a is used as an input port while the output port 13b is used as an output port. This makes it possible to extract only TEi through the output port 13b in a case where TEi and TMj are introduced into the input port 13a.

In either of the above cases, use of the PBC 1 capable of operating at a low loss in a wide wavelength range makes it possible to provide a polarizer having a low loss and a high polarization extinction ratio in a wide wavelength range.

Further, multistage connection of PBCs 1 makes it possible to improve the polarization extinction ratio.

[Configuration of PBC 1]

The following description will discuss a configuration of a PBC 1, with reference to FIGS. 5 and 6. FIG. 5 is a perspective view illustrating a configuration of a PBC 1. (a) of FIG. 6 is a top view illustrating configurations of cores 13 and 14 of the PBC 1. (b) to (d) of FIG. 6 are cross-sectional views taken along line A-A', line B-B' and line C-C' of the PBC 1 in (a) of FIG. 6, respectively.

As illustrated in (a) of FIG. 5, the PBC 1 includes a lower cladding 11, a first core 13 and a second core 14 which are provided on the lower cladding 11, and an upper cladding 12 which is provided on the lower cladding 11 so as to bury the first core 13 and the second core 14. The first core 13 and the second core 14 each have a rectangular cross section orthogonal to a light traveling direction. The cores 13 and 14 are assumed, in the following description, to allow TE0 (also called "TE0 polarized wave") to propagate as a TE polarized wave and TM0 (also called "TM0 polarized wave") to propagate as a TM polarized wave. Further, it is assumed in the description that the cores 13 and 14 are made of silicon while the lower cladding 11 and the upper cladding 12 are made of silica. However, a combination of materials constituting the cores 13 and 14 and materials constituting the lower cladding 11 and the upper cladding 12 are not limited to the above combination of materials.

In the following description, a refractive index of the lower cladding 11 is $N_{cl1}$, and a refractive index of the upper cladding is $N_{cl2}$. In a case where the lower cladding 11 and the upper cladding 12 are made of the same material, $N_{cl1}=N_{cl2}=N_{cl}$. On the other hand, in a case where the lower cladding 11 and the upper cladding 12 are made of different materials, respectively, a larger one of the refractive index $N_{cl1}$ and the refractive index $N_{cl2}$ is $N_{cl}$. In the PBC 1, the relative refractive index defined by the above Formula (5) is 0.25 or more.

The first core 13 and the second core 14 are made of the same material. The refractive index $N_{co}$ of the first core 13 and the second core 14 satisfies $N_{co}>N_{cl1}$, $N_{cl2}$. Further, the width and the height of the core 13 are defined as W1 and h1, respectively, while the width and the height of the core 14 are defined as W2 and h2, respectively. In the PBC 1, the height h1 is equal to the height h2, so that in the following description, it is assumed that h1=h2=h. The width W1 of the core 13 and the width W2 of the core 14 each are larger than the height h that is a common height of the cores 13 and 14.

Furthermore, when a distance between the cores 13 and 14 is defined as a width WG, the width WG is constant along the entire length of the PBC 1. Along the entire length of the PBC 1, the first core 13 and the second core 14 are provided parallel to each other. Hereinafter, a section in which the first core 13 and the second core 14 are provided parallel to each other is also referred to as a parallel-core section.

Further, in a state where only the first cores is buried by the lower cladding and the upper cladding (a state in which the second core 14 is absent in the PBC 1), effective refractive indexes of a TE polarized wave and a TM polarized wave in the first core are hereinafter referred to as $N_{TE}@WG1$ and $N_{TM}@WG1$, respectively. Meanwhile, in a case where only the second core is buried by the lower cladding and the upper cladding (a state in which the first core 13 is absent in the PBC 1), effective refractive indexes of a TE polarized wave and a TM polarized wave in the second core are referred to as $N_{TE}@WG2$ and $N_{TM}@WG2$, respectively.

The effective refractive indexes $N_{TE}@WG1$, $N_{TM}@WG1$, $N_{TE}@WG2$, and $N_{TM}@WG2$ each are continuous as a function of distance from a start position of the parallel-core section in which the first core 13 and the second core 14 are provided parallel to each other.

The effective refractive indexes $N_{TE}@WG1$ and $N_{TM}@WG1$ satisfy $N_{TE}@WG1>N_{TM}@WG1$ all over the parallel-core section. Meanwhile, the effective refractive indexes $N_{TE}@WG2$ and $N_{TM}@WG2$ satisfy $N_{TE}@WG2>N_{TM}@WG2$ all over the parallel-core section.

A magnitude relation of the effective refractive indexes $N_{TM}@WG1$ and $N_{TM}@WG2$ at the start position of the parallel-core section is opposite to that at the end position of the parallel-core section. More specifically, in the PBC 1, $N_{TM}@WG1>N_{TM}@WG2$ at the start position of the parallel-core section, whereas $N_{TM}@WG1<N_{TM}@WG2$ at the end position of the parallel-core section.

In order to satisfy the above requirements, the width W1 of the core 13 linearly changes from the input port 13a to the output port 13b. Similarly, the width W2 of the core 14 linearly changes from the input port 14a to the output port 14b. In other words, the widths W1 and W2 each linearly change along the light traveling direction. Such shapes of the cores 13 and 14 are preferable in view of easy designing of the PBC 1.

A cross section at which the width W1 is equal to the width W2 is positioned in the middle of the PBC 1. This configuration makes it possible to have a wide interaction region in which the cores 13 and 14 interact with each other, and is therefore preferable.

Note that in Embodiment 1, though the width WG is constant, the width WG does not necessarily have to be constant. Particularly, the interaction region (in the vicinity of the cross section where the width W1 is equal to the width W2) needs to have a longer taper length as compared to the other regions. Accordingly, a preferable structure includes a structure in which the waveguide width decreases from the input ports 13a and 14a to the interaction region and a structure in which the waveguide width decreases from the output ports 13b and 14b toward the interaction region. This is because such structures each can increase a coupling length in the interaction region.

Further, the widths W1 and W2 each do not necessarily have to linearly change along the light traveling direction. The widths W1 and W2 each can be configured to change in accordance with a gentler function, in the interaction region. This configuration is preferable because the configuration can make the taper length relatively longer in the interaction region.

Further, in the PBC 1, though the cores 13 and 14 are assumed to be rectangular cores, the cores 13 and 14 can be formed by use of a rib waveguide which can be fabricated by one etching. Note however that since a rib waveguide has a smaller core side wall than a rectangular waveguide, a change in rib width (corresponding to a core width) leads to a decreased difference in amount of change in effective refractive index between TE0 and TM0.

Example 1

The following description will discuss a PBC 1 in accordance with Example 1, with reference to FIGS. 7 to 15. Example 1 is intended to carry out polarization multiplexing or polarization separation of TE0 and TM0 by use of the PBC 1. FIG. 7 is a schematic view showing a size of each part of PBC 1 in accordance with Example 1. (a) of FIG. 7 is a top view of the PBC 1, and (b) of FIG. 7 is a cross-sectional view of a cross section orthogonal to a light traveling direction, in the PBC 1.

(a) of FIG. 8 is a graph showing a result of calculation of an effective refractive index of a rectangular waveguide 101a which does not include the core 14 (which includes only a core 113) of the PBC 1 and an effective refractive index of a rectangular waveguide 101b which does not include the core 13 (which includes only a core 114) of the PBC 1. The rectangular waveguides 101a and 101b are each one aspect of a comparative example of the PBC 1 in accordance with Example 1. (b) of FIG. 8 is a cross-sectional view illustrating a configuration of the waveguide 101a including a lower cladding 111, an upper cladding 112, and the core 113 (corresponding to the first core) which is buried. (c) of FIG. 8 is a cross-sectional view illustrating a configuration of the waveguide 101b including a lower cladding 111, an upper cladding 112, and the core 114 (corresponding to the second core) which is buried.

When the letter X in (b) of FIG. 7 changes in a range of −100 to 100, the width W1 of the core 13 and the width W2 of the core 14 each linearly change along the light traveling direction. More specifically, (1) at the position of line A-A', that is, at the position where an input port 13a and an input port 14a are provided, the width W1 is 600 nm (X=−100 nm) while the width W2 is 400 nm (X=−100 nm), (2) at the position of line E-E', that is, at the position where an output port 13b and an output port 14b is provided, the width W1 is 400 nm (X=100 nm) while the width W2 is 600 nm (X=100 nm), and (3) at the position of line C-C', that is, at a middle point between the input port 13a (14a) and the output port 13b (14b), each of the width W1 and the width W2 is 500 nm (X=0 nm). Meanwhile, the height h of both the cores 13 and 14 was set to 220 nm.

As the lower cladding 11, a BOX layer of an SOI wafer was used.

The cores 13 and 14 were fabricated by etching a silicon (Si) layer that is a topmost layer of the SOI wafer.

After formation of the cores 13 and 14, the upper cladding 12 was formed by depositing silica ($SiO_2$) so that the cores 13 and 14 would be buried.

As described above, in Example 1, the cores 13 and 14 are made of silicon, while the lower cladding 11 and the upper cladding 12 are made of silica.

In Example 1, respective effective refractive indexes of TE0 and TM0 at a cross section orthogonal to the light traveling direction were calculated. First, calculation was carried out so as to obtain the respective effective refractive indexes of TE0 and TM0 for each of the waveguide 101a (see (b) of FIG. 8) in which the core 13 was independently present in between the lower cladding 11 and the upper cladding 12 and the waveguide 101b (see (c) of FIG. 8) in which the core 14 was independently present in between the lower cladding 11 and the upper cladding 12. (a) of FIG. 8 shows the result of calculation of the effective refractive indexes. In the calculation, the wavelength of light was assumed to be 1550 nm. It was found from (a) of FIG. 8 that: while the core width changes by 200 nm from 600 nm to 400 nm, the effective refractive index of TE0 changes by 0.35 and the effective refractive index of TM0 changes by 0.13. In other words, the effective refractive index of TE0 changes more than the effective refractive index of TM0. This is because the PBC 1 in accordance with Example 1 includes a waveguide having a large relative refractive index difference as described in Feature 7. In Example 1, the relative refractive index difference between the core (13, 14) and the cladding (11, 12) is approximately 41%.

Note that in (a) of FIG. 8, the absolute value of a difference between effective refractive indexes of TE0 corresponds to $\delta_{TE0}/(\pi/\lambda)$, while the absolute value of a difference between effective refractive indexes of TM0 corresponds to $\delta_{TM0}/(\pi/\lambda)$. Accordingly, $\delta_{TE0}$ and $\delta_{TM0}$ can be calculated.

Next, FIG. 9 shows a result of calculation of an effective refractive index of a waveguide mode at a cross section orthogonal to the light traveling direction of the PBC 1 in which the cores 13 and 14 are provided adjacent to each other as in the cross-sectional view of (b) of FIG. 7. In FIG. 9, a graph drawn by using the same type of curved line is continuous. In (a) of FIG. 8, curves of effective refractive indexes intersect with each other at a point. However, in FIG. 9, such an intersection is split due to interaction caused by providing the cores 13 and 14 adjacent to each other in such a manner that the cores 13 and 14 are spaced apart from each other at an interval of WG=350 nm. As a result, TE0 of the core 13 and TE0 of the core 14 are coupled to each other on one curve, while TM0 of the core 13 and TM0 of the core 14 are coupled to each other on another curve. In this case the absolute value of the difference between the effective refractive indexes of TE0 is equivalent to:

$$\sqrt{C_{TE0}^2+\delta_{TE0}^2}/(\pi/\lambda). \quad \text{[Math. 30]}$$

Meanwhile, the absolute value of a difference between the effective refractive indexes of TM0 is equivalent to:

$$\sqrt{C_{TM0}^2+\delta_{TM0}^2}/(\pi/\lambda). \quad \text{[Math. 31]}$$

Accordingly, $C_{TE0}$ and $C_{TM0}$ can be calculated, respectively, by using $\delta_{TE0}$ and $\delta_{TM0}$ obtained from (a) of FIG. 8. At X=0, $C_{TE0}$ is 0.01 rad/μm while $C_{TM0}$ is 0.13 rad/μm, so that coupling of TM0 is much stronger. This is because Features 6 and 7 are satisfied. When this result was used to calculate Zb(TE0) in Formula (10) and Zb(TM0) in Formula (11), Zb(TE0) was 470 μm and Zb(TM0) was 50 μm. It is therefore clear that a length necessary for transfer of TM0 over to an adjacent waveguide by an adiabatic conversion can be much shorter than that of TM0.

Further, a ratio of $C_{TE0}$ and $\delta_{TE0}$ ($\delta_{TE0}/C_{TE0}$) and a ratio of $C_{TM0}$ and $\delta_{TM0}$ ($\delta_{TM0}/C_{TM0}$) were calculated with respect to X. FIG. 10 shows a result of this calculation. The smaller the ratio is, the stronger the interaction of TE0 between the cores 13 and 14 becomes. In the present specification, the interaction region is a region having the ratio of 2 or less. The same as above in regard to TE0 applies to TM0. It is clear from FIG. 10 that at X=0, the interaction is the strongest since $\delta_{TE0}$ and $\delta_{TM0}$ are 0. When X is close to 0 (X≈0), $\delta_{TE0}$ and $\delta_{TM0}$ increases due to a change in core width. This consequently results in weaker interaction. Here, with Feature 7 (a large relative refractive index difference), an amount of increase in effective refractive index of TE0 is greater than that of TM0 when the core width is changed. Accordingly, as compared to $\delta_{TM0}/C_{TM0}$, $\delta_{TE0}/C_{TE0}$ increases more sharply. As a result, the interaction region (−10<X<10) of TE0 with respect to a whole device is smaller than the interaction region (−90<X<90) of TM0. Consequently, TE0 has a sharper change in electric field distribution as compared to TM0. It is therefore clear that an adiabatic conversion of TE0 hardly occurs, whereas an adiabatic conversion of TM0 can be efficiently carried out.

The above result was examined in detail by carrying out simulations of electric field distributions of TE0 and TM0 at cross sections taken along line A-A', line B-B', line C-C', line D-D', and line E-E' which are shown in FIG. 7. FIGS. 11 to 15 show results of such simulations. In each of FIGS. 11 to 15, TE0 shows a main electric field component Ex, and TM0 shows a main electric field component Ey. TE0 #0 and TE0 #1 represent modes having the highest effective refractive index and the second highest effective refractive index, respectively, among TE polarized waves at a cross section in which WG1 and WG2 are provided adjacent to each other. Similarly, TM0 #0 and TM0 #1 represent modes having the highest effective refractive index and the second highest effective refractive index, respectively, among TM polarized waves at the cross section in which WG1 and WG2 are provided adjacent to each other.

In the case of TM0, since an adiabatic conversion occurs, either one of TM #0 and TM #1 hardly shifts to the other waveguide mode. For example, FIGS. 11 to 15 show the following. TM0 having entered into the core 13 at X=−100 follows an electric field distribution of TM0 #0 and as a result, exits from the core 14 at X=100. TM0 transfers between waveguides when X is around 0 (X=0 or X≈0) (see FIG. 13). It can be seen in FIG. 13 that when X is around 0, an interaction with TM0 of an adjacent waveguide is the strongest in the electric field distribution and TM0 is present in both the waveguides. Similarly, TM0 having entered into the core 14 follows an electric field distribution of TM0 #1, and as a result, exits from the core 13 at X=100.

On the other hand, an adiabatic conversion of TE0 hardly occurs. Accordingly, when TE0 is outputted, the electric field of TE0 is still locally present in one waveguide into which TE0 have entered. For example, FIGS. 11 to 15 show the following. TE0 having entered into WG1 at X=−100 excites an electric field distribution of TE0 #0. However, TE0 hardly transfers over to an adjacent waveguide until X becomes −10 (X=−10). At X=0, TE0 excites both of the electric field distribution of TE0 #0 and an electric field distribution of TE0 #1 since no adiabatic conversion occurs. Though not shown in the figures, TE0 #0 and TE0 #1 are modes called an even mode and an odd mode, respectively. The electric field distribution of TE0 #1 is antisymmetric with respect to a width direction. Accordingly, when these two waveguide modes excited are superposed each other, the two waveguide modes form an electric field distribution in which most of an electric field is locally present in WG1. Subsequently, when X=10 and X=100, TE0 follows the waveguide including the core 13. Therefore, TE0 does not transfer over to an adjacent waveguide, and exits directly from the core 13. Similarly, TE0 having entered into the core 14 at X=−100 exits from the core 14.

The above description is applied to Example 1, but not limited thereto. The above description is similarly applied to all embodiments of the present invention involving TEi and TMj.

Embodiment 2

The following description discusses a PBC 1A in accordance with Embodiment 2, with reference to FIG. 16. The PBC 1A is a substrate-type optical waveguide element in which curved waveguide sections 2 and 3 are connected respectively to a preceding stage and a subsequent stage of the PBC 1 in accordance with Embodiment 1 of the present invention.

The curved waveguide section 2 provided at the preceding stage of the PBC 1 includes a third core 23 and a fourth core 24, as illustrated in FIG. 16. The third core 23 is a core which communicates with a first core 13 via a start position of a parallel-core section of the PBC 1. Meanwhile, the fourth core 24 is a core which communicates with a second core 14 via the start position. Both of the third core 23 and the fourth core 24 are made of silicon, as well as the first core 13 and the second core 14. Accordingly, a refractive index of the third core and the fourth core are the same as a refractive index of the first core 13 and the first core 14. A distance between the third core 23 and the fourth core 24 increases as a distance from the start position increases.

The width W3 of the third core 23 is equal to the width W1 of the first core 13 at the start position. The width W3 is preferably constant from a third input port 23a that is one end of the third core 23 to a third output port 23b that is the other end of the third core 23.

The width W4 of the fourth core 24 is equal to the width W2 of the second core 14 at the start position. The width W4 is preferably constant from a fourth input port 24a that is one end of the fourth core 24 to a fourth output port 24b that is the other end of the fourth core 24.

The curved waveguide section 3 provided to the subsequent stage of the PBC 1 includes a fifth core 33 and a sixth core 34. The curved waveguide section 3 is configured to correspond to the curved waveguide section 2. More specifically, the fifth core 33 corresponds to the third core 23, and the sixth core 34 corresponds to the fourth core 24.

The fifth core 33 is a core which communicates with the first core 13 via the end position of the parallel-core section of the PBC 1. The sixth core 34 is a core which communicates with the second core 14 via the end position. Both the fifth core 33 and the sixth core 34 are made of silicon, as well as the first core 13 and the second core 14. Accordingly, a refractive index of the fifth core and the sixth core are the same as the refractive index of the first core 13 and the second core 14. A distance between the fifth core 33 and the sixth core 34 increases as a distance from the end position increases.

The width W5 of the fifth core 33 is equal to the width W1 of the first core 13 at the end position. The width W5 is preferably constant from a fifth input port 33a that is one end of the fifth core 33 to a fifth output port 33b that is the other end of the fifth core 33.

The width W6 of the sixth core 34 is equal to the width W2 of the second core 14 at the start position. The width W6 is preferably constant from a sixth input port 34a that is one end of the sixth core 34 to a sixth output port 34b that is the other end of the sixth core 34.

Connecting the curved waveguide section 2 makes it possible to increase a distance between the cores 23 and 24 while a distance between the cores 13 and 14 is not increased. Further, connecting the curved waveguide section 3 makes it possible to increase a distance between the cores 33 and 34 while a distance between the cores 13 and 14 is not increased. The above makes it possible to prevent the occurrence of undesired light reflection at the input port 23a, the input port 24a, the output port 33b, and the output port 34b.

Further, since a distance between the cores 13 and 14 adjacent to each other can be gradually increased, it is possible to continuously increase (on an input side)/decrease (on an output side) the strength of optical coupling of a TM polarized light. This makes it possible to decrease the strength of optical coupling of the TM polarized wave between adjacent waveguides as a distance from an input/output section increases. Accordingly, the TM polarized wave can have an electric field distribution that is localized more in one of waveguides. As a result, it is possible to reduce loss which is caused by the TM polarized wave remaining in the other one of the waveguides.

The curved waveguide can be connected to each of WG1 and WG2, or alternatively to either one of WG1 and WG2. In FIG. 16, a straight waveguide is connected to an edge surface of a waveguide having a large core width, while a curved waveguide is connected to an edge surface of a waveguide having a small core width. In such a case as illustrated in FIG. 16, TM0 is introduced through an upper-left port in FIG. 16 and TE0 is introduced through a lower-left port, while outputs of TE0 and TM0 are arranged to be obtained through a lower-right port. Then, when the PBC 1A is used as a PBC, light passes through the curved waveguide the lowest number of times. Accordingly, the PBC 1A arranged as described above is preferable. Particularly in this case, it is assumed that TE0 passes through the curved waveguide since light confinement for TE0 is stronger than that for TM0.

Note that a method for making WG1 and WG2 come closer to each other/separate farther away from each other is not limited to use of the above curved waveguide, and a waveguide having any curved-line shape can be used.

In addition, a low-loss connection is made between an optical waveguide serving as an optical wiring and at least either one of the preceding stage in which WG1 and WG2 come closer to each other and the subsequent stage in which WG1 and WG2 separate farther away from each other. Accordingly, it is possible to connect a tapered waveguide continuously changing in core width toward a core width of the optical wiring.

Example 2

The following provides an example corresponding to FIG. 16 of Embodiment 2. In the curved waveguide sections 2 and 3, each of the third core 23 and the sixth core 34 is a straight waveguide. The third core 23 is an extension of the input port 13a of the first core 13 and keeps the core width at the input port 13a of the first core 13, while the sixth core 34 is an extension of the output port 14b of the second core 14 and keeps the core width at the output port 14b of the second core 14. On the other hand, each of the fourth core 24 and the fifth core 33 is a curved wave guide. The fourth core 24 is an extension of the input port 14a of the second core 14 and arranged to keep the width of the second core 14, while the fifth core 33 is an extension of the output port 13b of the first core 13 and arranged to keep the width of the first core 13. These cores 24 and 33 are each curved so as to have an arc form.

Dimensions in the parallel-core section illustrated in FIG. 16 are the same as those in Example 1. The PBC 1A in accordance with Example 2 can be fabricated by a process as in Example 1. The parallel-core section hereinafter will be also referred to as a tapered section and the length of the parallel-core section will also be referred as a taper length.

The following demonstrates, by simulation, that the PBC 1A in accordance with Example 2 functions as a PBC.

First, calculation was carried out by a finite-difference time-domain method (FDTD), for a loss of TM0 to be outputted through a port 2-2 in a case where TM0 was introduced through a port 1-1. FIG. 17 shows a result of this calculation. In the above case, the wavelength was set to 1550 nm. It is clear from the result of the calculation that when the taper length is not less than 80 μm, the loss of TM0 in the PBC 1A is not more than 0.01 dB and therefore, an adiabatic conversion occurs sufficiently. FIG. 18 shows a state of propagation of an electric field in that case (taper length=80 μm). (a) of FIG. 18 shows an electric field distribution of an Ey component in a case where TM0 is introduced through the port 1-1. (b) of FIG. 18 shows an electric field distribution of an Ex component in a case where TE0 is introduced through the port 1-1. It is clear from (a) of FIG. 18 that TM0 gradually transfers over to the core 14 in the vicinity of the middle of the core 13. On the other hand, it is clear that TE0 hardly transfers over to the core 14 and passes through the core 13. Therefore, it is found that polarization separation of TE0 and TM0 is possible.

Next, on the assumption that the PBC 1A is used as a PBC, respective losses of TE0 and TM0 and polarization extinction ratios (PER) with respect to wavelength were calculated by FDTD. FIG. 19 shows a result of such calculation. The taper length was set to 80 μm. (a) of FIG. 19 shows a loss (corresponding to Formula (1)) in a case where TM0 is introduced through the port 1-1 and outputted through the port 2-2. (b) of FIG. 19 shows a PER (corresponding to Formula (3)) that is a ratio of respective losses of polarized waves of TE0 and TM0 which are outputted through the port 2-2 in a case where both TE0 and TM0 are introduced through the port 1-1. (c) of FIG. 19 shows a loss (corresponding to Formula (2)) in a case where TE0 is introduced through the port 1-2 and outputted through the port 2-2. (d) of FIG. 19 shows a PER (corresponding to Formula (4)) that is a ratio of respective losses of polarized waves of TE0 and TM0 which are outputted through the port 2-2 in a case where both TE0 and TM0 are introduced through the port 1-2. Note that FIG. 19 shows results for a conventional technique for comparison which will be described later.

It was found from the results shown in FIG. 19 that both the losses of TM0 and TE0 were very low such that the loss of TM0 was not more than 0.1 dB and the loss of TE0 was not more than 0.32 dB, in a very wide wavelength range extending over 120 nm including C band and L band. It is also found that it is possible to suppress undesirable polarized wave components to 1/10 or less since both the PERs are not less than 10 dB.

Next, the influence of a production error was calculated by the FDTD. A case assumed here as a case including a production error was a case where both of respective heights of the cores 13 and 14 are larger only by approximately 5% than a designed value. Then, calculation was carried out for a loss of TM0 which was introduced through the port 1-1 and outputted through the port 2-2 in the case thus assumed. FIG. 20 shows a result of the calculation for the case where the production error is present and also for a case where a production error is absent. It is clear from the result that even under the influence of a production error, the PBC 1A still has a low loss of not more than 0.1 dB in a wide wavelength range extending over 120 nm.

Comparative Example

A structure of Example 2 and a structure of Non-Patent Literature 2 were compared in a simulation. FIG. 35 shows dimensions of a PBC 201 in accordance with a conventional technique used for comparison. For comparison with the PBC 1A in accordance with Example 2, a core height, a distance between waveguides and a material of the waveguides in the PBC 201 were arranged to be the same as those in the PBC 1A. The length of a linear portion was decided such that the maximum value of a loss of TM0 having entered through a port 1-1 is minimum in a wavelength range of 1520 nm to 1640 nm. Further, under this condition, the core width was decided such that a PER at a port 1-1 is similar to that in Example 2. FIG. 19 shows results of a case thus arranged.

It was found from FIG. 19 that all characteristics of the PBC 1A are superior to of the PBC 201. In particular, whereas the maximum loss of TM0 was 0.43 dB in the case of the PBC 201, the maximum loss of TM0 was 0.1 dB in the case of the PBC 1A. In other words, it is clear that as compared to the conventional technique, the PBC 1A provides a higher performance in a wide wavelength range.

Further, the performance of the conventional technique in view of a production error was calculated, as in the calculation for FIG. 20. FIG. 21 shows a result of such calculation. In the PBC 201, the core size changes due to the influence of the production error and consequently, a degree of confinement of TM0 changes, so that a coupling length in a parallel-core section changes. Accordingly, as shown in FIG. 21, a center wavelength at which the loss is the minimum in a case with the production error is shifted from that in a case without the production error, so that the maximum loss increases from 0.43 dB of the case without the production error to 0.84 dB of the case with the error in the wavelength range of 1520 nm to 1640 nm. On the other hand, as described earlier, the PBC 1A keeps a low loss of not more than 0.1 dB even under the influence of the production error similar in level to that of the PBC 201 described above.

[Fabrication of PBC 1A]

The PBC 1A in accordance with Example 2 was fabricated, and various characteristics of the PBC 1A were measured. FIG. 22 shows a result of such measurement. The taper length is arranged to be 120 µm. (a) of FIG. 22 shows a loss (corresponding to Formula (1)) in a wide wavelength range extending over 100 nm, in a case where TM0 is introduced through the port 1-1 and outputted through the port 2-2. (b) of FIG. 22 shows a PER (corresponding to Formula (3)) that is a ratio of respective losses of polarized waves of TE0 and TM0 which are outputted through the port 2-2 in a case where both TE0 and TM0 are introduced through the port 1-2. (c) of FIG. 22 is a result of the measurement of a loss (corresponding to Formula (2)) in a case where TE0 is introduced through the port 1-2 and outputted through the port 2-2.

The above results have demonstrated that the maximum loss of TM0 is 0.16 dB, and therefore the PBC 1A is operable at a very low loss of TM0. Further, it is clear that the PER at the port 1-1 is not less than 10.6 dB and is a sufficiently large value. Furthermore, the maximum value of the loss of TE0 is 0.59 dB, and therefore, it is clear that the PBC 1A is operable also at a very low value of the loss of TE0.

As described above, the PBC 1A in accordance with Example 2 has been proven to have a large effect which improves problems of the conventional technique.

Embodiment 3

A PBC 1B in accordance with Embodiment 3 is obtained by adding a terminal section 4 to the PBC 1A in accordance with Embodiment 2. The terminal section 4 is a structure for removing an undesired polarized wave component. For example, when TEi is introduced through the port 1-1, most of the power of TEi is outputted through the port 2-1. In a case where this TEi is an undesired component, it is necessary to optically terminate the port 2-1. When the terminal section is absent, TEi may be reflected and become return light. Consequently, such TEi may adversely affect performance of an optical circuit to which the PBC is attached. Further, in a case where TMj is introduced through the port 1-1, most of the power of TMj is outputted through the port 2-2, but small part of the power of TMj (residual TMj) which has not transferred over to an adjacent waveguide is outputted through the port 2-1. For a reason similar to that in the case of TEi, it is preferable to remove such residual TMj.

(a) of FIG. 23 is a top view illustrating a configuration of the PBC 1B. In (a) of FIG. 23, only a core of the PBC 1B is illustrated. As illustrated in (a) of FIG. 23, the PBC 1B includes a seventh core 43 as a core of the terminal section 4, at the port 2-1 through which undesired light may be outputted. The core 43 communicates with a first core 13 via a fifth core 33. The width of the core 43 decreases along a light traveling direction as a distance from the core 13 increases. In other words, the terminal section 4 employs, as an optical terminal, the core 43 that is an inverse-tapered waveguide whose core width gradually decreases.

When the core width becomes narrower, confinement of light in the core becomes weaker, so that most of an electric field leaks out into a cladding. On this account, an electric field of undesired light can be gradually transferred into the cladding. This makes it possible to discharge undesired light while preventing reflection of such light.

Note that in the PBC 1B, the core 43 is provided at the port 2-1 of the fifth core 33, on the assumption that TMj outputted through the port 2-2 of a sixth core 34 is to be used. However, in a case where TEi outputted through the port 2-1 is to be used, the core 43 can be provided at the port 2-2 of the sixth core 34.

Modification

The following description will discuss a PBC 1C in accordance with a modification of Embodiment 3, with reference to (b) of FIG. 23. (b) of FIG. 23 is a top view illustrating a configuration of the PBC 1C. (b) of FIG. 23 here illustrates only a core of the PBC 1C. The PBC 1C includes a terminal section 4'. The terminal section 4' includes an optical absorber 43' that is connected to a first core 13 via a fifth core 33.

The optical absorber 43' can employ, for example, a core made of a P-type semiconductor or N-type semiconductor into which a dopant is implanted. This is because free carriers generated by the dopant implanted in the P-type semiconductor or N-type semiconductor function as an optical absorber that absorbs light. Further, the optical absorber 43' can be an optical absorber made of metal or a metal compound. The material of the optical absorber 43' is not specifically limited, but can be any material that absorbs light in a wide wavelength range including C band and L band.

Embodiment 4

The following description will discuss a polarizer 1D in accordance with Embodiment 4, with reference to FIG. 24. FIG. 24 is a top view illustrating a configuration of the polarizer 1D. FIG. 24 illustrates only a core of the polarizer 1D. The polarizer 1D has a structure in which two PBCs 1A illustrated in FIG. 16 are connected in series. The polarizer 1D can be expressed as a substrate-type optical waveguide element which includes n sets of a first core 13 and a second core 14. In Embodiment 4, a PBC 1A of a preceding stage is referred to as a PBC 1Aa, while a PBC 1A of a subsequent stage is referred to as a PBC 1Ab. In other words, when the sets of the first core 13 and the second core 14 are counted from one end of the polarizer, the PBC including a first set of the first core 13 and the second core 14 is the PBC 1Aa, and the PBC including a second set of the first core 13 and the second core 14 is the PBC 1Ab.

The second core 14 of the PBC 1Aa communicates with the first core 13 of the PBC 1Ab via a sixth core 34 of the PBC 1Aa and a third core 23 of the PBC 1Ab. The polarizer 1D functions as a polarizer as below.

When a TE polarized wave and a TM polarized wave is introduced through a port 1-1 of the PBC 1Aa, (1) most of the TM polarized wave transfers over to the second core 14 in a parallel-core section of the PBC 1Aa, and reaches a port 2-2 of the PBC 1Aa, (2) most of the TE polarized wave directly reaches a port 2-1 of the PBC 1Aa, and (3) part of the TE polarized wave transfers over to the second core 14 in the parallel-core section of the PBC 1Aa, and reaches the port 2-2 of the PBC 1Aa.

Then, (1) the most of the TM polarized wave and (3) the part of the TE polarized wave which have reached the port 2-2 of the PBC 1Aa are introduced into the PBC 1Ab through a port 1-1 of the PBC 1Ab. In this case, (4) the most of the TM polarized wave having been introduced transfers over to the second core 14 in a parallel-core section of the PBC 1Ab and is then outputted through a port 2-2 of the PBC 1Ab, (5) the part of the TE polarized wave having been introduced is directly outputted through a port 2-1 of the PBC 1Ab, and (6) part of the part of the TE polarized wave having been introduced transfers over to the second core 14 in the parallel-core section of the PBC 1Ab and is then outputted through the port 2-2 of the PBC 1Ab.

Connection of two PBCs 1A in series as described above allows, as an effect, the polarizer 1D to have an improved PER as compared to a PER in a case where a single PBC 1A is used. Embodiment 4 has described, as an example, a case where two PBCs 1A (two sets of the first core 13 and the second core 14) are connected in series. The polarizer 1D can be configured alternatively by connecting three or more PBCs 1A (three or more sets of the first core 13 and the second core 14) in series. In a case where the polarizer 1D is configured to include n sets (n is a positive integer) of the first core 13 and the second core 14, the second core 14 in the i-th set is configured to communicate with the first core 13 in the (i+1)th set. In this case, i is an integer of $1 \le i \le n-1$. Note that between the core 14 in the i-th set and the core 13 in the (i+1)th set, another core that is neither the core 13 nor the core 14 can be present.

It is possible to further improve the PER by increasing the number of PBCs 1A constituting the polarizer 1D.

Embodiment 5

The PBCs in accordance with the above Embodiments 1 to 4 can be used as a polarization beam combiner which is provided in a Dual Polarization-Quadrature Phase Shift Keying (DP-QPSK) modulator disclosed in Non-Patent Literature 1. The DP-QPSK modulator utilizes the following phenomenon: two modes including TE0 and TM0 can coexist in an optical waveguide. Accordingly, the DP-QPSK modulator carries out DP-QPSK modulation as follows: first, light having been introduced as TE0 is branched, and branched parts of light are modulated into QPSK signals, respectively; then, one of the branched parts of TE0 is converted into TM0 (polarization rotator); and thereafter, two modes (TE0 and TM0) are multiplexed on one optical waveguide by use of a PBC, such that an independent QPSK signal is present in each of the two modes. As a PBC for polarization multiplexing of TE0 and TM0, any of the PBC 1 and the PBCs 1A to 1C in accordance with the above-described Embodiments can be used.

In Embodiment 5, the following will discuss an optical modulator 5 which includes the PBC 1 in accordance with Embodiment 1 as a polarization beam combiner, with reference to FIG. 25. FIG. 25 is a block diagram illustrating a configuration of such an optical modulator 5.

The optical modulator 5 that is a DP-QPSK modulator includes, as illustrated in FIG. 25, (1) a first QPSK modulator 51 for carrying out QPSK modulation of TE0, (2) a second QPSK modulator 52 for carrying out QPSK modulation of TE0, (3) a polarization rotator 53 for converting, into TM0, TE0 having been modulated by the second QPSK modulator 52, and (4) a PBC 54 for carrying out polarization multiplexing of TE0 modulated by the first QPSK modulator 51 and TM0 obtained by the polarization rotator 53.

The PBC 54 is configured in the same manner as the PBC 1 illustrated in FIG. 6. The above TM0 is introduced through an input port 13a of a first core 13 of the PBC 54, while the above TE0 is introduced through an input port 14a of a second core 14 of the PBC 54. The PBC 54 carries out polarization multiplexing of the TM0 and the TE0, and then outputs polarization-multiplexed TM0 and TE0 through an output port 14b of the second core 14.

The optical modulator 5 including the PBC 54 as a polarization beam combiner has a low loss in a wide wavelength range including C band and L band. Accordingly, it is possible to provide a DP-QPSK modulator by use of a substrate-type optical waveguide having a low loss in such a wide wavelength range. Further, the PBC 54 can be fabricated by using a rectangular waveguide which is typically used in many instances. This makes it possible to fabricate the PBC 54 together with an optical waveguide serving as an optical wiring, so that no additional process is necessary.

Note that a method for modulating TE0 and TM0 is not limited to QPSK, and a modulator having a complex structure can also carry out polarization multiplexing by use of the PBC 54.

Embodiment 6

The following description will discuss a substrate-type optical waveguide element 6 in accordance with Embodiment 6, with reference to FIG. 26. FIG. 26 is a block diagram illustrating a configuration of the substrate-type optical waveguide element 6. As illustrated in FIG. 26, the substrate-type optical waveguide element 6 includes a spot-size converter 61 and an optical device 63, in addition to a polarizer 62. In Embodiment 6, it is assumed that the polarizer 62 is configured in the same manner as the PBC 1 illustrated in FIG. 6. Note that the polarizer 62 can be any of the PBCs 1A to 1C and the polarizer 1D described above, instead of the PBC 1.

The spot-size converter 61 reduces a spot size of light externally introduced via an optical fiber, lens, and the like, and then introduces the light into the polarizer 62 through an input port 13a of a first core 13 of the polarizer 62. The spot-size converter 61 can be, for example, an inverse-tapered wave guide having a core width that increases from a light-input end toward a polarizer-62-side end.

The optical device 63 is, for example, a modulator for modulating input light, or a wavelength filter for extracting only light having a specific wavelength. The optical device 63 is polarization-dependent. Therefore, it is preferable that either one of a TE polarized wave and a TM polarized wave is introduced into the optical device 63. However, light having passed through an external optical fiber and lens, and the spot-size converter 61 may contain an undesired polarized wave component, due to misalignment of polarization axes in the optical fiber and lens, and the spot-size converter 61.

As illustrated in FIG. 26, the polarizer 62 is provided between the spot-size converter 61 (light-input structure) and the optical device 63. The polarizer 62 outputs, to the optical device 63, a polarized wave component (TE polarized wave component or TM polarized wave component) preferable for the optical device 63 among TE polarized wave components and TM polarized wave components which may be contained in light introduced by the spot-size converter 61.

More specifically, output light of the spot-size converter 61 is introduced into the first core 13 through the input port 13a of the PBC 1. The polarizer 62 outputs a TE polarized wave component through an output port 13b of the first core 13 and a TM polarized wave component through an output port 14b of a second core 14.

In a case where a TE polarized wave component is preferable as a polarized wave component of input light to the optical device 63, the optical device 63 should be connected to a subsequent stage of the first core 13 of the polarizer 62. Then, a TE polarized wave component outputted from the first core 13 is introduced into the optical device 63.

On the other hand, in a case where a TM polarized wave component is preferable as a polarized wave component of input light to the optical device 63, the optical device 63 should be connected to a subsequent stage of the second core 14 of the polarizer 62. Then, a TM polarized wave component outputted from the second core 14 is introduced into the optical device 63.

As described above, provision of the polarizer 62 between the spot-size converter 61 and the optical device 63 that are formed on one substrate makes it possible to introduce, into the optical device 63, only a polarized wave component preferable for the optical device 63. The polarizer 62 can be fabricated by a process for fabricating the spot-size converter 61 and the optical device 63. In other words, fabrication of the substrate-type optical waveguide element 6 does not require addition of any special process for adding the polarizer 62 to the spot-size converter 61 and the optical device 63. Further, since the substrate-type optical waveguide element 6 includes the polarizer 62 configured in the same manner as the PBC 1, the optical device 63 can be prevented from being adversely affected by an undesirable polarized wave component, and at the same time, maintains a low loss in a wide wavelength range.

Embodiment 7

The following description will discuss a PBC 100 in accordance with Embodiment 7, with reference to FIGS. 27 and 28. In Embodiment 7, the PBC 100 is intended to carry out polarization multiplexing or polarization separation of TE0 and TM0, as in Embodiment 1. FIG. 27 is a cross-sectional view illustrating a basic form of a rib waveguide in accordance with Embodiment 7. (a) of FIG. 28 is a top view of the PBC 100, and (b) to (d) of FIG. 28 are cross-sectional views of the PBC 100 taken along line A-A', line B-B' and line C-C' in (a) of FIG. 28, respectively.

(Basic Structure of Rib Waveguide)

As illustrated in FIG. 27, the rib waveguide has a three-layer structure including a lower cladding 110, a core 150 provided on the lower cladding 110, and an upper cladding 120 provided on the core 150 so as to sandwich the core 150 between the lower cladding 110 and the upper cladding 120. The core 150 includes a thin plate-like slab 160 formed so as to cover all over a top surface of the lower cladding 110, and a rib 130 protruding with respect to the slab 160. As shown by broken line in FIG. 27, the rib 130 has a rectangular cross section.

The PBC 100 is fabricated, for example, by using, as the lower cladding 110, a BOX layer made of $SiO_2$ of an SOI wafer, and forming the core 150 by etching an Si layer that is a topmost layer of the SOI wafer in such a manner that the rib 130 and the slab 160 are left. Thereafter, the upper cladding 120 made of $SiO_2$ is formed so as to cover the core 150. Note that the upper cladding 120 can be air. The rib waveguide is different from a rectangular waveguide illustrated in FIG. 6 in that in the rib waveguide, a slab that is thinner than a rib is formed by leaving a core on both sides of the rib when the core is etched.

(Structure of PBC Constituted with Rib Waveguide)

Next, the following will discuss, with reference to FIG. 28, a structure of the PBC 100 in accordance with one aspect of the present invention which is configured with a rib waveguide. As illustrated in (a) and (b) of FIG. 28, the PBC 100 includes a first rib 130 and a second rib 140 between the lower cladding 110 and the upper cladding 120. The first rib 130 and the second rib 140 are formed in parallel to each other along a light traveling direction in the PBC 100, and a distance that is a width WG between the first rib 130 and the second rib 140 is kept constant. As illustrated in (d) of FIG. 28, on both sides of each of the first rib 130 and the second rib 140, the slab 160 is present. The first rib 130, the second rib 140 and the slab 160 altogether constitute the core 150.

When cross sections each orthogonal to the light travelling direction of the PBC 100 are considered, a width W of the slab 160 is constant and equal to a width W of the lower cladding 110 and the upper cladding 120 (i.e., the width of the SOI substrate), at all of a cross section taken along line A-A' at a start position of a parallel-core section, a cross section taken along line B-B' in the middle of the parallel core section, and a cross section taken along line C-C' at an end position of the parallel-core section which are shown in (a) of FIG. 28. In other words, the slab 160 is formed in all regions of a surface of the lower cladding 110 except for a region where the first rib 130 and the second rib 140 are formed. In this configuration, both the first rib 130 and the second rib 140 can be formed by one etching.

Note however that, as illustrated in (a) of FIG. 28, the width of the slab 160 can be arranged to be a width Wp that is smaller than the width W. In other words, a region where the slab 160 is formed can be limited to a region of the width Wp in which the first rib 130 and the second rib 140 are included. The slab 160 can be formed within such a limited region of the width Wp, by carrying out etching two times so that the first rib 130 and the second rib 140 will be formed.

In regard to a relation between a refractive index of the first rib 130 and the second rib 140 and respective refractive indexes of the lower cladding 110 and the upper cladding 120, the width W1 and the height h1 of the first rib 130, the width W2 and the height h2 of the second rib 140, such a relation, widths and heights are the same as those of the PBC 1 described in Embodiment 1 with reference to FIG. 6.

In a case where the PBC 100 is used as a tapered directional coupler, a TM0 polarized wave is caused to enter through an input port 130a of a core 130, while a TE0 polarized wave is caused to enter through an input port 140a of a core 140. The core 140 causes the TE0 polarized wave and the TM0 polarized wave having transferred from the core 130 over to the core 140 to exit through an output port 140b. In a case where the PBC 100 is used as a polarizer for TM0, for example, only TM0 between TE0 and TM0 can be extracted from the output port 140b when TE0 and TM0 are introduced through the input port 130a. In addition, in a case where the PBC 100 is used as a polarizer for TE0, for example, it is possible to extract only TE0 between TE0 and TM0 through the output port 130b when TE0 and TM0 are introduced into the input port 130a.

(Features of PBC 100)

In regard to the PBC 1, the above Features 1 to 7 are taken as necessary and sufficient conditions for achieving the purpose of an embodiment of the present invention. However, in a case where a PBC is constituted with a rib waveguide, Feature 1 needs to be replaced by the following Feature 1'.

Feature 1': Two waveguides WG1 and WG2 are configured as rib waveguides.

The effect of Feature 1 described earlier is that "it is possible to fabricate a PBC by a substrate-type optical waveguide". Thus, replacement of rectangular waveguides by rib waveguides as in Feature 1' causes no problem in functionality with which the above effect of Feature 1 is achieved.

Further, a person skilled in the art can easily understand that it is possible to achieve effects similar to those provided by Features 2 to 7 described earlier, by replacing the "core 13" and the "core 14" of the above Features 2 to 6 by the "rib 130" and the "rib 140", respectively, and also replacing the "cores 13 and 14" of Feature 7 by the core 150 in whole.

Here, the following supplementally states an additional effect provided by the Feature 1'. In the case of a rectangular waveguide, a core is formed by etching sides of the core. In this process, a phenomenon called "line-edge roughness" occurs due to a processing accuracy problem. In this phenomenon, a core width discontinuously changes along a light traveling direction. In other words, a discontinuous portion occurs on a side wall of a core. As a result, guided light is scattered at this discontinuous portion, so that loss is produced. On the other hand, in the case of a rib waveguide, a slab having a predetermined thickness is formed. The slab has side walls that are formed at a position sufficiently distant from a rib(s) which is a region where light is guided. Therefore, line-edge roughness of the slab does not scatter light being guided. In other words, as compared to the rectangular waveguide, the rib waveguide has a smaller ratio of the side wall portion which scatters light being guided. This makes it possible to decrease the loss. Further, the rib waveguide leads to achieving higher accuracy of continuity of the waveguide width (core width) required in the above Feature 5. In light of this, the rib waveguide makes it possible to decrease loss. As described above, use of the rib waveguide makes it possible to reduce light loss caused by the influence of a processing accuracy problem.

Embodiment 8

The following description will discuss a PBC 100A in accordance with Embodiment 8, with reference to FIGS. 29 and 30. In Embodiment 8, the PBC 100A is intended to carry out polarization multiplexing or polarization separation of TE0 and TM0 as in Embodiment 1. (a) of FIG. 29 is a cross-sectional view illustrating a method for fabricating a ridge waveguide in accordance with Embodiment 8. (b) of FIG. 29 is a cross-sectional view illustrating a basic form of the ridge waveguide. (a) of FIG. 30 is a top view illustrating a configuration of the PBC 100A including the ridge waveguide in accordance with Embodiment 8, and (b) to (d) of FIG. 30 are cross-sectional views of the PBC 100A taken along line A-A', line B-B' and line C-C' in (a) of FIG. 30, respectively.

(Basic Structure of Ridge Waveguide)

As illustrated in (b) of FIG. 29, the ridge waveguide has a structure which includes a lower cladding 110A, a lower cladding rib 110a, and a core 150A and an upper cladding 120A provided in this order on the lower cladding rib 110a. The lower cladding rib 110a is a protrusion of a part of a top surface of the lower cladding 110 so as to have a rectangular cross section. The core 150A and the upper cladding 120A are provided so as to have the same width as the lower cladding rib 110a. The lower cladding rib 110a, the core 150A and the upper cladding 120A altogether constitute a ridge 130A protruding from the top surface of the lower cladding 110A.

The PBC 100A is fabricated as illustrated in (a) of FIG. 29. For example, the PBC 100A is fabricated by: forming a lower cladding, a core and an upper cladding in the form of layers such that the lower cladding and the upper cladding each made of InP sandwich the core made of InGaAsP therebetween; and thereafter, etching the upper cladding, the core, and the lower cladding such that a part of the core having a desired core width is left and the lower cladding rib 110a is formed on the top surface of the lower cladding.

A region having been subjected to etching, that is, regions on respective sides of the ridge 130A can be filled with gas such as air or filled with resin, semiconductor, or the like. Formation of a waveguide as the ridge waveguide in the way described above makes it possible to increase a relative refractive index difference in a width direction, even in a case where a relative refractive index difference between the core 150A and each of the upper cladding 120A and the lower cladding 110A is small. For example, in a case where the upper cladding 120A and the lower cladding 110A are formed by using InP (refractive index: 3.17) and the core 150A is made of InGaAsP (refractive index: 3.47), the relative refractive index difference is 0.08 (8%). However, in a case where the region having been subjected to etching is formed by air (refractive index: 1), the relative refractive index difference in the width direction can be significantly increased to 0.46 (46%).

Use of the ridge waveguide in place of a rectangular waveguide or a rib waveguide makes it possible to increase the strength of confinement of light in the width direction, even when an employed combination of a core and a cladding results in a small relative refractive index difference of the core with respect to the cladding, for example, in a case where a core 150 made of InGaAsP and a claddings 110A and 120A made of InP are employed in combination.

(Structure of PBC Configured with Ridge Wave Guide)

Next, the following description will discuss a structure of the PBC 100A in accordance with an aspect of the present invention, with reference to FIG. 30. Here, the PBC 100A is formed by the ridge waveguide. As illustrated in (a) to (d) of FIG. 30, the PBC 100A includes the ridge 130A and a ridge 140A provided in parallel to each other on the lower cladding 110A, along a light traveling direction. The ridge 140A is configured in the same manner as the ridge 130A illustrated in (b) of FIG. 29, and the lower cladding 110A is shared by the ridges 130A and 140A. The ridges 130A and 140A have a constant distance therebetween. In other words, opposed side walls of the ridges 130A and 140A are arranged in parallel to each other so as to have a constant distance therebetween.

(Feature of PBC 100A)

In regard to the PBC 100A, a change is required in regard to a relative refractive index difference in a description of Feature 7 among the above Features 1 to 7. In Formula (5) defining the relative refractive index difference of the PBC 1, refractive indexes of the lower cladding 11 and the upper cladding 12 are defined as $N_{cl1}$ and $N_{cl2}$, respectively, and a refractive index of a material having the largest refractive index is defined as $N_{cl}$. On the other hand, in regard to the PBC 100A, the definition of $N_{cl}$ is redefined as follows: "$N_{cl}$ is Nb when Nb is a refractive index of a material filling a space (region having been subjected to etching) between a core of the ridge 130A (WG1) and a core of the ridge 140A (WG2)."

The reason for this redefinition is as follows. Embodiment 8 of the present invention utilizes the following phenomenon: optical coupling of TEi to an adjacent waveguide occurs less than that of TMj. A level of optical coupling depends on an amount of light that leaks out from one waveguide over to the other wave guide. Accordingly, light confinement can be made stronger in a direction from one of two waveguides to the other one of the two waveguides, by increasing a relative refractive index difference of a region between the two waveguides and each core. This makes it possible to obtain an effect of an embodiment of the present invention. In this case, it is appropriate to take the value of $N_{cl}$ as Nb since a material of the region between the two waveguides plays an essential role associated with $N_{cl}$.

Use of a ridge waveguide has the following significant advantages. That is, in a case where (i) a relative refractive index difference between a core and each of an upper cladding and a lower cladding is small and (ii) a rectangular waveguide or a rib waveguide is employed, light cannot be sufficiently confined in a core. On the other hand, a ridge waveguide makes it possible to sufficiently confine light in a core by only adding an etching step to a fabrication process of a rectangular waveguide. Further, in the case of a ridge waveguide, it is possible to set, to a large value, a relative refractive index difference between a core and a medium (e.g., gas such as air, resin, or semiconductor) which presents on both sides of the core. This makes it possible to have a smaller bend radius of the core 150, so that a device size can be reduced or a degree of integration of a device can be increased.

Modification (1)

The following description will discuss a PBC 100B in accordance with Modification (1) of Embodiment 8, with reference to FIG. 31. (a) of FIG. 31 is a top view illustrating a configuration of a PBC 100B including a ridge waveguide as one modification of Embodiment 8. (b) to (d) of FIG. 31 are cross-sectional views of the PBC 100B taken along line A-A', line B-B' and line C-C' in (a) of FIG. 31, respectively.

As illustrated in (a) to (d) of FIG. 31, a space on a side where no adjacent waveguide is present between both sides of each of the ridges 130A and 140A can be filled with a protective material 170. This makes it possible to prevent dust or the like from sticking to side walls of the ridges 130A and 140A and a top surface of a lower cladding 110A which are exposed after etching. It is necessary to use, as a material of the protective material 170, a material whose refractive index is smaller than that of a material of a core of the ridge waveguide. The material of the protective material 170 can be, for example, silica ($SiO_2$) or silicon nitride ($Si_3N_4$).

Modification (2)

The following description will discuss a PBC 100C in accordance with Modification (2) of Embodiment 8, with reference to (a) of FIG. 32. (a) of FIG. 32 is a cross-sectional view of the PBC 100C in a case where the PBC 100C is cut at a position corresponding to the position of line A-A' illustrated in (a) of FIG. 30.

The PBC 100C is different from the PBC 1 including a rectangular waveguide illustrated in (b) of FIG. 6 in that in the PBC 100C, a groove is formed along a height direction of the PBC 100C through a space between the cores 130C and 140C provided in parallel to each other on a lower cladding 110C of the PBC 100C. The groove 180 formed in the PBC 100C reaches, from a top surface of an upper cladding 120C, a position in the lower cladding 110C but not a bottom surface of the lower cladding 110C along the height direction, passing through the space between the cores 130C and 140C adjacent to each other.

In fabricating the PBC 100C, a layer of a core 150C is formed on the lower cladding 110C so as to have a parallelogram shape when viewed from above. The parallelogram shape is a shape as illustrated by an outline of the ribs 130A and 140A viewed from above in (a) of FIG. 30. The parallelogram shape is formed such that two short sides opposed to each other are positioned at a start position and an end position of a parallel-core section illustrated in (a) of FIG. 30, respectively. Next, the upper cladding 120C is provided on the lower cladding 110C such that the core 150C is buried. After the lower cladding 110C, the core 150C and the upper cladding 120C are formed so as to be three layers in the above-described way, the groove 180 is formed so as to have the width WG ((b) of FIG. 28). The groove 180 here is formed by etching from the top surface of the upper cladding 120C, in the vicinity of the middle of a width of the PBC 100C. This groove 180 divides the core 150C into, for example, a core 130C into which a TM polarized wave is caused to enter and a core 140C into which a TE polarized wave is caused to enter.

The PBC 100C has only one region to be subjected to etching. Accordingly, as compared to the PBC 100A having three regions to be subjected to etching, the PBC 100C can be fabricated by a simple process. In addition, the PBC 100C can yield an effect equivalent to that of the PBC 100A.

Modification (3)

The following description will discuss a PBC 100D in accordance with Modification (3) of Embodiment 8, with reference to (b) of FIG. 32. (b) of FIG. 32 is a cross-sectional view of the PBC 100D in a case where the PBC 100D is cut at a position corresponding to the position of line A-A' illustrated in (a) of FIG. 30.

The PBC 100D is configured such that the core 150C of the PBC 100C is replaced by a core 150D including a slab and ribs as in the core 150 shown in FIG. 27.

In fabricating the PBC 100D, a layer of a core 150D is formed on a lower cladding 110D, as illustrated in (b) of FIG. 32, such that a rib has a parallelogram shape when viewed from above. The parallelogram shape is formed such that two short sides opposed to each other are positioned at a start position and an end position of a parallel-core section illustrated in (a) of FIG. 30, respectively. Next, an upper cladding 120D is provided such that the upper cladding 120D and the lower cladding 110D sandwich the core 150D therebetween. After the lower cladding 110D, the core 150D and the upper cladding 120D are formed so as to be three layers in the above-described way, the groove 180 is formed so as to have the width WG ((b) of FIG. 28). The groove 180 here is formed by etching from a top surface of the upper cladding 120D, in the vicinity of the middle of a width of the PBC 100D. This groove 180 divides the rib of the core 150D into, for example, a rib 130D into which a TM polarized wave is caused to enter and a rib 140D into which a TE polarized wave is caused to enter.

The PBC 100D can yield an effect equivalent to that of the PBC 100C.

Additional Matters

In order to solve the above problems, a substrate-type optical waveguide element in accordance with an aspect of the present invention includes: a lower cladding whose refractive index is $N_{cl1}$; a first core and a second core, refractive indexes of which are $N_{co}$ ($N_{co}>N_{cl1}$), the first core and the second core each being formed on the lower cladding; and an upper cladding whose refractive index is $N_{cl2}$ ($N_{co}>N_{cl2}$), the upper cladding being provided on the lower cladding so as to bury the first core and the second core, wherein: when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (A) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other, (B) the effective refractive indexes $N_{TE}@WG1$ and $N_{TM}@WG1$ satisfy a relation of $N_{TE}@WG1>N_{TM}@WG1$ all along the parallel-core section, (C) the effective refractive indexes $N_{TE}@WG2$ and $N_{TM}@WG2$ satisfy a relation of $N_{TE}@WG2>N_{TM}@WG2$ all along the parallel-core section, (D) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section, and (E) when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 5]

$$\text{RELATIVE REFRACTIVE INDEX DIFFERENCE} = \frac{1}{2}\left[1 - \left(\frac{N_{cl}}{N_{co}}\right)^2\right]. \quad (a)$$

Since the substrate-type optical waveguide element in accordance with the aspect of the present invention satisfies the conditions (A) and (D), the TM polarized wave introduced into a first-side end of the first core adiabatically transfers over to the second core in the parallel-core section, and then outputted from a second-side end of the second core.

Further, since the substrate-type optical waveguide element in accordance with the aspect of the present invention satisfies the conditions (B) and (C), strength of optical coupling of the TM polarized wave differs from strength of optical coupling of the TE polarized wave. Further, since the condition (E) is satisfied, such difference in strength of optical coupling is sufficiently large. Therefore, most of the TE polarized wave having been introduced into a first-side end of the second core does not transfer over to the first core, and is outputted from the second-side end of the second core.

In other words, according to the above aspect of the present invention, it is possible to provide a substrate-type optical waveguide element having a small loss of a TM polarized wave and a high polarization extinction ratio.

The substrate-type optical waveguide element having the above functions serves as (a) a polarization beam combiner for carrying out polarization multiplexing of the TE polarized wave and the TM polarized wave, (b) a polarization beam splitter for carrying out polarization separation of the TE polarized wave and the TM polarized wave, and (c) a polarizer extracting only one polarized wave component from light in which the TE polarized wave and the TM polarized wave are mixedly present. Further, the substrate-type optical waveguide element can suppress loss of the TM polarized wave to a low level in a wide wavelength range.

In addition, the substrate-type optical waveguide element has a simple configuration including the lower cladding, the first core and the second core formed on the lower cladding, and the upper cladding provided on the lower cladding such that the first core and the second core are buried. Therefore, the substrate-type optical waveguide element can be produced simply by use of a generally established production process.

As described above, the substrate-type optical waveguide element can provide a substrate-type optical waveguide element which can suppress loss of a TM polarized wave to a low level in a wide wavelength range and can also be easily produced.

Further, the substrate-type optical waveguide element in accordance with an aspect of the present invention is preferably arranged such that: the first core and the second core are each a core having a rectangular cross section that is orthogonal to a light traveling direction; a height of the first core is equal to a height of the second core; a width W1 of the first core and a width W2 of the second core are each continuous as a function of distance from the start position of the parallel-core section; and a magnitude relation of the width W1 and the width W2 at the start position of the parallel-core section is opposite to a magnitude relation of the width W1 and the width W2 at the end position of the parallel-core section.

The above configuration yields an effect similar to that of the above-described substrate-type optical waveguide element. Further, in the above configuration, the height of the first core is equal to the height of the second core. Accordingly, these two cores can be fabricated by one etching, so that a production process becomes simple. This can lead to a lower cost and a higher yield.

Further, the substrate-type optical waveguide element in accordance with an aspect of the present invention is preferably arranged such that: the upper cladding and the lower cladding are made of a same material; a width W1 of the first core and a width W2 of the second core are each larger than an equal height of the first core and the second core; and the first core and the second core guide a TE0 polarized wave as the TE polarized wave and a TM0 polarized wave as the TM polarized wave.

The above configuration yields an effect similar to that of each of the above-described substrate-type optical waveguide elements.

Further, the substrate-type optical waveguide element in accordance with an aspect of the present invention is preferably arranged such that: the first core and the second core are each made of silicon; and the lower cladding and the upper cladding are each made of silica.

With the above configuration, the substrate-type optical waveguide element can use, as a substrate, an SOI (Silicon-On-Insulator) wafer and accordingly, can be produced by using an existing CMOS process. Therefore, the substrate-type optical waveguide element can be easily produced. Further, the substrate-type optical waveguide element can achieve a large relative refractive index difference.

Further, the substrate-type optical waveguide element in accordance with an aspect of the present invention is preferably arranged such that: in a case where $W_{upper}$ is defined by the following Formula (b) (where h is an equal height of the first core and the second core, and e is Napier's constant), a width W1 of the first core satisfies a relation of $W1 < W_{upper}$ and a width W2 of the second core satisfies a relation of $W2 < W_{upper}$:

[Math. 6]

$$W_{upper} = \{0.868224 \times [\log_e(h)]^4 - 21.265613[\log_e(h)]^3 + 195.780964 \times [\log_e(h)]^2 - 802.242303 \times \log_e(h) + 1236.45521\} \times h \quad \text{(b)}$$

In a case where the width W1 or the width W2 is gradually increased, the effective refractive index of the TE0 polarized wave significantly increases. This increases a difference between the effective refractive index of the TE0 polarized wave and the effective refractive index of the TM0 polarized wave. However, in a case where the width W1 or width W2 becomes not less than $W_{upper}$, a magnitude relation of the effective refractive index of the TM0 polarized wave and the effective refractive index of a TE1 polarized wave is reversed. Such reversal of the magnitude relation results in increased possibility of the occurrence of interaction between the TM0 polarized wave and the TE1 polarized wave. In other words, the reversal of the above magnitude relation leads to a conversion of part of the TM0 polarized wave to the TE1 polarized wave, so that the conversion results in increased possibility of the occurrence of excess loss of the TM0 polarized wave.

On the other hand, in the above configuration, the magnitude relation of the effective refractive index of the TM0 polarized wave and the effective refractive index of the TE1 polarized wave is not reversed. This suppresses the possibility of the occurrence of interaction between the TM0 polarized wave and the TE1 polarized wave. Therefore, it is possible to suppress excess loss of the TM0 polarized wave.

Moreover, the substrate-type optical waveguide element in accordance with an aspect of the present invention is preferably arranged to further include: a third core whose refractive index is $N_{co}$, the third core communicating with the first core via the start position or the end position of the parallel-core section; and a fourth core whose refractive index is $N_{co}$, (1) the fourth core communicating with the second core via the start position of the parallel-core section in a case where the third core communicates with the first core via the start position of the parallel-core section, and (2) the fourth core communicating with the second core via the end position of the parallel-core section in a case where the third core communicates with the first core via the end position of the parallel-core section, wherein (1) in a case where the third core communicates with the first core via the start position of the parallel-core section, a distance between the third core and the fourth core increases as a distance from the start position of the parallel-core section increases, and (2) in a case where the third core communicates with the first core via the end position of the parallel-core section, a distance between the third core and the fourth core increases as a distance from the end position of the parallel-core section increases.

With the above configuration, in a case where another waveguide is connected to the first core, the presence of the third core between the first core and the another waveguide makes it possible to smoothly connect the first core and the another waveguide. Similarly, in a case where another waveguide is connected to the second core, the presence of the fourth core between the second core and the another waveguide makes it possible to smoothly connect the second core and the another core. Thus, it is possible to suppress possibility of undesired reflection caused by connection of another waveguide to the first core or the second core.

Further, since a distance between cores adjacent to each other can be gradually increased, it is possible to continuously increase (on an input side)/decrease (on an output side) the strength of optical coupling of the TM polarized light. This makes it possible to decrease the strength of optical coupling of the TM polarized wave between adjacent waveguides as a distance from an input/output section increases. Accordingly, the TM polarized wave can have an electric field distribution that is localized more in one of waveguides. As a result, it is possible to reduce loss which is caused by the TM polarized wave remaining in the other one of the waveguides.

Moreover, the substrate-type optical waveguide element in accordance with an aspect of the present invention is preferably arranged to further include: a fifth core whose refractive index is $N_{co}$, the fifth core communicating with the first core or the second core, the fifth core having a width that decreases as a distance from the first core increases.

In the above configuration, light having been introduced into the fifth core from the first core or the second core leaks into the lower cladding or the upper cladding in a propagation process through the fifth core. Therefore, it is possible to prevent light having been introduced into the fifth core from the first core or the second core from returning back into the parallel-core section.

Moreover, the substrate-type optical waveguide element in accordance with an aspect of the present invention can further include: an optical absorber connected to the first core or the second core.

In the above configuration, light having been introduced into the optical absorber from the first core or the second core is absorbed by the optical absorber. Therefore, it is possible to prevent light having been introduced into the optical absorber from the first core or the second core from returning back into the parallel-core section.

Moreover, a substrate-type optical waveguide element (polarizer) in accordance with an aspect of the present invention is preferably arranged to include: n sets of the first core and the second core, the second core in an i-th set (where i is an integer in a range of 1≤i≤n−1) as counted from one end of the substrate-type optical waveguide element communicating with the first core in an (i+1)th set as counted from the one end.

The above configuration makes it possible to provide a substrate-type optical waveguide element (polarizer) having a high polarization extinction ratio.

Moreover, the substrate-type optical waveguide element in accordance with an aspect of the present invention is preferably arranged to further include: a first optical modulator for modulating part of a TE polarized wave; a second optical modulator for modulating part of the TE polarized wave; and a polarization rotator for converting, into a TM polarized wave, an TE polarized wave output from the second optical modulator, the TM polarized wave outputted from the polarization rotator being introduced into the first core, and the TE polarized wave outputted from the first optical modulator being introduced into the second core.

The above configuration makes it possible to provide an optical modulator having a low loss in a wide wavelength range.

Moreover, the substrate-type optical waveguide element in accordance with an aspect of the present invention is preferably arranged to further include: a light-input structure; and an optical device, the light-input structure allowing externally introduced light to enter into the first core, after reducing a spot size of the externally introduced light, the first core outputting a TE polarized wave component of the light having entered into the first core, the second core outputting a TM polarized wave component of the light having entered into the first core, and the TE polarized wave component outputted from the first core or the TM polarized wave component outputted from the second core being introduced into the optical device.

In the above configuration, even in a case where a polarized wave component unfavorable to the optical device occurs in the light-input structure, it is possible to introduce, into the optical device, the TE polarized wave component outputted from the first core, or the TM polarized wave component outputted from the second core. Since the light-input structure and the optical device can be produced on the same substrate device as the substrate-type optical waveguide element, the light-input structure and the optical can be easily produced.

In order to solve the above problems, a method, in accordance with an aspect of the present invention, for producing a substrate-type optical waveguide element including: a lower cladding whose refractive index is $N_{cl1}$; a first core and a second core, refractive indexes of which are $N_{co}$ ($N_{co}>N_{cl1}$), the first core and the second core each being formed on the lower cladding; and an upper cladding whose refractive index is $N_{cl2}$ ($N_{co}>N_{cl2}$), the upper cladding being provided on the lower cladding so as to bury the first core and the second core, the method includes the step of forming the first core and the second core such that the following conditions (1) to (4) are satisfied:

when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (1) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other; (2) the effective refractive indexes $N_{TE}@WG1$ and $N_{TM}@WG1$ satisfy a relation of $N_{TE}@WG1>N_{TM}@WG1$ all along the parallel-core section, while the effective refractive indexes $N_{TE}@WG2$ and $N_{TM}@WG2$ satisfy a relation of $N_{TE}@WG2>N_{TM}@WG2$ all along the parallel-core section; (3) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section; and (4) when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 7]

$$\text{RELATIVE REFRACTIVE INDEX DIFFERENCE} = \frac{1}{2}\left[1 - \left(\frac{N_{cl}}{N_{co}}\right)^2\right]. \tag{a}$$

With the above configuration, the method for producing the substrate-type optical waveguide element yields an effect similar to that of the substrate-type optical waveguide element.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a substrate-type optical waveguide element used in optical fiber communications, more specifically, a substrate-type optical waveguide element which carries out multiplexing, separation or removal of polarized waves.

REFERENCE SIGNS LIST 1, 1A, 1B, 1C PBC (polarization beam combiner, substrate-type optical waveguide element)
11 lower cladding
12 upper cladding
13 first core
14 second core
23 third core
24 fourth core
33 fifth core (third core)
34 sixth core (fourth core)
43 seventh core (fifth core)
43' optical absorber
1D polarizer (substrate-type optical waveguide element)
5 optical modulator (substrate-type optical waveguide element)
51 first QPSK modulator (first optical modulator)
52 second QPSK modulator (second optical modulator)
53 polarization rotator
54 PBC (polarization beam combiner)
6 substrate-type optical waveguide element
61 spot-size converter (light-input structure)
62 polarizer
63 optical device
100, 100A, 100B, 100C, 100D PBC (polarization beam combiner, substrate-type optical waveguide element)
110, 110A, 110C, 110D lower cladding
120, 120A, 120C, 120D upper cladding
130, 130D rib
130C core
140C core
140, 140D rib
130A ridge
140A ridge

The invention claimed is:

1. A substrate-type optical waveguide element comprising:
a lower cladding whose refractive index is $N_{cl1}$;
a first core and a second core, refractive indexes of which are $N_{co}$ ($N_{co} > N_{cl1}$), the first core and the second core each being formed on the lower cladding; and
an upper cladding whose refractive index is $N_{cl2}$ ($N_{co} > N_{cl2}$), the upper cladding being provided on the lower cladding so as to bury the first core and the second core, wherein:
when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent,
each of the effective refractive indexes $N_{TE}@WG1$, $N_{TM}@WG1$, $N_{TE}@WG2$, and $N_{TM}@WG2$ continuously changes as a function of distance from a start position of a parallel-core section in which the first core and the second core extend in parallel to each other,
the effective refractive indexes $N_{TE}@WG1$ and $N_{TM}@WG1$ satisfy a relation of $N_{TE}@WG1 > N_{TM}@WG1$ all along the parallel-core section, while the effective refractive indexes $N_{TE}@WG2$ and $N_{TM}@WG2$ satisfy a relation of $N_{TE}@WG2 > N_{TM}@WG2$ all along the parallel-core section,
one of the effective refractive indexes $N_{TM}@WG1$ and $N_{TM}@WG2$ which one is greater than the other one of the effective refractive indexes $N_{TM}@WG1$ and $N_{TM}@WG2$ at the start position of the parallel-core section is smaller than the other one at an end position of the parallel-core section,
the parallel-core section includes an interaction region, and
when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 1]

$$\text{RELATIVE REFRACTIVE INDEX DIFFERENCE} = \frac{1}{2}\left[1 - \left(\frac{N_{cl}}{N_{co}}\right)^2\right]. \quad (a)$$

2. The substrate-type optical waveguide element as set forth in claim 1, wherein:
the first core and the second core are each a core having a rectangular cross section that is orthogonal to a light traveling direction;
a height of the first core is equal to a height of the second core;
a width W1 of the first core and a width W2 of the second core each continuously change as a function of distance from the start position of the parallel-core section; and
one of the width W1 and the width W2 which one is greater than the other one of the width W1 and the width W2 at the start position of the parallel-core section is smaller than the other one at the end position of the parallel-core section.

3. The substrate-type optical waveguide element as set forth in claim 1, wherein:
the upper cladding and the lower cladding are made of a same material;
a width W1 of the first core and a width W2 of the second core are each larger than an equal height of the first core and the second core; and
the first core and the second core guide a TE0 polarized wave as the TE polarized wave and a TM0 polarized wave as the TM polarized wave.

4. The substrate-type optical waveguide element as set forth in claim 1, wherein:
the first core and the second core are each made of silicon; and
the lower cladding and the upper cladding are each made of silica.

5. The substrate-type optical waveguide element as set forth in claim 4, wherein:
in a case where Wupper is defined by the following Formula (b) (where h is an equal height of the first core and the second core, and e is Napier's constant), a width W1 of the first core satisfies a relation of W1<Wupper and a width W2 of the second core satisfies a relation of W2<Wupper:

[Math. 2]

$$W_{upper} = \{0.868224 \times [\log_e(h)]^4 - 21.265613 \times [\log_e(h)]^3 + 195.780964 \times [\log_e(h)]^2 - 802.242303 \times \log_e(h) + 1236.45521\} \times h \quad (b).$$

6. The substrate-type optical waveguide element as set forth in claim 1, further comprising:
a third core whose refractive index is Nco, the third core communicating with the first core via the start position or the end position of the parallel-core section; and
a fourth core whose refractive index is Nco,
(1) the fourth core communicating with the second core via the start position of the parallel-core section in a case where the third core communicates with the first core via the start position of the parallel-core section, and (2) the fourth core communicating with the second core via the end position of the parallel-core section in a case where the third core communicates with the first core via the end position of the parallel-core section,
wherein (1) in a case where the third core communicates with the first core via the start position of the parallel-core section, a distance between the third core and the fourth core increases as a distance from the start position of the parallel-core section increases, and (2) in a case where the third core communicates with the first core via the end position of the parallel-core section, a distance between the third core and the fourth core increases as a distance from the end position of the parallel-core section increases.

7. The substrate-type optical waveguide element as set forth in claim 1, further comprising:
a fifth core whose refractive index is Nco, the fifth core communicating with the first core or the second core,
the fifth core having a width that decreases as a distance from the first core increases.

8. The substrate-type optical waveguide element as set forth in claim 1, further comprising:
an optical absorber connected to the first core or the second core.

9. A substrate-type optical waveguide element comprising:
n sets of a first core and a second core as set forth in claim 1,
the second core in an i-th set (where i is an integer in a range of $1 \leq i \leq n-1$) as counted from one end of the substrate-type optical waveguide element communicating with the first core in an (i+1)th set as counted from the one end.

10. The substrate-type optical waveguide element as set forth in claim 1, further comprising:
a first optical modulator for modulating part of a TE polarized wave;
a second optical modulator for modulating part of the TE polarized wave; and
a polarization rotator for converting, into a TM polarized wave, an TE polarized wave output from the second optical modulator,
the TM polarized wave outputted from the polarization rotator being introduced into the first core, and
the TE polarized wave outputted from the first optical modulator being introduced into the second core.

11. The substrate-type optical waveguide element as set forth in claim 1, further comprising:
a light-input structure; and
an optical device,
the light-input structure allowing externally introduced light to enter into the first core, after reducing a spot size of the externally introduced light,
the first core outputting a TE polarized wave component of the light having entered into the first core,
the second core outputting a TM polarized wave component of the light having entered into the first core, and
the TE polarized wave component outputted from the first core or the TM polarized wave component outputted from the second core being introduced into the optical device.

12. The substrate-type optical waveguide element as set forth in claim 1, wherein:
the interaction region is a region in which a transfer of the TE polarized wave or the TM polarized wave between the first core and the second core occurs.

13. A method for producing a substrate-type optical waveguide element including:
a lower cladding whose refractive index is $N_{cl1}$;
a first core and a second core, refractive indexes of which are $N_{co}$ ($N_{co} > N_{cl1}$), the first core and the second core each being formed on the lower cladding; and
an upper cladding whose refractive index is $N_{cl2}$ ($N_{co} > N_{cl2}$), the upper cladding being provided on the lower cladding so as to bury the first core and the second core,
the method comprising the step of forming the first core and the second core such that the following conditions (1) to (5) are satisfied:
when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent,
(1) each of the effective refractive indexes $N_{TE}@WG1$, $N_{TM}@WG1$, $N_{TE}@WG2$, and $N_{TM}@WG2$ continuously changes as a function of distance from a start position of a parallel-core section in which the first core and the second core extend in parallel to each other;
(2) the effective refractive indexes $N_{TE}@WG1$ and $N_{TM}@WG1$ satisfy a relation of $N_{TE}@WG1 > N_{TM}@WG1$ all along the parallel-core section, while the effective refractive indexes $N_{TE}@WG2$ and $N_{TM}@WG2$ satisfy a relation of $N_{TE}@WG2 > N_{TM}@WG2$ all along the parallel-core section;
(3) one of the effective refractive indexes $N_{TM}@WG1$ and $N_{TM}@WG2$ which one is greater than the other one of the effective refractive indexes $N_{TM}@WG1$ and $N_{TM}@WG2$ at the start position of the parallel-core section is smaller than the other one at an end position of the parallel-core section;
(4) the parallel-core section includes an interaction region; and
(5) when $N_{cl}$ is a larger one of the refractive index $N_{cl1}$ of the lower cladding and the refractive index $N_{cl2}$ of the upper cladding, a relative refractive index difference defined by the following Formula (a) is 0.25 or higher:

[Math. 3]

$$\text{RELATIVE REFRACTIVE INDEX DIFFERENCE} = \frac{1}{2}\left[1 - \left(\frac{N_{cl}}{N_{co}}\right)^2\right]. \quad (a)$$

14. The method for producing a substrate-type optical waveguide element as set forth in claim 13, wherein:

the interaction region is a region in which a transfer of the TE polarized wave or the TM polarized wave between the first core and the second core occurs.

15. A substrate-type optical waveguide element comprising:
a lower cladding whose refractive index is $N_{cl1}$;
a first core and a second core, refractive indexes of which are $N_{co}$ ($N_{co}>N_{cl1}$), the first core and the second core each being formed on the lower cladding; and
an upper cladding whose refractive index is $N_{cl2}$ ($N_{co}>N_{cl2}$), the upper cladding being provided on the lower cladding so as to bury the first core and the second core, wherein:
when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent,
each of the effective refractive indexes $N_{TE}@WG1$, $N_{TM}@WG1$, $N_{TE}@WG2$, and $N_{TM}@WG2$ continuously changes as a function of distance from a start position of a parallel-core section in which the first core and the second core extend in parallel to each other,
the effective refractive indexes $N_{TE}@WG1$ and $N_{TM}@WG1$ satisfy a relation of $N_{TE}@WG1>N_{TM}@WG1$ all along the parallel-core section, while the effective refractive indexes $N_{TE}@WG2$ and $N_{TM}@WG2$ satisfy a relation of $N_{TE}@WG2>N_{TM}@WG2$ all along the parallel-core section,
one of the effective refractive indexes $N_{TM}@WG1$ and $N_{TM}@WG2$ which one is greater than the other one of the effective refractive indexes $N_{TM}@WG1$ and $N_{TM}@WG2$ at the start position of the parallel-core section is smaller than the other one at an end position of the parallel-core section,
the parallel-core section includes an interaction region, and
when $N_{cl}$ is a refractive index of a medium present in a space between the first core and the second core in the parallel-core section, a relative refractive index difference defined by the following Formula (a) is 0.25 or higher:

[Math. 1]

$$\text{RELATIVE REFRACTIVE INDEX DIFFERENCE} = \frac{1}{2}\left[1-\left(\frac{N_{cl}}{N_{co}}\right)^2\right]. \quad (a)$$

16. The substrate-type optical waveguide element as set forth in claim 15, wherein:
the interaction region is a region in which a transfer of the TE polarized wave or the TM polarized wave between the first core and the second core occurs.

* * * * *